US012666261B2

(12) United States Patent
Kim et al.

(10) Patent No.: US 12,666,261 B2
(45) Date of Patent: Jun. 23, 2026

(54) METHODS AND SYSTEMS FOR PROVIDING HOME NETWORK ROUTING INFORMATION OF REMOTE USER EQUIPMENT (UE) FOLLOWING AUTHENTICATION FAILURE DURING ESTABLISHMENT OF UE-TO-NETWORK (U2N) RELAY COMMUNICATION

(71) Applicant: QUALCOMM Incorporated, San Diego, CA (US)

(72) Inventors: Hongil Kim, San Diego, CA (US); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 18/363,543

(22) Filed: Aug. 1, 2023

(65) Prior Publication Data

US 2024/0048981 A1 Feb. 8, 2024

Related U.S. Application Data

(60) Provisional application No. 63/370,639, filed on Aug. 5, 2022.

(51) Int. Cl.
*H04L 29/06* (2006.01)
*H04W 12/037* (2021.01)
*H04W 12/06* (2021.01)

(52) U.S. Cl.
CPC ......... *H04W 12/06* (2013.01); *H04W 12/037* (2021.01)

(58) Field of Classification Search
None
See application file for complete search history.

(56) References Cited

U.S. PATENT DOCUMENTS 8,850,045 B2 9/2014 Berg et al.
11,218,878 B2 * 1/2022 Dawes .................... H04L 63/10
(Continued)

FOREIGN PATENT DOCUMENTS

EP 2602980 A1 6/2013
EP 4021047 A1 6/2022
(Continued)

OTHER PUBLICATIONS

Kim, Han Sang et al. Trust-Propagation Based Authentication Protocol in Multihop Wireless Home Networks. 2006 1st International Conference on Communication Systems Software & Middleware. https://ieeexplore.ieee.org/stamp/stamp.jsp?tp=&arnumber=1665168 (Year: 2006).*
(Continued)

*Primary Examiner* — Jeremiah L Avery
(74) *Attorney, Agent, or Firm* — Muncy, Geissler, Olds & Lowe, P.C.

(57) ABSTRACT

Disclosed are methods and systems for providing home network routing information (HNRI) of remote user equipment (UE) following authentication failure, e.g., during establishment of UE-to-network (U2N) relay communication. In some aspects, a first UE may detect an authentication failure during establishment of a secure connection with a second UE, and in response to detecting the authentication failure, notifies the second UE of the authentication failure. In addition, the HNRI of a first authentication node within the home network of the first UE is provided to a second authentication node within the home network of the second UE, either by the first UE, by the second UE, or from being stored by the second authentication node from a previous interaction involving the first UE.

51 Claims, 26 Drawing Sheets

(56) References Cited

U.S. PATENT DOCUMENTS

| | | | |
|---|---|---|---|
| 2013/0104207 A1* | 4/2013 | Kroeselberg | H04W 92/02 |
| | | | 726/6 |
| 2021/0058784 A1* | 2/2021 | Kedalagudde | H04W 76/12 |
| 2021/0092595 A1* | 3/2021 | Ramachandran ... | H04W 12/037 |
| 2021/0297199 A1* | 9/2021 | Miao | H04L 1/1819 |
| 2021/0345104 A1 | 11/2021 | Cheng et al. | |
| 2021/0385283 A1* | 12/2021 | Talebi Fard | H04W 76/10 |
| 2022/0095240 A1* | 3/2022 | Ying | H04B 17/336 |
| 2022/0116752 A1* | 4/2022 | Gupta | H04W 48/16 |
| 2022/0140967 A1* | 5/2022 | Khoryaev | H04L 5/0048 |
| | | | 375/220 |
| 2022/0159768 A1* | 5/2022 | Zhu | H04L 1/1874 |
| 2022/0167448 A1* | 5/2022 | Palle | H04W 36/00692 |
| 2022/0322094 A1* | 10/2022 | Maschue | H04W 12/106 |
| 2022/0345997 A1* | 10/2022 | Kuge | H04W 48/18 |
| 2022/0360966 A1 | 11/2022 | Kim et al. | |
| 2023/0217236 A1* | 7/2023 | Manning | H04W 12/06 |
| | | | 455/432.1 |

FOREIGN PATENT DOCUMENTS

| | | |
|---|---|---|
| WO | 2012109286 | 8/2012 |
| WO | 2016161886 A1 | 10/2016 |
| WO | 2020006311 A1 | 1/2020 |
| WO | 2021023533 A1 | 2/2021 |

OTHER PUBLICATIONS

Balakrishnan, Minu; Karthigha, M. A cluster based OLSR routing to overcome the routing issues in ad hoc networks: A review. 2017 International conference of Electronics, Communication and Aerospace Technology (ICECA). https://ieeexplore.ieee.org/stamp/stamp.jsp?tp=&arnumber=8203624 (Year: 2017).*

Kim, Seungwon; Jeong, Jongpil. Design and Performance Analysis of A Novel P2P-SIP Architecture for Network-Based Mobility Support in Intelligent Home Networks. 2013 IEEE 9th International Conference on Mobile Ad-hoc and Sensor Networks. https://ieeexplore.ieee.org/stamp/stamp.jsp?tp=&arnumber=6726349 (Year: 2013).*

Park, Hojin, et al. A Framework for Interoperability of Heterogeneous Devices in Ubiquitous Home. 2010 Second International Conference on Advances in Future Internet. https://ieeexplore.ieee.org/stamp/stamp.jsp?tp=&arnumber=5558194 . (Year: 2010).*

Manimegalai, M.; Sebasthiarani, K. Efficient Routing in Smart Grid Communication by Secured ABC-ANN Algorithm. 2022 IEEE 7th International conference for Convergence in Technology (I2CT). https://ieeexplore.IEEE.org/stamp/stamp.jsp?tp=&arnumber=9824016 (Year: 2022).*

Taha, Sanaa; Shen, Xuemin. Anonymous Home Binding Update Scheme for Mobile IPV6 Wireless Networking. 2011 IEEE Global Telecommunications Conference—Globecom 2011. https://ieeexplore.ieee.org/stamp/stamp.jsp?tp=&arnumber=6134034 (Year: 2011).*

Faizan, Jahanzeb et al. Introducing Reliability and Load Balancing in Home Link of Mobile IPV6 based Networks. 2006 ACS/IEEE International Conference on Pervasive Services. https://ieeexplore.ieee.org/stamp/stamp.jsp?tp=&arnumber=1652212 (Year: 2006).*

Sharma, Kapil et al. Taxonomy of Routing Protocols. 2022 International Conference for Advancement in Technology (ICONAT). https://ieeexplore.ieee.org/stamp/stamp.jsp?tp=&arnumber=9725905 (Year: 2022).*

International Search Report and Written Opinion—PCT/US2023/071526—ISA/EPO—Feb. 9, 2024.

Partial International Search Report—PCT/US2023/071526—ISA/EPO—Oct. 30, 2023.

3GPP: "3rd Generation Partnership Project, Technical Specification Group Core Network and Terminals, Proximity-services (ProSe) in 5G System (5GS) protocol aspects, Stage 3 (Release 17)", 3GPP Standard, Technical Specification, 3rd Generation Partnership Project, 650 Route des Lucioles—Sophia Antipolis, Valbonne—France, No. 3GPP TS 24.554 V17.1.0 Jun. 2022, clause 7.2.2.2, clause 7.2.10.5 (7th paragraph), pp. 1-347.

3GPP: "3rd Generation Partnership Project, Technical Specification Group Services and System Aspects, Proximity based Services (ProSe) in the 5G System (5GS) (Release 17)", 3GPP Standard, Technical Specification, 3rd Generation Partnership Project, 650 Route des Lucioles—Sophia Antipolis, Valbonne—France, No. 3GPP TS 23.304 V17.3.0, Jun. 2022, clause 4.3.9, clause 5.4.1, pp. 1-105.

3GPP: "3rd Generation Partnership Project, Technical Specification Group Services and System Aspects, Security Aspects of Proximity based Services (ProSe) in the 5G System (5GS) (Release 17)", 3GPP Standard, Technical Specification, 3rd Generation Partnership Project, 650 Route des Lucioles—Sophia Antipolis, Valbonne—France, No. 3GPP TS 33.503 V17.0.1, Jun. 2022, clause 6.3.3.2, clause 6.3.3.2.2, clause 6.3.3.3, clause 6.3.3.3.2, pp. 1-53.

3GPP: "3rd Generation Partnership Project, Technical Specification Group Services and System Aspects, Security aspects of Proximity based Services (ProSe) in the 5G System (5GS) (Release 19)", 3GPP Standard, 650 Route des Lucioles—Sophia Antipolis, Valbonne—France, 3GPP TS 33.503, V19.2.0, Sep. 2025, pp. 1-77.

* cited by examiner

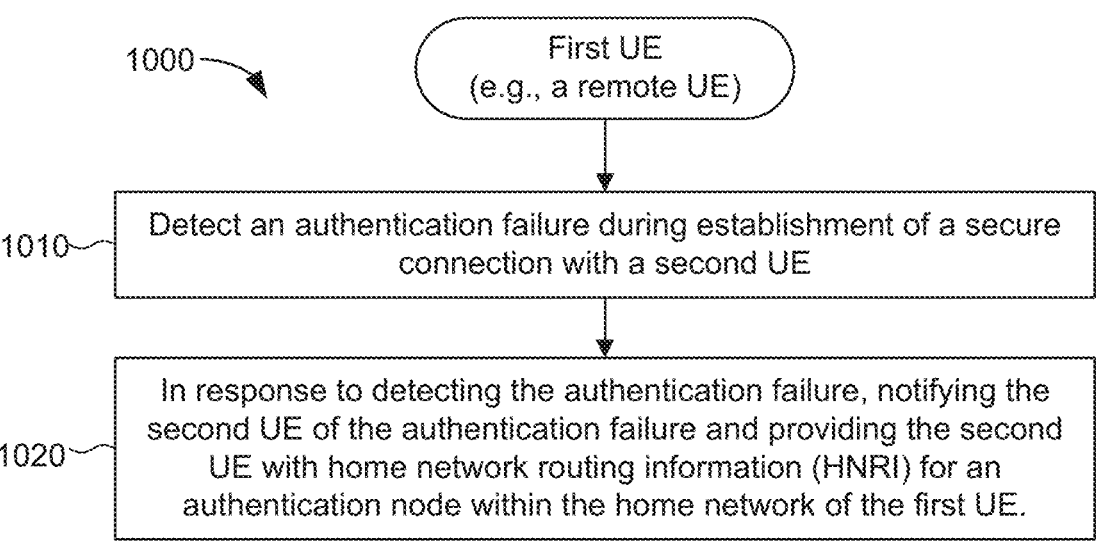

1000

First UE
(e.g., a remote UE)

1010  Detect an authentication failure during establishment of a secure connection with a second UE 1020  In response to detecting the authentication failure, notifying the second UE of the authentication failure and providing the second UE with home network routing information (HNRI) for an authentication node within the home network of the first UE.

*FIG. 10*

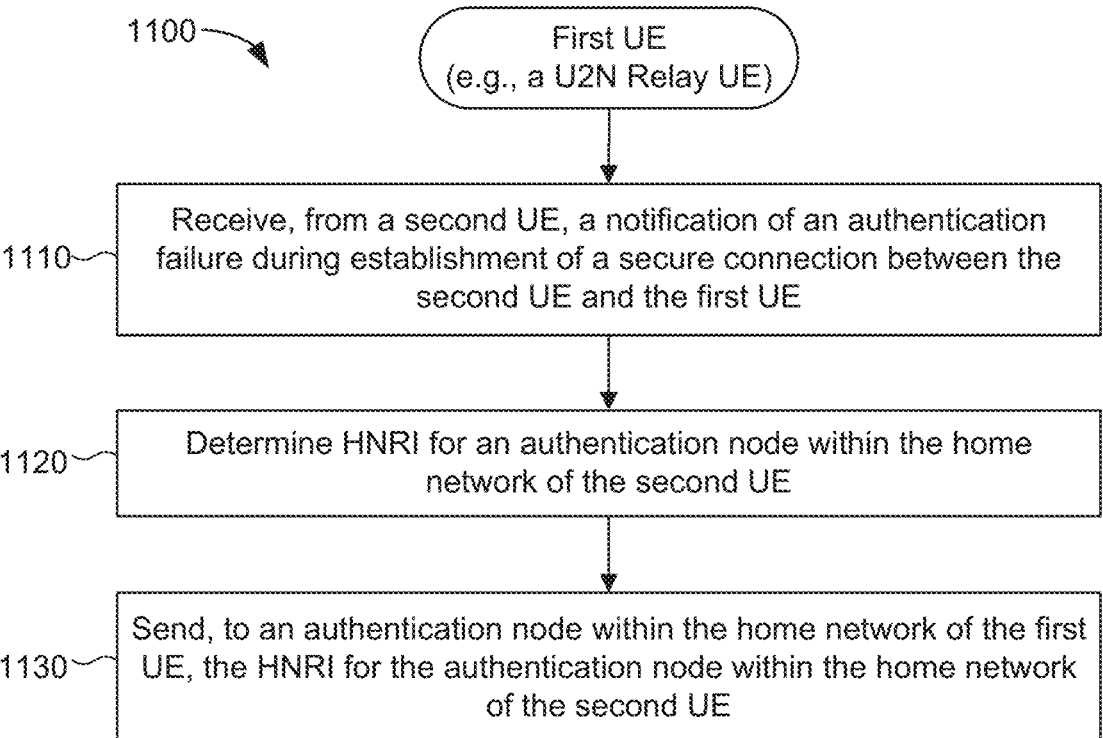

1100

First UE
(e.g., a U2N Relay UE)

1110  Receive, from a second UE, a notification of an authentication failure during establishment of a secure connection between the second UE and the first UE 1120  Determine HNRI for an authentication node within the home network of the second UE 1130  Send, to an authentication node within the home network of the first UE, the HNRI for the authentication node within the home network of the second UE

*FIG. 11*

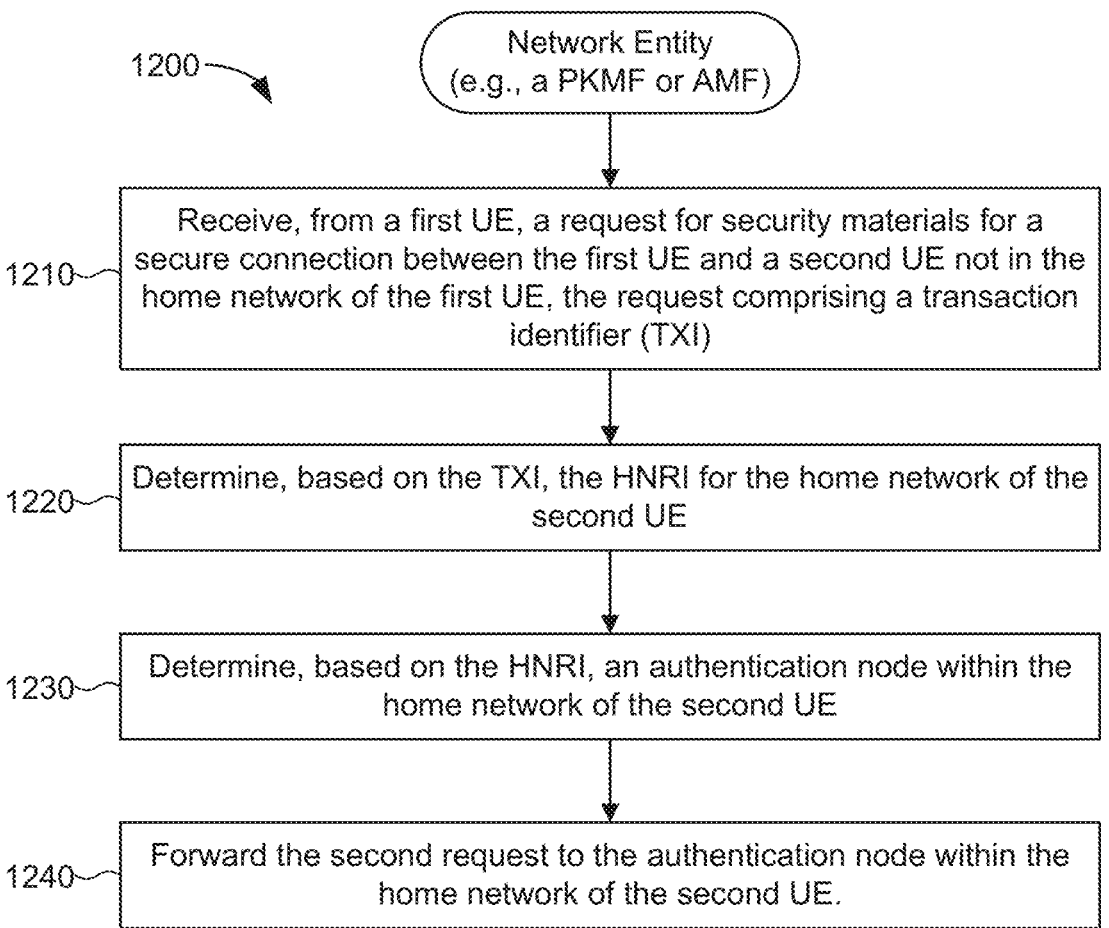

1200

1210 — Receive, from a first UE, a request for security materials for a secure connection between the first UE and a second UE not in the home network of the first UE, the request comprising a transaction identifier (TXI)

1220 — Determine, based on the TXI, the HNRI for the home network of the second UE 1230 — Determine, based on the HNRI, an authentication node within the home network of the second UE 1240 — Forward the second request to the authentication node within the home network of the second UE.

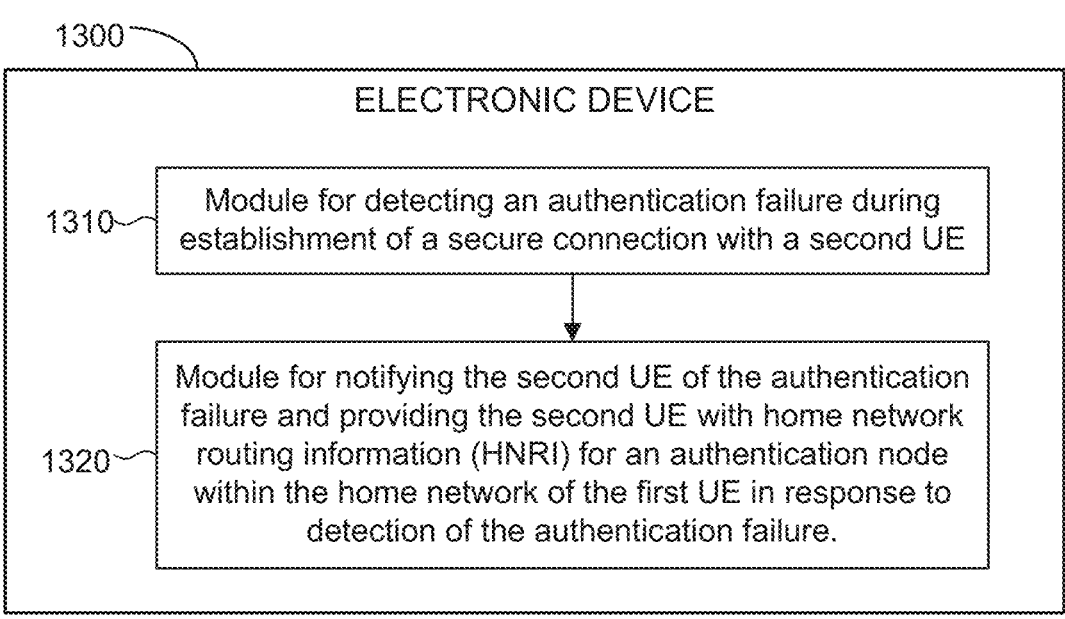

ELECTRONIC DEVICE

1310 — Module for detecting an authentication failure during establishment of a secure connection with a second UE 1320 — Module for notifying the second UE of the authentication failure and providing the second UE with home network routing information (HNRI) for an authentication node within the home network of the first UE in response to detection of the authentication failure.

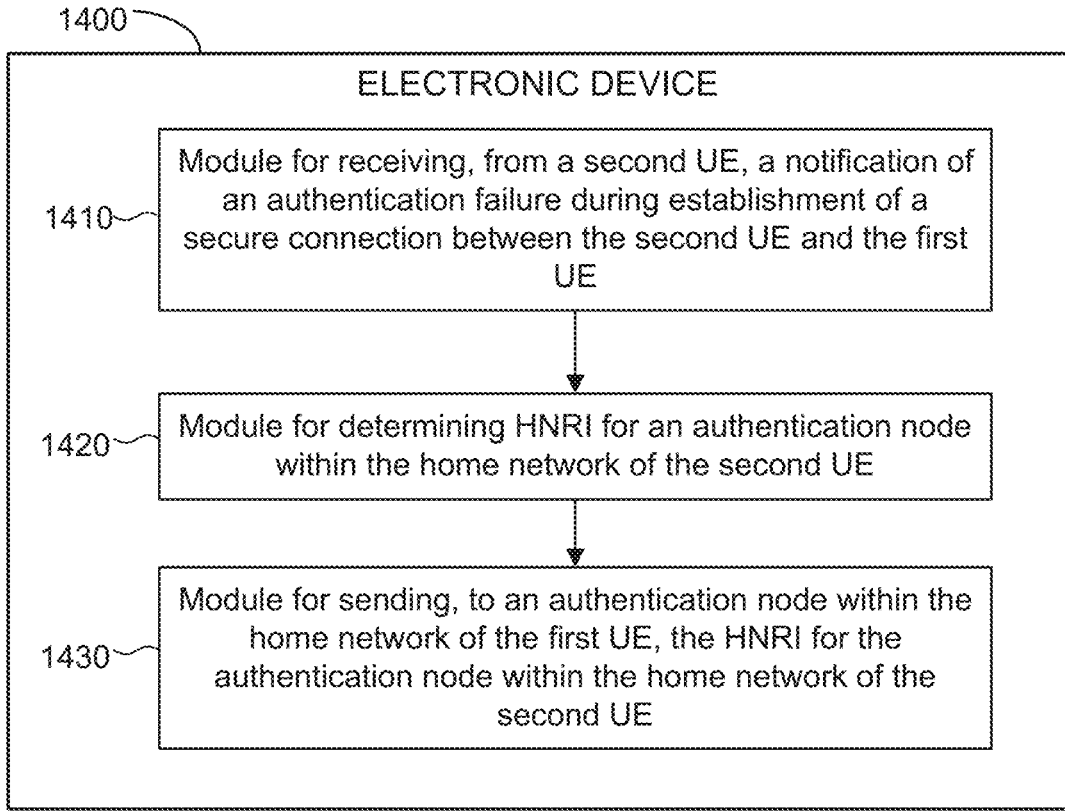

ELECTRONIC DEVICE

1410 — Module for receiving, from a second UE, a notification of an authentication failure during establishment of a secure connection between the second UE and the first UE 1420 — Module for determining HNRI for an authentication node within the home network of the second UE 1430 — Module for sending, to an authentication node within the home network of the first UE, the HNRI for the authentication node within the home network of the second UE

*FIG. 14*

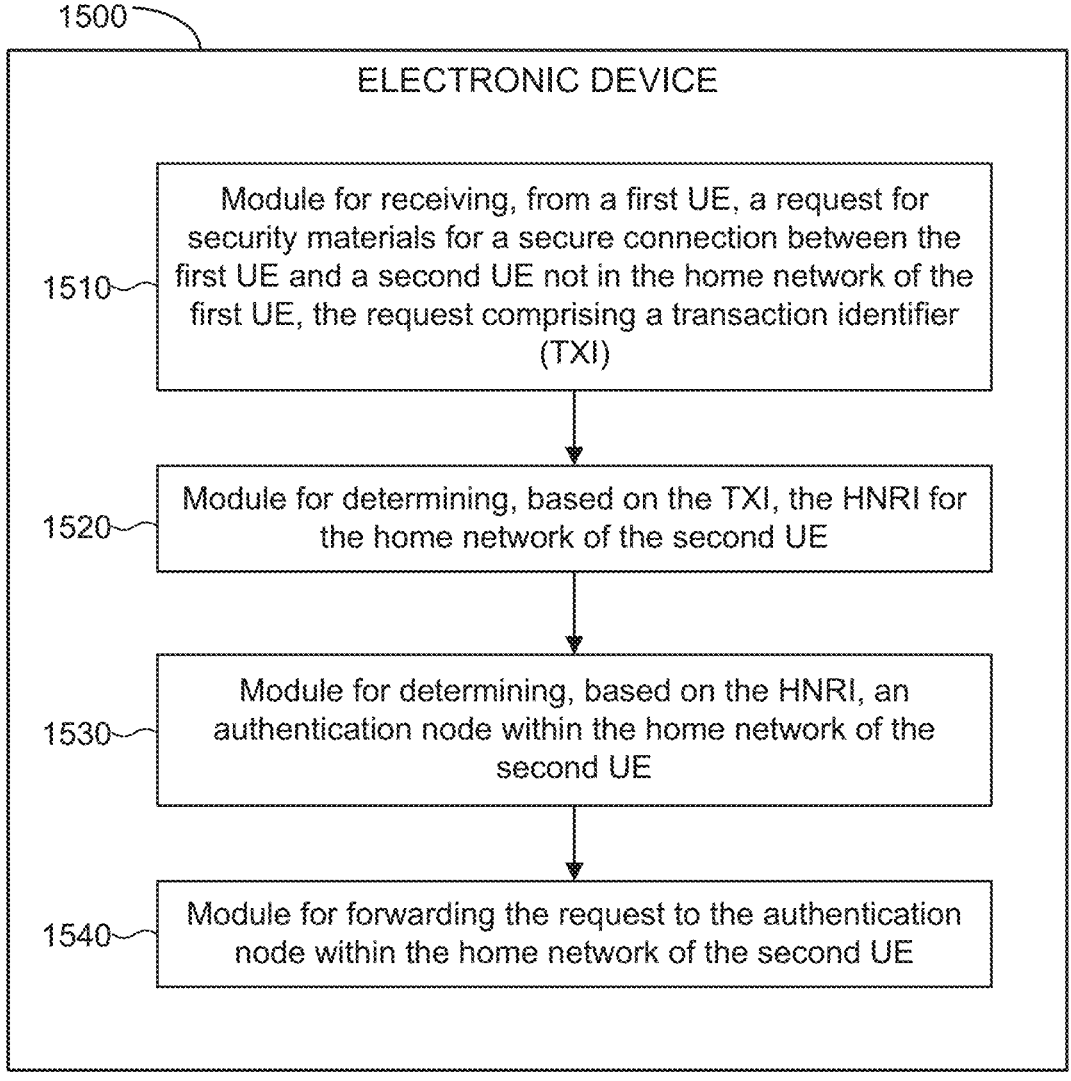

1500

ELECTRONIC DEVICE

1510 — Module for receiving, from a first UE, a request for security materials for a secure connection between the first UE and a second UE not in the home network of the first UE, the request comprising a transaction identifier (TXI)

1520 — Module for determining, based on the TXI, the HNRI for the home network of the second UE 1530 — Module for determining, based on the HNRI, an authentication node within the home network of the second UE 1540 — Module for forwarding the request to the authentication node within the home network of the second UE

*FIG. 15*

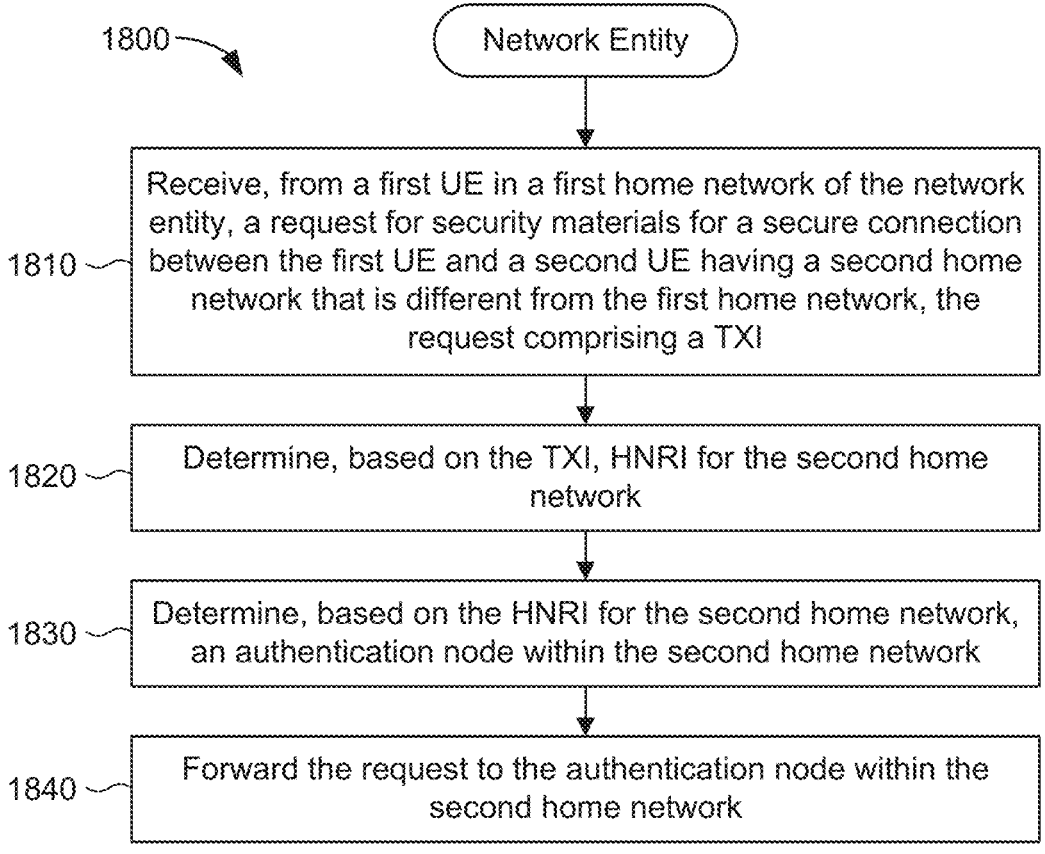

1800 —

Network Entity

1810 — Receive, from a first UE in a first home network of the network entity, a request for security materials for a secure connection between the first UE and a second UE having a second home network that is different from the first home network, the request comprising a TXI 1820 — Determine, based on the TXI, HNRI for the second home network 1830 — Determine, based on the HNRI for the second home network, an authentication node within the second home network 1840 — Forward the request to the authentication node within the second home network

*FIG. 18*

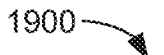
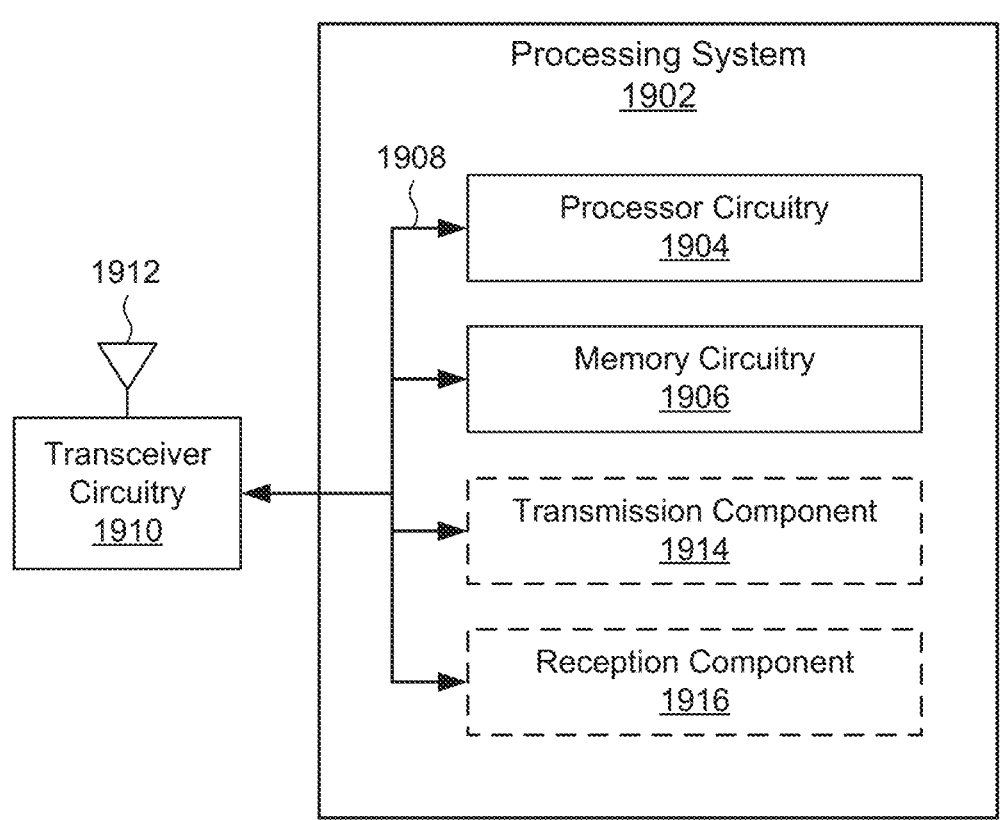
*FIG. 19*

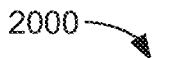
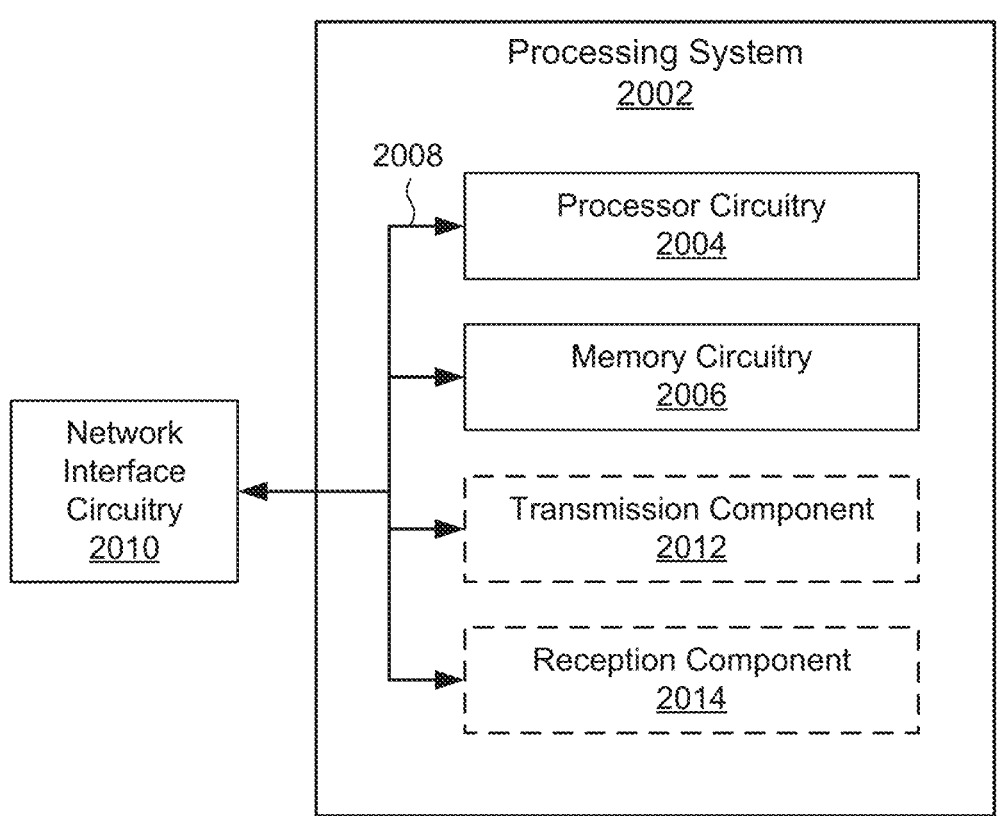
*FIG. 20*

METHODS AND SYSTEMS FOR PROVIDING HOME NETWORK ROUTING INFORMATION OF REMOTE USER EQUIPMENT (UE) FOLLOWING AUTHENTICATION FAILURE DURING ESTABLISHMENT OF UE-TO-NETWORK (U2N) RELAY COMMUNICATION

CROSS-REFERENCE TO RELATED APPLICATION

This application claims priority to U.S. Provisional Patent Application No. 63/370,639, filed Aug. 5, 2022, entitled "METHODS AND SYSTEMS FOR PROVIDING HOME NETWORK ROUTING INFORMATION OF REMOTE USER EQUIPMENT (UE) FOLLOWING AUTHENTICATION FAILURE DURING ESTABLISHMENT OF UE-TO-NETWORK (U2N) RELAY COMMUNICATION," which is assigned to the assignee hereof and is expressly incorporated herein by reference in its entirety.

INTRODUCTION

Aspects of the disclosure relate generally to wireless communications, and more specifically relate to communications between network nodes within a home network of a remote user equipment (UE) and network nodes within a home network of a UE-to-network (U2N) relay UE.

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for wireless communication at a first user equipment (UE) includes sending, in response to an authentication failure during establishment of a secure connection with a second UE, a notification of the authentication failure to the second UE; and providing the second UE with home network routing information (HNRI) for an authentication node within a home network of the first UE.

In an aspect, a method for wireless communication at a first UE includes receiving, from a second UE, a notification of an authentication failure during establishment of a secure connection between the second UE and the first UE; receiving, from the second UE, HNRI for a first authentication node within a home network of the second UE; and sending the HNRI for the first authentication node within the home network of the second UE to a second authentication node within a home network of the first UE.

In an aspect, a method for wireless communication at a network entity includes receiving, from a first UE in a first home network of the network entity, a request for security materials for a secure connection between the first UE and a second UE having a second home network that is different from the first home network, the request comprising a transaction identifier (TXI); determining, based on the TXI, HNRI for the second home network; determining, based on the HNRI for the second home network, an authentication node within the second home network; and forwarding the request to the authentication node within the second home network.

In an aspect, an apparatus for wireless communication at a first UE includes one or more memories; and one or more processors coupled to the one or more memories, the one or more processors configured to cause the first UE to: send, in response to an authentication failure during establishment of a secure connection with a second UE, a notification of the authentication failure to the second UE; and provide the second UE with HNRI for an authentication node within a home network of the first UE.

In an aspect, an apparatus for wireless communication at a first UE includes one or more memories; and one or more processors coupled to the one or more memories, the one or more processors configured to cause the first UE to: receive, from a second UE, a notification of an authentication failure during establishment of a secure connection between the second UE and the first UE; receive, from the second UE, HNRI for a first authentication node within a home network of the second UE; and send the HNRI for the first authentication node within the home network of the second UE to a second authentication node within a home network of the first UE.

In an aspect, an apparatus for wireless communication at a network entity includes one or more memories; and one or more processors coupled to the one or more memories, the one or more processors configured to cause the network entity to: receive, from a first UE in a first home network of the network entity, a request for security materials for a secure connection between the first UE and a second UE having a second home network that is different from the first home network, the request comprising a TXI; determine, based on the TXI, HNRI for the second home network; determine, based on the HNRI for the second home network, an authentication node within the second home network; and forward the request to the authentication node within the second home network.

In an aspect, a method of wireless communication performed at a first UE includes detecting an authentication failure during establishment of a secure connection with a second UE, and, in response to detecting the authentication failure, sending a notification of the authentication failure to the second UE and providing the second UE with HNRI for an authentication node within the home network of the first UE.

In an aspect, a method of wireless communication performed at a first UE includes receiving, from a second UE, a notification of an authentication failure during establishment of a secure connection between the second UE and the first UE, determining HNRI for an authentication node within the home network of the second UE, and sending, to an authentication node within the home network of the first UE, the HNRI for the authentication node within the home network of the second UE.

In an aspect, a method of wireless communication includes, at a network entity, receiving, from a first UE in a home network of the network entity, a request for security materials for a secure connection between the first UE and a second UE not in the home network of the first UE, the request comprising a TXI, determining, based on the TXI, the HNRI for the home network of the second UE, determining, based on the HNRI, an authentication node within the home network of the second UE, and forwarding the request to the authentication node within the home network of the second UE.

In an aspect, a first UE includes a memory and at least one processor coupled to the memory, the memory and the at least one processor configured to detect an authentication failure during establishment of a secure connection with a second UE, and, in response to detecting the authentication failure, send a notification of the authentication failure to the second UE and provide the second UE with HNRI for an authentication node within the home network of the first UE.

In an aspect, a first UE includes a memory and at least one processor coupled to the memory, the memory and the at least one processor configured to receive, from a second UE, a notification of an authentication failure during establishment of a secure connection between the second UE and the first UE, determine HNRI for an authentication node within the home network of the second UE, and send, to an authentication node within the home network of the first UE, the HNRI for the authentication node within the home network of the second UE.

In an aspect, a network entity includes a memory and at least one processor coupled to the memory, the memory and the at least one processor configured to receive, from a first UE in a home network of the network entity, a request for security materials for a secure connection between the first UE and a second UE not in the home network of the first UE, the request comprising a TXI, determine, based on the TXI, the HNRI for the home network of the second UE, determine, based on the HNRI, an authentication node within the home network of the second UE, and forward the request to the authentication node within the home network of the second UE.

In an aspect, a first UE includes means for detecting an authentication failure during establishment of a secure connection with a second UE and means for, in response to detecting the authentication failure, sending a notification of the authentication failure to the second UE and providing the second UE with HNRI for an authentication node within the home network of the first UE.

In an aspect, a first UE includes means for receiving, from a second UE, a notification of an authentication failure during establishment of a secure connection between the second UE and the first UE, means for determining HNRI for an authentication node within the home network of the second UE, and means for sending, to an authentication node within the home network of the first UE, the HNRI for the authentication node within the home network of the second UE.

In an aspect, a network entity includes means for receiving, from a first UE in a home network of the network entity, a request for security materials for a secure connection between the first UE and a second UE not in the home network of the first UE, the request comprising a TXI, means for determining, based on the TXI, the HNRI for the home network of the second UE, means for determining, based on the HNRI, an authentication node within the home network of the second UE, and means for forwarding the request to the authentication node within the home network of the second UE.

In an aspect, a non-transitory computer-readable medium storing at least one computer-executable instruction that, when executed by a first UE, causes the first UE to: detect an authentication failure during establishment of a secure connection with a second UE, and in response to detecting the authentication failure, send a notification of the authentication failure to the second UE, and provide the second UE with HNRI for an authentication node within the home network of the first UE.

In an aspect, a non-transitory computer-readable medium storing at least one computer-executable instruction that, when executed by a first UE, causes the first UE to: receive, from a second UE, a notification of an authentication failure during establishment of a secure connection between the second UE and the first UE, determine HNRI for an authentication node within the home network of the second UE, and send, to an authentication node within the home network of the first UE, the HNRI for the authentication node within the home network of the second UE.

In an aspect, a non-transitory computer-readable medium storing at least one computer-executable instruction that, when executed by a network entity, causes the network entity to: receive, from a first UE in a home network of the network entity, a request for security materials for a secure connection between the first UE and a second UE not in the home network of the first UE, the request comprising a TXI, determine, based on the TXI, the HNRI for the home network of the second UE, determine, based on the HNRI, an authentication node within the home network of the second UE, and forward the request to the authentication node within the home network of the second UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 10 is a flowchart of an example process, performed by a remote UE, associated with methods and systems for providing HNRI of the remote UE following authentication failure during establishment of U2N relay communication with a relay UE, according to aspects of the disclosure.

FIG. 11 is a flowchart of an example process, performed by a U2N relay UE, associated with methods and systems for providing HNRI of a remote UE following authentication failure during establishment of U2N relay communication with the remote UE, according to aspects of the disclosure.

FIG. 12 is a flowchart of an example process, performed by a network node, associated with methods and systems for providing HNRI of a remote UE following authentication failure during establishment of U2N relay communication between the remote UE and a relay UE, according to aspects of the disclosure.

FIG. 13, FIG. 14, and FIG. 15 are simplified block diagrams of several sample aspects of an electronic device configured to support providing HNRI of a remote UE following authentication failure during establishment of U2N relay communication between the remote UE and a relay UE, according to aspects of the disclosure.

FIG. 18 is a flowchart of another example process, performed by a network node, associated with methods and systems for providing HNRI of a remote UE following authentication failure during establishment of U2N relay communication between the remote UE and a relay UE, according to aspects of the disclosure.

FIG. 19 and FIG. 20 are simplified block diagrams of several sample aspects of an electronic device configured to support providing HNRI of a remote UE following authentication failure during establishment of U2N relay communication between the remote UE and a relay UE, according to aspects of the disclosure.

DETAILED DESCRIPTION

Figure 1:
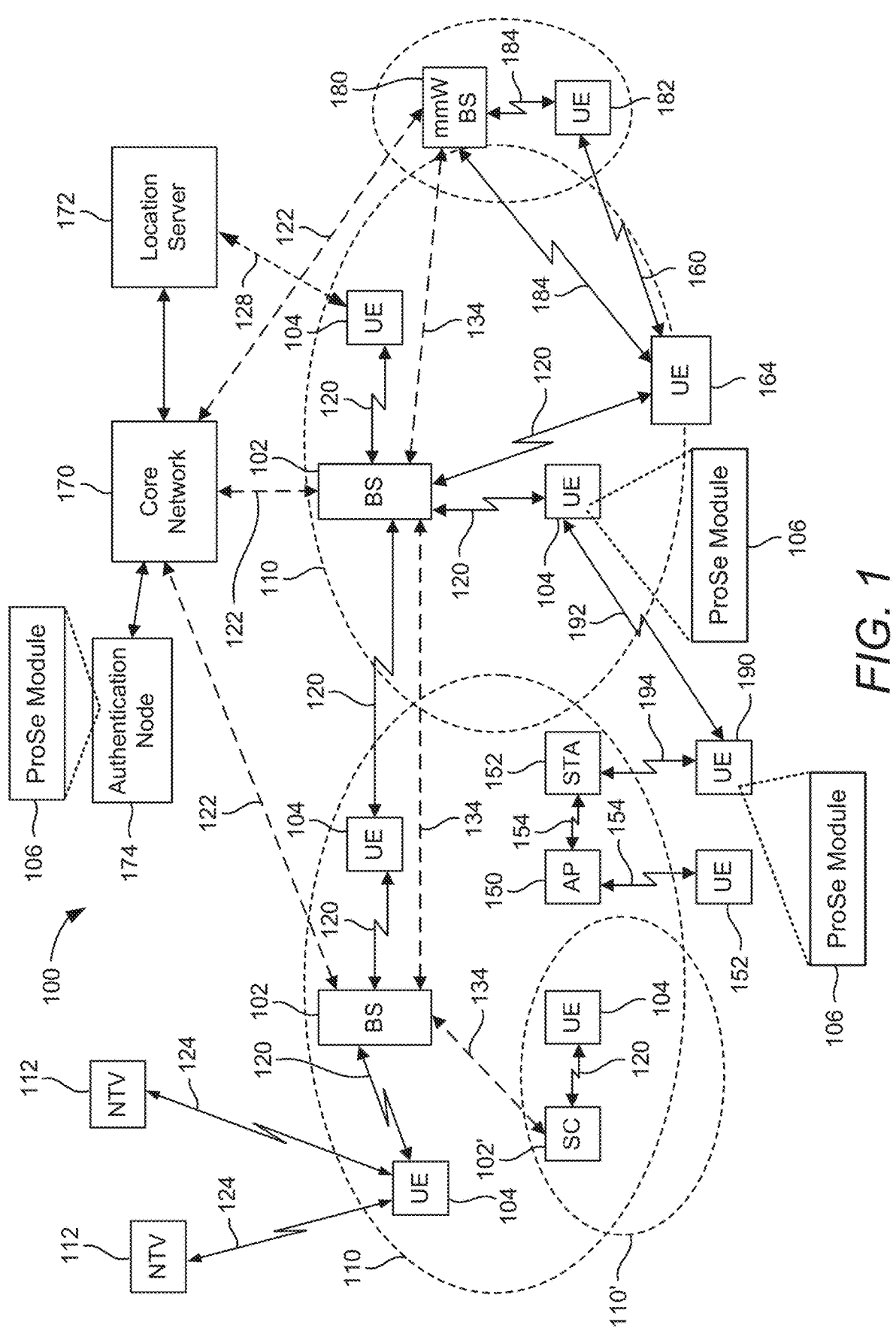
FIG. 1 illustrates an example wireless communications system, according to aspects of the disclosure.

Sidelink communication is communication that occurs between a user equipment (UE) and another UE directly, rather than going through a base station. In some types of sidelink communication, the communication link is established by, or with the help of, a base station, after which the two UEs communicate directly with each other. In other types of sidelink communication, the communication link can be established without the need for, or help from, a base station. In one form of sidelink communication, communication may be established using what are known as proximity services, or "ProSe" for short. Proximity services allow UEs to find and connect to each other, including establishing secure connections between the UEs.

When a first UE also provides a connection into the network for a second UE that is connected to the first UE by a sidelink communication link (whether or not that sidelink communication is a ProSe connection), the first UE is referred to as a UE-to-network (U2N) relay (and may be referred to as a "U2N relay UE", or just a "relay UE"), and the second UE is referred to as a "remote UE" (and may be referred to as a "U2N remote UE"). In this scenario, the remote UE and the relay UE are authenticated and the connection between the remote UE and the relay UE is security protected, using security materials provided by authorization and authentication nodes within the home network of the remote UE and within the home network of the relay UE. Some of these security materials may be associated with a time limit, or "freshness" parameter, such that they are valid only for a limited amount of time, after which they expire and become invalid.

As used herein, the term "security materials" refers to any element or information related to security protection, including information necessary to protect the sending or receiving of messages. Examples of security materials include, but are not limited to, a security key, a key ID, an expiration time, the identity of an algorithm used (such as the chosen PC5 ciphering algorithm, for example), and parameters used by such algorithms (such as code-receiving security parameters or code-sending security parameter, etc.). As used herein, the term "confidentiality protection" as applied to a message refers to protection of that message to prevent unauthorized access to information contained within that message. As used herein, the term "integrity protection" as applied to a message refers to protection of that message to ensure that a message has not been modified since its creation and transmission, and by extension to detect when a message has been modified.

When a remote UE is unable to authenticate the relay, this is referred to herein as a U2N relay UE authentication failure, or simply "the authentication failure". When this authentication fails because the security materials were invalid (e.g., incorrect or had expired), such as when an authentication vector provided to the remote UE by the relay UE is not within a set of one or more expected values—which is referred to as a particular type of authentication failure known as a "synchronization failure"—a remote UE has to give notification of the authentication failure to the entity seeking to be authenticated, in this case the U2N relay UE.

When a synchronization failure occurs, a process called "resynchronization" may be performed to retrieve an updated authentication challenge with which to retry authentication. Resynchronization involves an interaction between a first authentication node, which is an authentication node in the home network of the relay UE (and which may therefore be referred to herein as "the authentication node for the relay UE"), and a second authentication node, which is an authentication node in the home network of the remote UE (and which may therefore be referred to herein as "the authentication node for the remote UE").

When this interaction is initiated by the first authentication node, the first authentication node needs to know how to contact the second authentication node, i.e., the first authentication node needs to know the home network routing information (HNRI) (e.g., the network address of the home network or other network identifier) for the second authentication node.

How the first authentication node comes to possess this network address or network identifier for home network of the second authentication node is not specified by existing telecommunications standards, and the message which the first authentication node receives to trigger the resynchronization process does not contain any HNRI for the second authentication node, and so the source of this information, and the mechanism by which the information gets to the first authentication node, is undefined.

To address this ambiguity, methods and systems for providing HNRI of the authentication node for the remote UE (which may be referred to hereinafter simply as "the HNRI") to an authentication node for the relay UE following authentication failure during establishment of U2N relay communication between the remote UE and the relay UE are herein disclosed.

According to aspects of the disclosure, the HNRI of the authentication node for the remote UE is provided to the authentication node for the relay UE, either by the remote UE, by the relay UE, or from being stored by the authentication node for the relay UE from a previous interaction involving the remote UE. With this information, the authentication node for the relay UE can interact with the authentication node for the remote UE, e.g., to provide an updated authentication challenge to be used for authentication of the secure connection between the remote UE and the relay UE and/or the secure connection between the remote UE and the network to which the relay UE gives the remote UE access, such as the resynchronization procedure mentioned above. Thus, the techniques disclosed herein provide an established procedure by which the authentication node for the relay UE acquires the HNRI of the authentication node for the remote UE.

Regarding how the relay UE obtains the HNRI of the authentication node for the remote UE, which the relay UE provides to the authentication node for the relay UE, there are a number of approaches described herein:

In some aspects, the remote UE provides the HNRI as part of the message that the remote UE sends to the relay UE to notify the relay UE that the remote UE failed to authenticate the relay UE (which may be referred to herein as "the authentication failure message").

In some aspects, the remote UE provides the HNRI in an additional message that the remote UE sends to the relay UE separately from the authentication failure message.

In some aspects, the remote UE will have previously provided the HNRI to the relay UE as part of a direct communication request, and the relay UE will have stored the HNRI; when the relay UE later receives the authentication failure message, the relay UE can fetch the previously stored HNRI.

In some aspects, the remote UE will have previously provided the HNRI to the relay UE as part of a direct communication request, and at that time the relay UE will generate and store a transaction identifier (TXI) in response to receiving a direct communication request from the remote UE and provide both the HNRI and the TXI to the authentication node for the relay UE. The authentication node for the relay UE stores a mapping of the TXI to the HNRI. When the relay UE later receives the authentication failure message, the relay UE provides the TXI to the authentication node for the relay UE, which uses the TXI to look up the correct HNRI.

Sidelink communication between a user equipment (UE) and another UE can be established without the need for, or help from, a base station, using what are known as proximity services, or "ProSe" for short. Proximity services allow UEs to find, and connect to, each other, including establishing secure connections between the UEs. When a first UE also provides a connection into the network for a second UE, the first UE is referred to as a UE-to-network (U2N) relay (and may be referred to as a "U2N relay UE", or just a "relay UE"), and the second UE is referred to as a "remote UE." In this scenario, the remote UE and the relay UE must be authenticated and the connection between the remote UE and the relay UE must be security protected, using security materials provided by authorization and authentication nodes within the home network of the remote UE and within the home network of the relay UE.

When an authentication step fails, e.g., because the security materials were invalid or had expired, a remote UE has to give notification of the authentication failure. One example of such a process when synchronization failure happens is called "resynchronization". Resynchronization is performed to retrieve an updated authentication challenge with which to retry authentication. Resynchronization involves an interaction between a first authentication node in the home network of the relay UE and a second authentication node in the home network of the remote UE. When this interaction is initiated by the first authentication node, the first authentication node needs to know how to contact the second authentication node, i.e., the first authentication node needs to know the home network routing information (HNRI) (e.g., the address of the home network or other network identifier) for the second authentication node. Exactly how the first authentication node comes to possess this network address or network identifier for home network of the second authentication node is not specified by existing telecommunications standards, and the message which the first authentication node receives to trigger the resynchronization process does not contain any HNRI for the second authentication node.

To address this ambiguity, methods and systems for providing HNRI of a remote UE following authentication failure during establishment of U2N relay communication between the remote UE and a relay UE are herein disclosed. In some aspects, a first UE (e.g., the remote UE) may detect an authentication failure during establishment of a secure connection with a second UE (e.g., the relay UE), and, in response to detecting the authentication failure, notifies the second UE of the authentication failure. The second UE then signals a second authentication node within the home network of the second UE. The HNRI of a first authentication node within the home network of the first UE is provided to the second authentication node, either by the first UE, by the second UE, or from being stored by the second authentication node from a previous interaction involving the first UE, so that the second authentication node can interact with the first authentication node, e.g., to provide an updated authentication challenge to be used for authentication of the secure connection between the remote UE and the relay UE and/or the secure connection between the remote UE and the network to which the relay UE gives the remote UE access.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc. Some UEs 104 may operate as relay UEs for other UEs 104. In some aspects, a UE 104 may include a proximity services (ProSe) Module 106 for managing some aspects of ProSe communication between UEs.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity. The core network 170 may include an authentication node 174, such as an access and mobility management function (AMF), an authentication server function (AUSF), or a ProSe key management function (PKMF), which may also include a ProSe module 106.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen-before-talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more non-terrestrial vehicles (NTVs) 112, which may include earth orbiting space vehicles (e.g., satellites), as well as unmanned aerial vehicles (UAVs). In an aspect, the NTVs 112 may be part of a satellite positioning system that a UE 104 can use as an independent source of location information. A satellite positioning system typically includes a system of transmitters (e.g., NTVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in NTVs 112, transmitters may sometimes be located on ground-based control stations, base stations 102, and/or other UEs 104. A UE 104 may include one or more dedicated receivers specifically designed to receive signals 124 for deriving geo location information from the NTVs 112.

In a satellite positioning system, the use of signals 124 can be augmented by various satellite-based augmentation systems (SBAS) that may be associated with or otherwise enabled for use with one or more global and/or regional navigation satellite systems. For example, an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, NTVs 112 may additionally or alternatively be part of one or more non-terrestrial networks (NTNs). In an NTN, an NTV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an NTV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
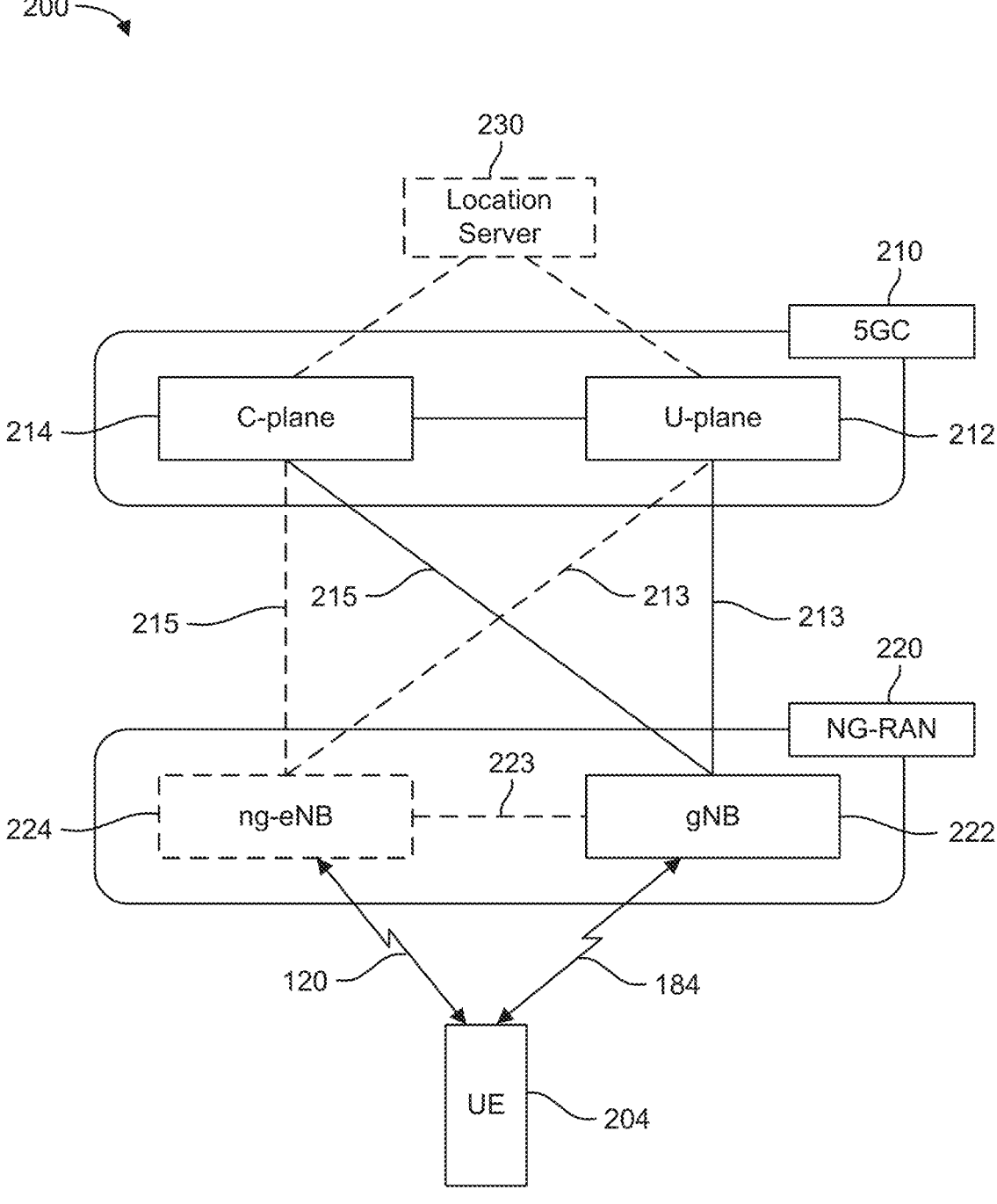
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNB s 224 and gNB s 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
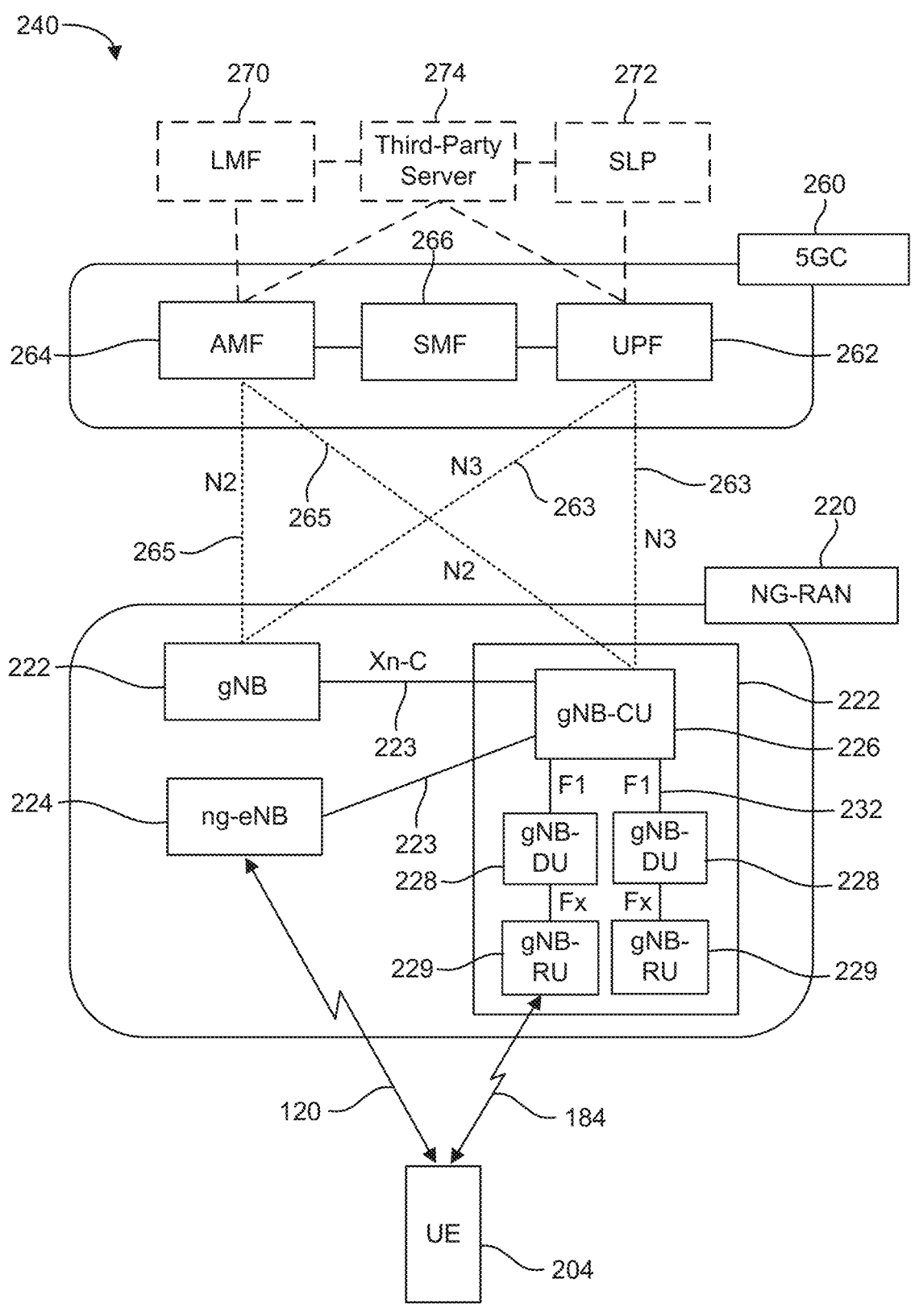

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
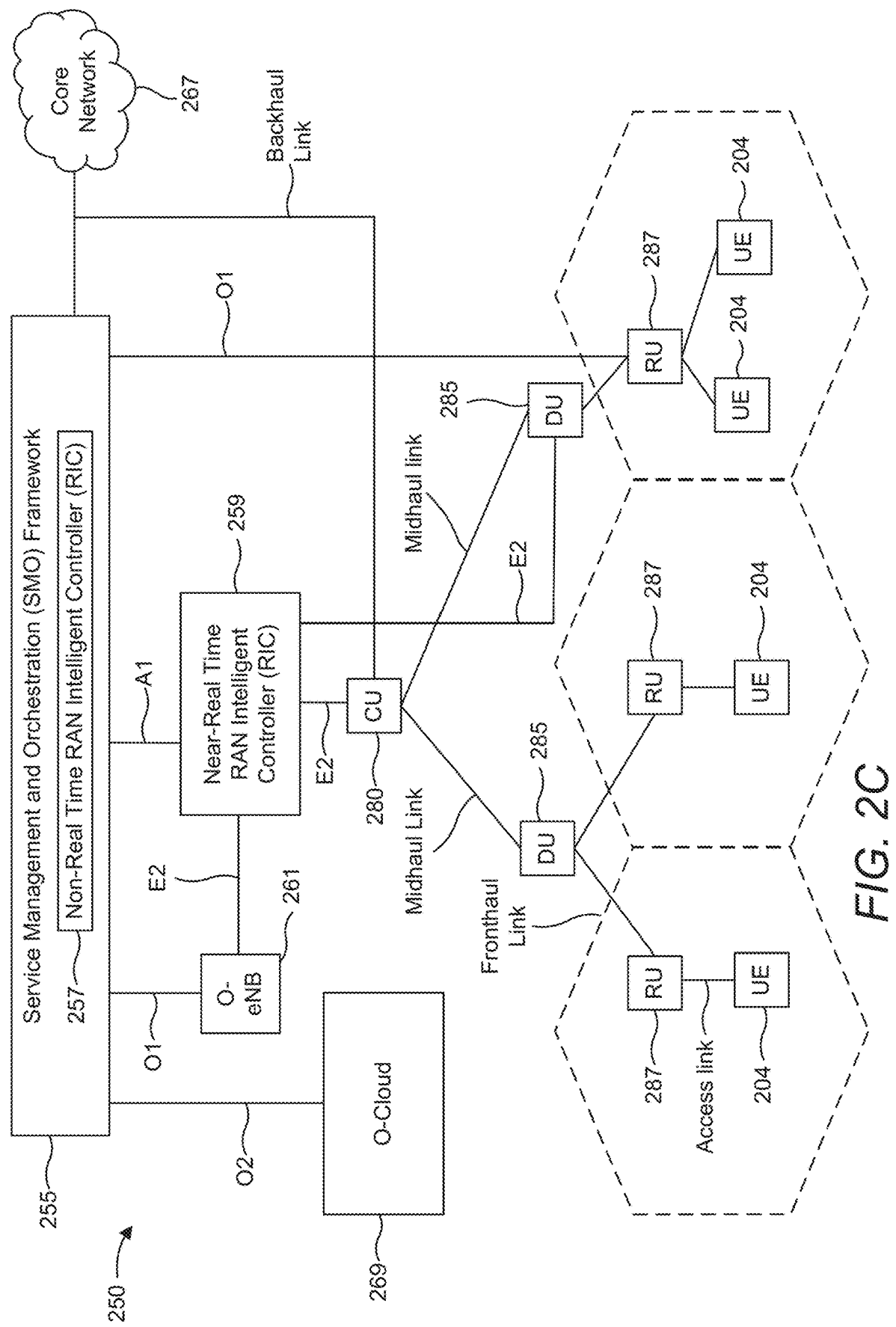

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more distributed units (DUs) 285 (e.g., gNB-DUs 228) via respective midhaul links, such as an F1 interface. The DUs 285 may communicate with one or more radio units (RUs) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUs 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 280 may host one or more higher layer control functions. Such control functions can include radio resource control (RRC), PDCP, service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via O1) or via creation of RAN management policies (such as A1 policies).

Figure 3A:
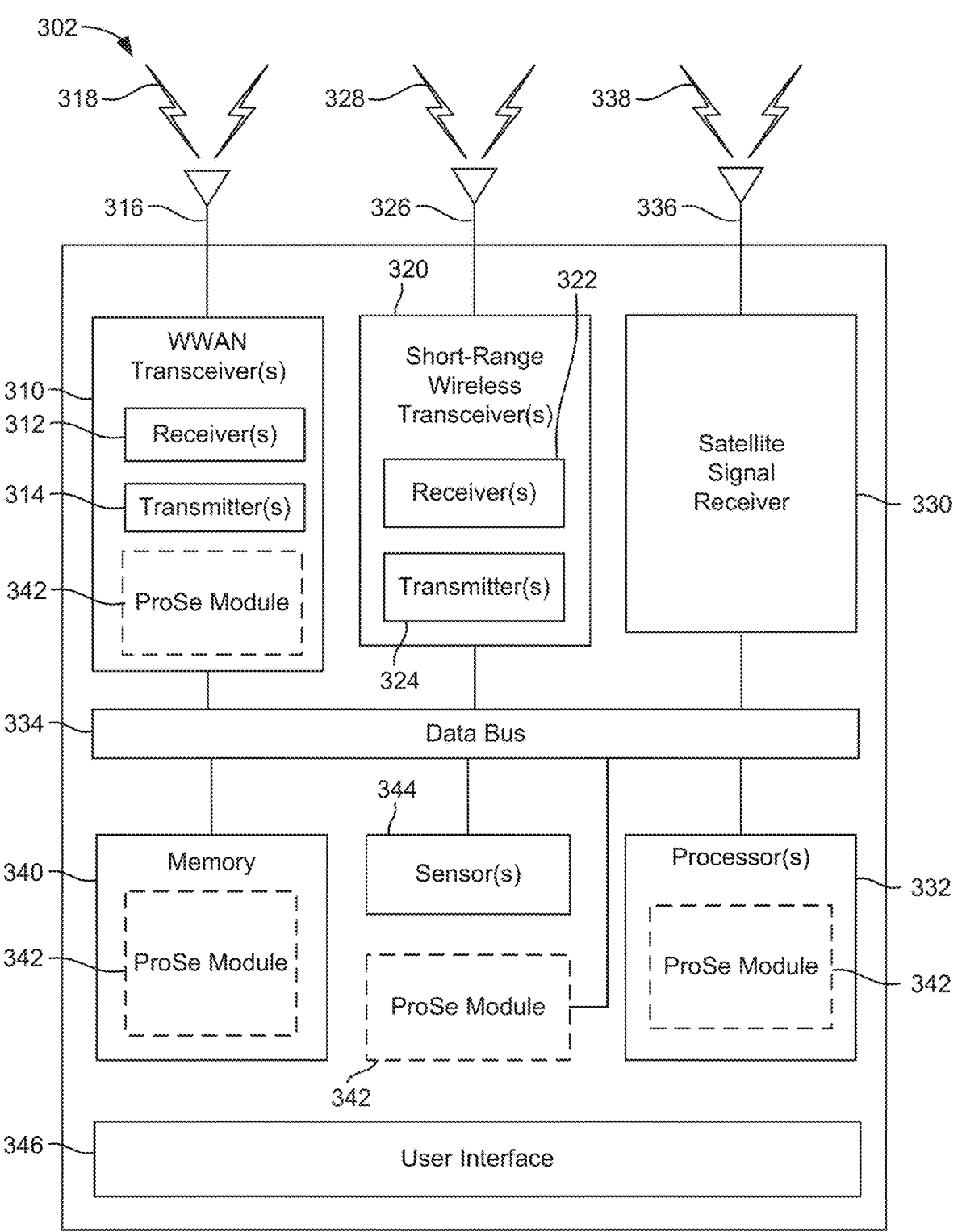
FIGS. 3A, 3B, and 3C are simplified block diagrams of several sample aspects of components that may be employed in a user equipment (UE), a base station, and a network entity, respectively, and configured to support communications as taught herein.
Figure 3B:
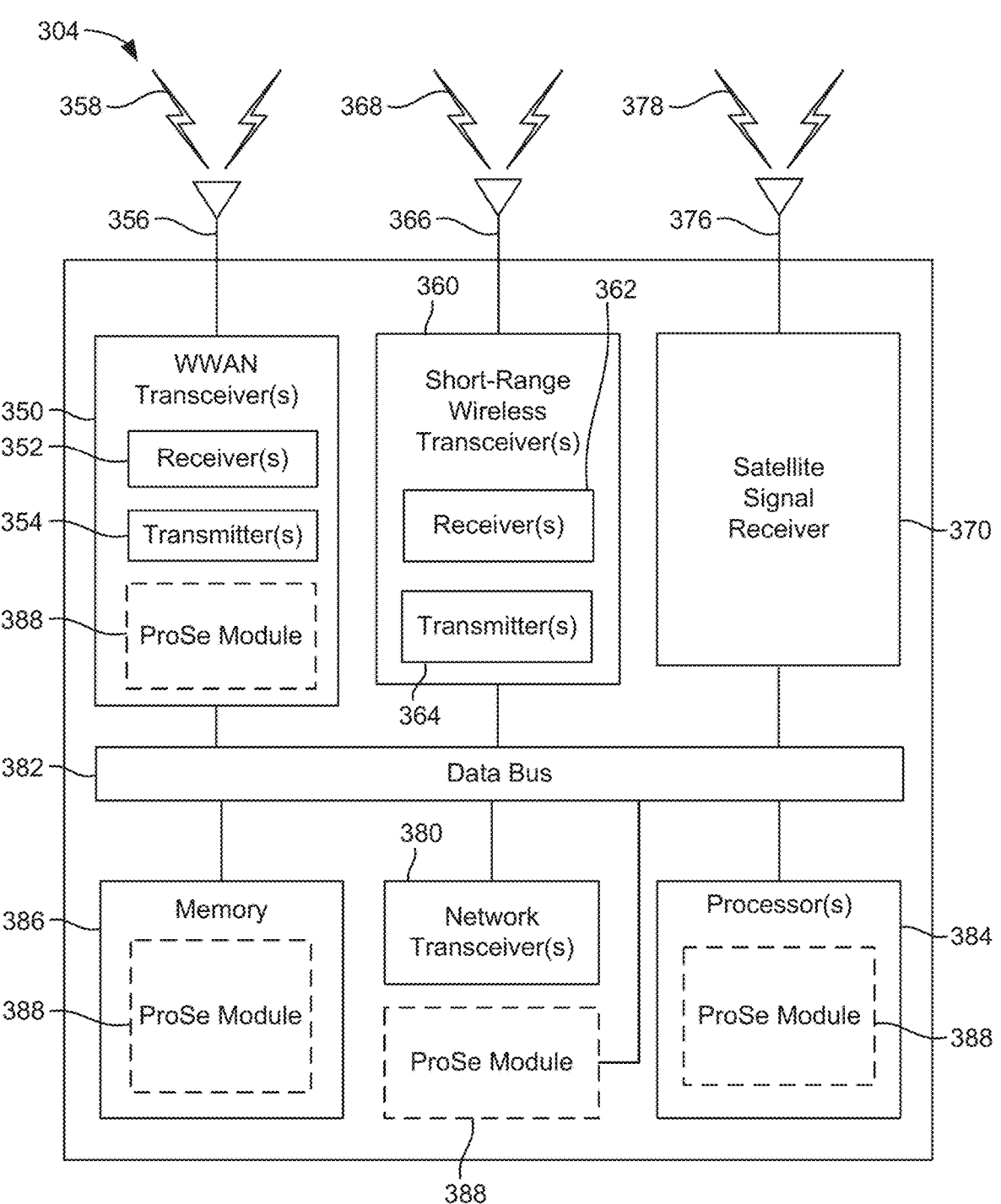
Figure 3C:
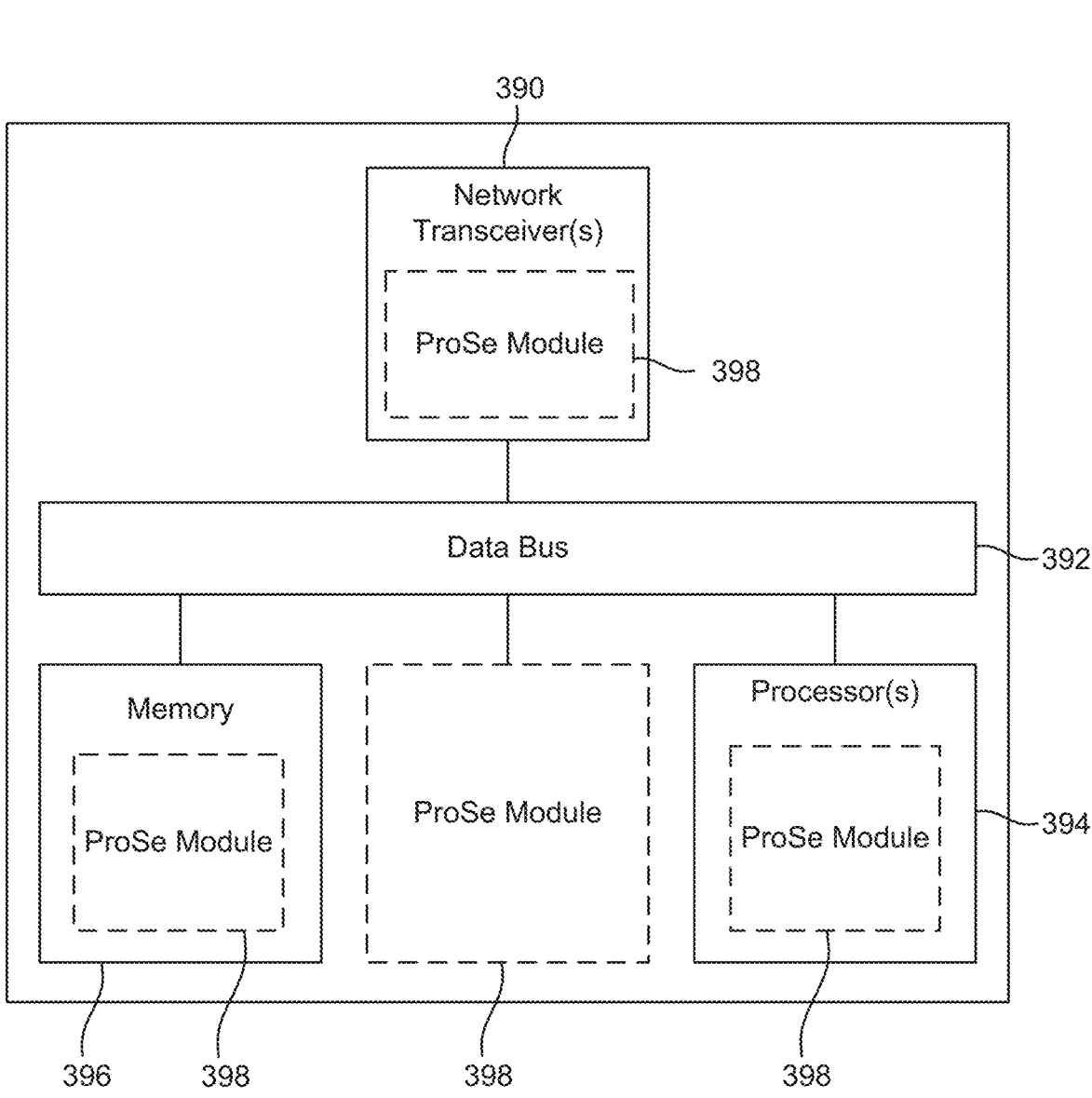

FIGS. 3A, 3B, and 3C illustrate several example components (represented by corresponding blocks) that may be incorporated into a UE 302 (which may correspond to any of the UEs described herein, including the electronic device 1900), a base station 304 (which may correspond to any of the base stations described herein), and a network entity 306 (which may correspond to or embody any of the network functions described herein, including the location server 230 and the LMF 270 as well as electronic device 2000, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality, such as, but not limited to, one or more components of the processing system 1902, transceiver circuitry 1910, and antenna 1912 in FIG. 19, as well as one or more components of the processing system 2002 and network interface circuitry 2010 in FIG. 20. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring signals from NTVs, including, but not limited to, satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include ProSe module 342, 388, and 398, respectively. The ProSe module 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the ProSe module 342, 388, and 398 may be external to the processors 332, 384, and 394 (e.g., part of a modem processing system, integrated with another processing system, etc.). Alternatively, the ProSe module 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the ProSe module 342, which may be, for example, part of the one or more WWAN transceivers 310, the memory 340, the one or more processors 332, or any combination thereof, or may be a standalone component. FIG. 3B illustrates possible locations of the ProSe module 388, which may be, for example, part of the one or more WWAN transceivers 350, the memory 386, the one or more processors 384, or any combination thereof, or may be a standalone component. FIG. 3C illustrates possible locations of the ProSe module 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyro-scope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion informa-tion. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a PDCP layer, a radio link control (RLC) layer, and a medium access control (MAC) layer. The one or more processors 384 may provide RRC layer functionality asso-ciated with broadcasting of system information (e.g., master information block (MIB), system information blocks (SIB s)), RRC connection control (e.g., RRC connection paging, RRC connection establishment, RRC connection modification, and RRC connection release), inter-RAT mobility, and measurement configuration for UE measure-ment reporting; PDCP layer functionality associated with header compression/decompression, security (ciphering, deciphering, integrity protection, integrity verification), and handover support functions; RLC layer functionality asso-ciated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport chan-nels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, map-ping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multi-plexing (OFDM) subcarrier, multiplexed with a reference signal (e.g., pilot) in the time and/or frequency domain, and then combined together using an inverse fast Fourier trans-form (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The trans-mitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The trans-mitter 314 and the receiver 312 implement Layer-1 func-tionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the fre-quency domain using a fast Fourier transform (FFT). The frequency domain signal comprises a separate OFDM sym-bol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the downlink, the one or more processors 332 provides demultiplexing between transport and logical channels, packet reassembly, deciphering, header decompression, and control signal processing to recover IP packets from the core network. The one or more processors 332 are also respon-sible for error detection.

Similar to the functionality described in connection with the downlink transmission by the base station 304, the one or more processors 332 provides RRC layer functionality associated with system information (e.g., MIB, SIB s) acquisition, RRC connections, and measurement reporting; PDCP layer functionality associated with header compres-sion/decompression, and security (ciphering, deciphering, integrity protection, integrity verification); RLC layer func-tionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical chan-nels and transport channels, multiplexing of MAC SDUs onto transport blocks (TB s), demultiplexing of MAC SDUs from TB s, scheduling information reporting, error correc-tion through hybrid automatic repeat request (HARQ), pri-ority handling, and logical channel prioritization.

Channel estimates derived by the channel estimator from a reference signal or feedback transmitted by the base station 304 may be used by the transmitter 314 to select the appropriate coding and modulation schemes, and to facili-tate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability) or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the ProSe module 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Proximity services allow devices in proximity to each other to communicate over a direct wireless link, such as PC5, which is a short-distance direct communication interface between vehicles, vulnerable road users (VRUs), e.g., pedestrians, and roadside equipment. 5G ProSe services and their use cases include, but are not limited to, the following:

5G ProSe Direct Discovery: allows a UE to discover another UE using the same application. Use cases include public safety, social media, and service announcements.

Unicast mode 5G ProSe Direct Communication: allows direct communication between two devices without requiring connection to a cellular or other wireless network. Use cases include interactive gaming between two devices, extended reality (XR) operation between a mobile device and XR glasses, headsets, or wearables, and communication between public safety personnel when a network is down.

5G ProSe Communication via 5G ProSe UE-to-Network (U2N) Relay: allows extension of the ProSe Direct Communication onto a network. Use cases include coverage extension, e.g., to out-of-coverage devices or devices that have very poor connection to the network, for both public safety and commercial use.

According to one or more examples, during ProSe U2N Relay operation, the relay UE processes and/or routes the remote UE network traffic at layer 2 or at layer 3. For layer 3 relays, network traffic is relayed at the PDCP layer or above, and security is enforced in a hop-by-hop security mechanism, using PC5 packet PDCP security between the remote UE and the relay UE, and using Uu PDCP security between the relay UE and the base station. The remote UE does not have end-to-end security with the network. It is noted that the same principles may apply to protocols other than PC5 and may apply to non-ProSe sidelink communications.

According to one or more examples, there are two different security procedures for a UE that is performing a Layer-3 (L3) U2N Relay operation: user-plane (UP) based procedures, and control-plane (CP) based procedures. These UP and CP based procedures enable establishment of a secure link between the remote UE and the relay UE. The network and/or the UE can implement just one or both of these types of procedures. These procedures are described in more detail in FIGS. 4, 5A, and 5B.

Figure 4:
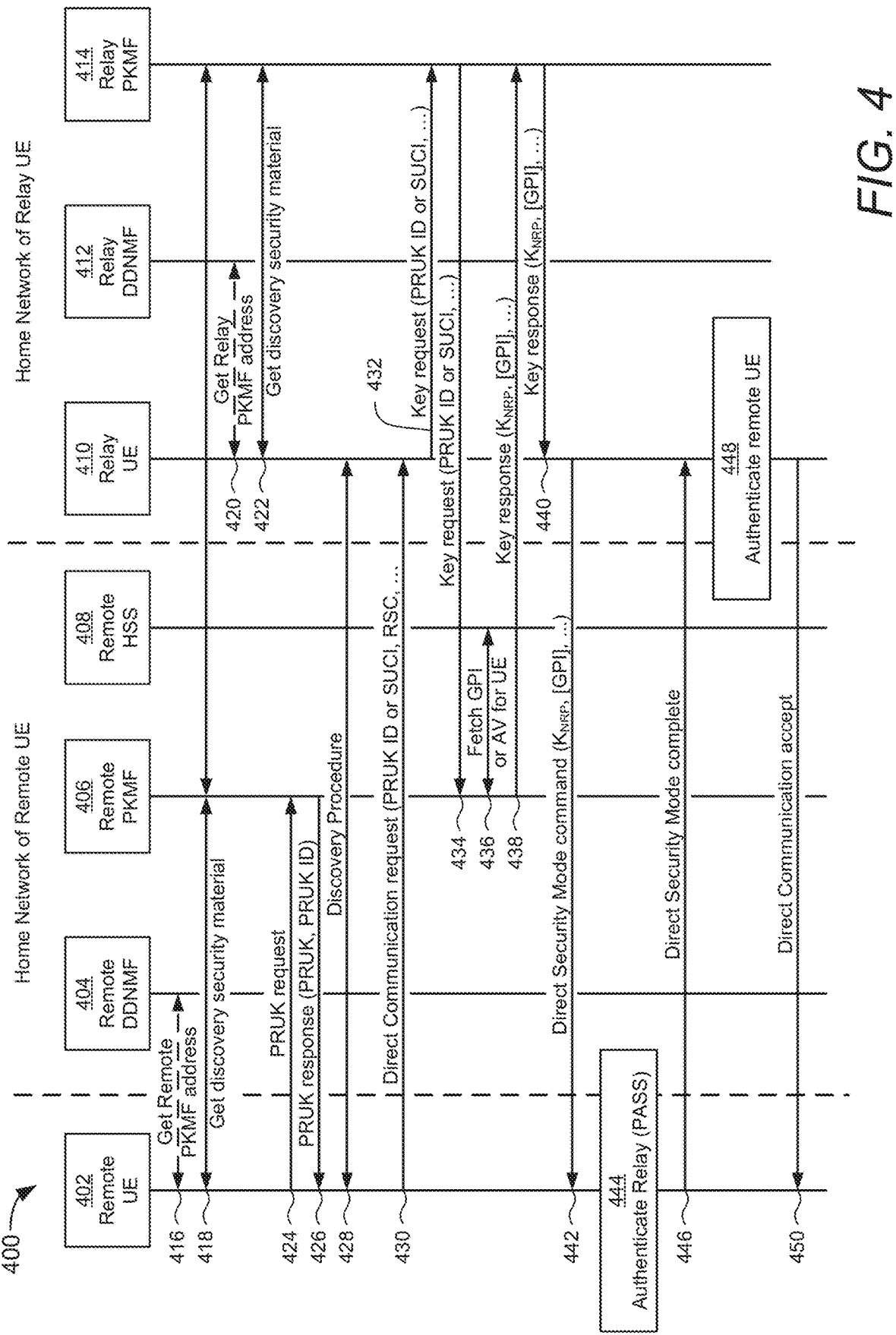
FIG. 4 is a signaling and event diagram illustrating user plane (UP)-based security procedures involving a layer 3 (L3) UE-to-network (U2N) relay.

FIG. 4 is a signaling and event diagram 400 illustrating UP-based security procedures involving an L3 U2N relay. The event diagram 400 illustrates interactions between a remote UE 402, a 5G direct discovery name management function (DDNMF) that serves the remote UE 402 (hereinafter referred to as the "remote DDNMF 404"), a ProSe key management function (PKMF) that serves the remote UE 402 (hereinafter referred to as the "remote PKMF 406"), a home subscriber server (HSS) that serves the remote UE 402 (hereinafter referred to as the "remote HSS 408"), a UE that operates as a U2N relay (hereinafter referred to as the "relay UE 410"), a DDNMF that serves the relay UE 410 (hereinafter referred to as the "relay DDNMF 412"), and a PKMF that serves the relay UE 410 (hereinafter referred to as the "relay PKMF 414"). The remote DDNMF 404, remote PKMF 406, and remote HSS 408 are in the home network of the remote UE 402, and the relay DDNMF 412 and the relay PKMF 414 are in the home network of the relay UE 410.

In the example illustrated in FIG. 4, at 416, the remote UE 402 optionally queries the remote DDNMF 404 to get the address of the remote PKMF 406. At 418, the remote UE 402 gets discovery security materials from the remote PKMF 406. During 418, the remote PKMF 406 may communicate with the relay PKMF 414 as needed, e.g., to get discovery security materials needed by the remote UE 402 for discovering and connecting to the relay UE 410. In some aspects, the remote PKMF 406 is configured or preconfigured to know a potential list of possible PKMFs, including the relay PKMF 412.

In the example illustrated in FIG. 4, at 420, the relay UE 410 optionally queries the relay DDNMF 412 to get the address of the relay PKMF 414. At 422, the relay UE 410 gets discovery material from the relay PKMF 414.

In the example illustrated in FIG. 4, at 424, the remote UE 402 sends a ProSe relay user key (PRUK) request to the remote PKMF 406. At 426, the remote UE 402 receives a PRUK response from the remote PKMF 406. The PRUK response includes the PRUK and the PRUK identifier (PRUK ID). The PRUK is used to derive a key for a secure connection between the remote UE 402 and the relay UE 410, such as a PC5 key. The PRUK is identified by its PRUK ID. In some aspects, the PRUK ID is analogous to a UE ID.

In the example illustrated in FIG. 4, at 428, the remote UE 402 performs a discovery procedure to find the relay UE 410. The remote UE 402 discovers the relay UE 410 based on the restricted discovery procedure.

In the example illustrated in FIG. 4, the remote UE 402 establishes a secure connection with the relay UE. To do this, at 430, the remote UE 402 sends a direct communication request to the relay UE 410 to initiate the connection establishment. In some aspects, the direct communication request includes a relay service code (RSC) and a freshness parameter. The remote UE 402 will first send a direct communication request that includes the PRUK ID that the remote UE 402 received at 426. However, if too much time has elapsed between 426 and 430, that PRUK ID may have expired or may be otherwise invalid. In that circumstance, the remote UE 402 may send a second direct communication request that includes a subscription concealed identifier (SUCI) instead.

Notably, both the PRUK ID and the SUCI include home routing information, such as the home public land mobile network (HPLMN) ID. Thus, after the relay PKMF 414 receives the key request at 432, the relay PKMF 414 can determine the home network of the remote UE 402 from the PRUK ID or SUCI and thus can determine the address of the remote PKMF 406.

The relay UE 410 obtains the PC5 key from the remote PKMF 406 via the relay PKMF 414. In the example illustrated in FIG. 4, at 432, the relay UE 410 forwards the information in the direct communication request to relay PKMF 414, e.g., via a key request. At 434, the relay PKMF 414 forwards the key request to the remote PKMF 406, to check whether the remote UE 402 is authorized to use that service. The remote PKMF 406 will check the PRUK ID or SUCI, RSC, and other parameters received from the remote UE 402. At 436, the remote PKMF 406 queries the remote HSS 408 to fetch generic bootstrapping architecture (GBA) push information (GPI) or an authentication vector (AV) for the remote UE 402. At 438, the remote PKMF 406 sends a key response to the relay PKMF 414, the key response including the PC5 key (KNRP) or other type of key, and optionally also the GPI, e.g., if authentication to the network is required. Thus, the KNRP is used for the secure connection from the remote UE 402 to the relay UE 410, and the GPI is used to authenticate the remote UE 402 to the network to which the relay UE 410 gives the remote UE 402 access. At 440, the relay PKMF 414 forwards the key response to the relay UE 410.

At 442, the relay UE 410 sends a direct security mode command to the remote UE 402, the direct security mode command including the PC5 key and optionally the GPI if authentication is required. If the PRUK ID provided to the relay UE 410 in the direct communication request at 430 was valid (i.e., correct and not expired), the PC5 key provided by the relay UE 410 will also be correct and the relay UE 410 will be successfully authorized at 444, and, at 446, the remote UE 402 will report this by sending a direct security mode complete message to the relay UE 410. At 448, the relay UE 410 will authorize the remote UE 402, and at 450 the relay UE 410 will send a direct communication accept message to the remote UE 402.

If the network determines to refresh the PRUK or if the remote UE 402 does not have a valid PRUK, a new PRUK may be established based on the GPI. This allows the remote UE 402 to authenticate and establish a PC5 key with the network without interaction.

Figure 5A:
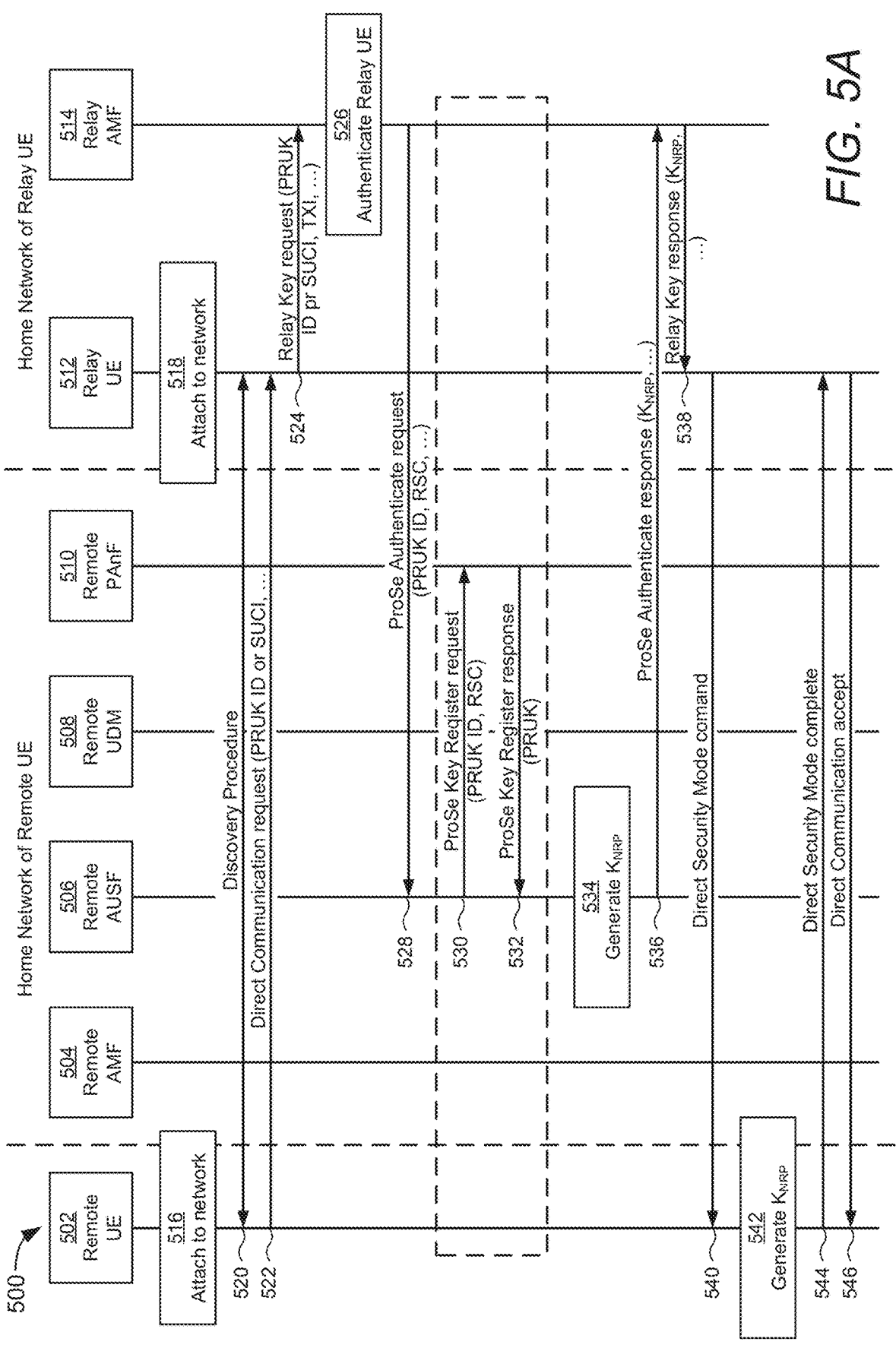
FIG. 5A and FIG. 5B are signaling and event diagrams illustrating portions of a control plane (CP)-based security procedure involving an L3 U2N relay.
Figure 5B:
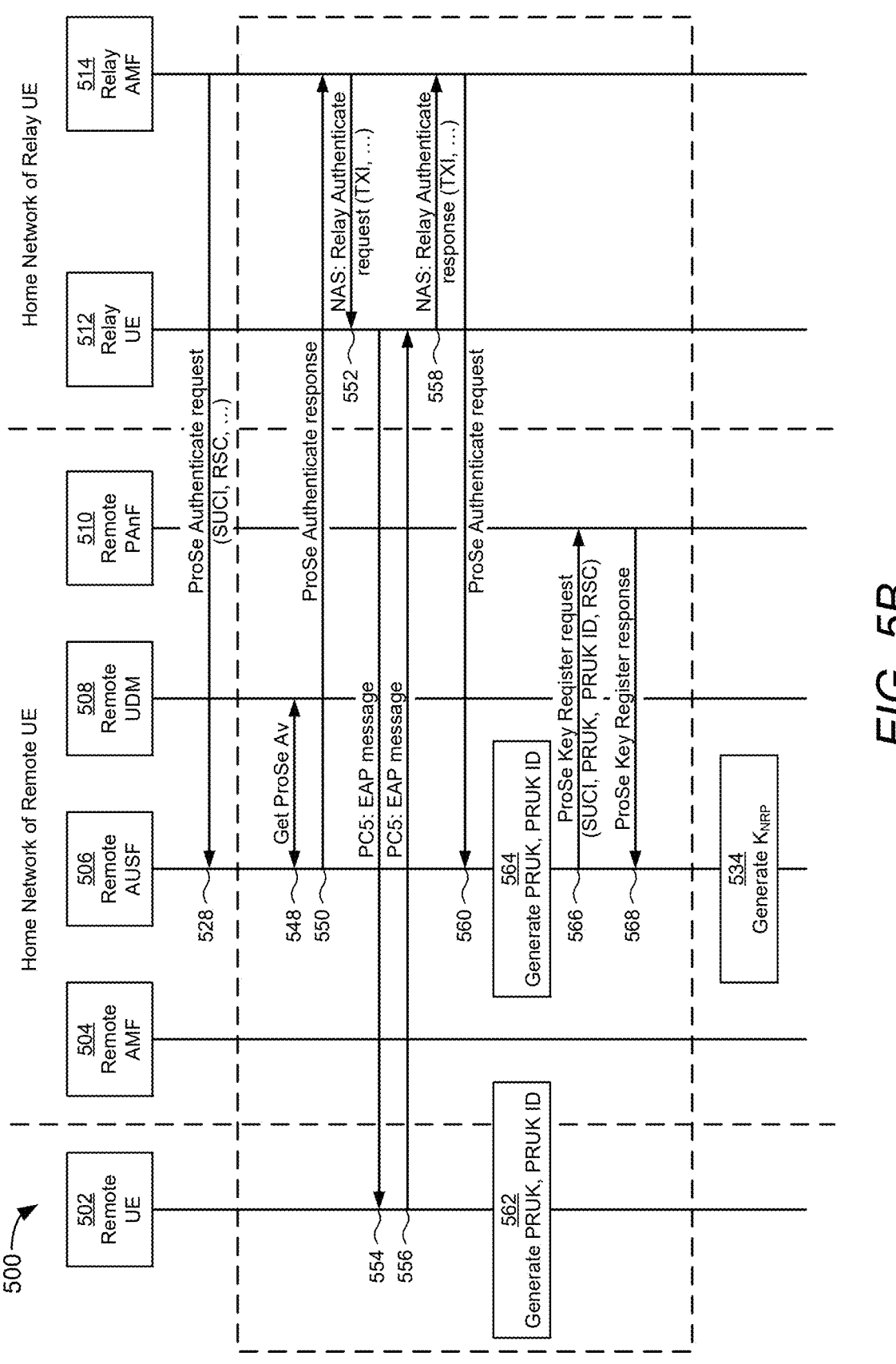

FIG. 5A and FIG. 5B are signaling and event diagrams illustrating portions of a CP-based security procedure 500 involving an L3 U2N relay. FIGS. 5A and 5B illustrate interactions between a remote UE 502, an access and mobility management function (AMF) that serves the remote UE 502 (hereinafter referred to as the "remote AMF 504"), an authentication server function (AUSF) that serves the remote UE 502 (hereinafter referred to as the "remote AUSF 506"), a unified data management (UDM) server that serves the remote UE 502 (hereinafter referred to as the "remote UDM 508"), a ProSe anchor function (PAnF) that serves the remote UE 502 (hereinafter referred to as the "remote PAnF 510"), a UE that operates as a U2N relay (hereinafter referred to as the "relay UE 512"), and an AMF that serves the relay UE 512 (hereinafter referred to as the "relay AMF 514"). The remote AMF 504, remote AUSF 506, remote UDM 508, and remote PAnF 510 are in the home network of the remote UE 502, and the relay AMF 514 is in the home network of the relay UE 512. FIG. 5A shows an example in which the remote UE 502 has a valid PRUK ID, and FIG. 5B shows an example in which the remote UE 502 does not have a valid PRUK ID or when a SUCI is provided instead of a PRUK ID.

In the example illustrated in FIG. 5A, at 516 the remote UE 502 attaches to the network, and at 518 the relay UE 512 attaches to the network. The remote UE 502 is provisioned with security materials and PC5 security policies from a policy control function (PCF) or from a 5G DDNMF such as the one illustrated in FIG. 4. At 520, the remote UE 502 performs a discovery procedure to find the relay UE 512. The remote UE 502 discovers the relay UE 512 based on the restricted discovery procedure.

At 522, the remote UE 502 initiates establishment of a secure connection with the relay UE 512 by sending a direct communication request. In some aspects, the direct communication request will include the PRUK ID if the remote UE 502 possesses one, but if the remote UE 502 does not have the PRUK ID, or if the PRUK ID has expired or is invalid, the direct communication request will include the SUCI. At 524, the relay UE 512 sends a relay key request to the relay AMF 514. The relay key request will include either the PRUK ID or the SUCI, along with a transaction identifier (TXI). At 526, the relay AMF 514 authorizes the relay UE, e.g., to determine whether or not the relay UE 512 can make such a request. In the example shown in FIG. 5A, the relay UE 512 does have such authority.

The relay AMF 514 determines the home network of the remote UE 502 from the PRUK ID or SUCI and thus can determine the address of the remote AUSF 506. At 528, the relay AMF 514 sends an authentication request to the remote AUSF 506, e.g., to determine whether or not the remote UE 502 is authorized to use ProSe services. In the example shown in FIG. 5A, the remote UE 502 does have such authority.

In FIG. 5A, at 530, the remote AUSF 506 sends a ProSe key register request to the remote PAnF 510, the request including the PRUK ID and RSC. At 532, the remote AUSF 506 receives a ProSe key register response from the remote PAnF 510, the response including the PRUK. At 534, the remote AUSF 506 generates a security key (KNRP) for the secure connection between the remote UE 502 and the relay UE 512. In the example illustrated in FIG. 5A, the security key is a PC5 key to be used for secure PC5 link between the remote UE 502 and the relay UE 512, but protocols other than PC5 may be used instead. At 536, the remote AUSF 506 sends a ProSe authenticate response to the relay AMF 514, the ProSe authenticate response including the security key KNRP. At 538, the relay AMF 514 forwards the security key KNRP to the relay UE 512, e.g., in a relay key response message.

At 540, the relay UE 512 sends a direct security mode command to the remote UE 502, indicating success. At 542, the remote UE 502 generates its own copy of the security key KNRP. At 544, the remote UE 502 sends a direct security mode complete message to the relay UE 512. At 546, the relay UE 512 sends a direct communication accept message to the remote UE 502. In this manner, the secure connection between the remote UE 502 and the relay UE 512 is established.

In the example illustrated in FIG. 5B, the direct communication request at 522, the relay key request at 524 and the ProSe authenticate request sent at 528 do not include a PRUK ID but instead includes the SUCI. In this scenario, at 548, the remote AUSF 506 queries the remote UDM 508 to get an authentication vector (AV). At 550, the remote AUSF 506 sends a ProSe authenticate response message to the relay AMF 514. At 552, the relay AMF 514 sends a relay authenticate request to the relay UE 512, the relay authenticate request including the transaction identifier TXI. At 554 and 556, the relay UE 512 exchanges extensible authentication protocol (EAP) messages. At 558, the relay UE 512 issues a relay authenticate response that includes the TXI. At 560, the relay AMF 514 issues another ProSe authenticate request to the remote AUSF 506. At 562, the remote UE 502 generates a PRUK and PRUK ID, and at 564, the remote AUSF 506 generates its own copy of the PRUK and PRUK ID. At 566, the remote AUSF 506 sends a ProSe register request to the remote PAnF 510, the ProSe register request including the SUCI, the PRUK, the PRUK ID, and the RSC. At 568, the remote PAnF 510 sends a ProSe key register response to the remote AUSF 506. From there the process continues from 534 as shown in FIG. 5A, and thus will not be repeated here.

Figure 6:
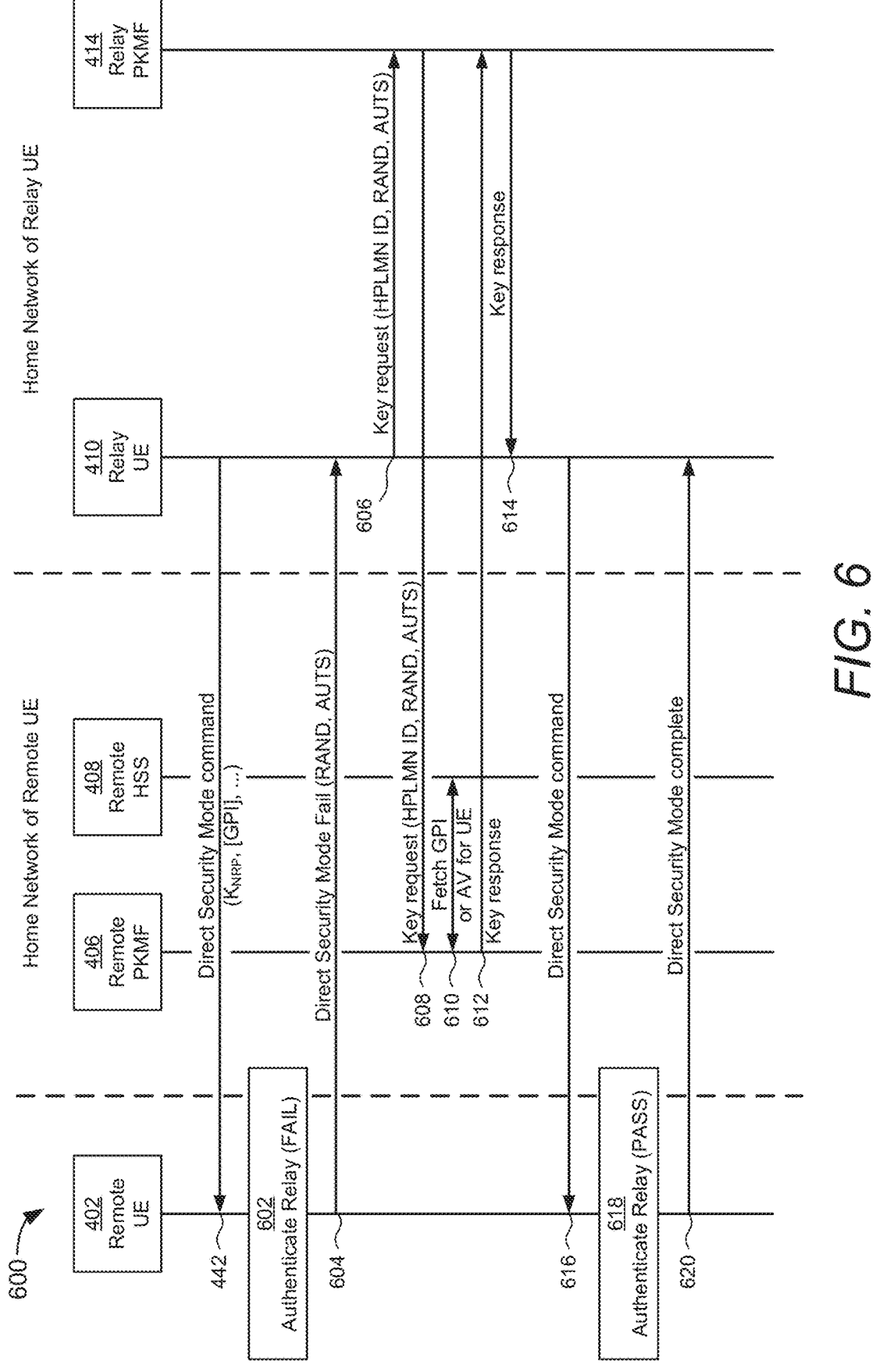
FIG. 6 illustrates a resynchronization process using user plane-based security procedures.
Figure 7:
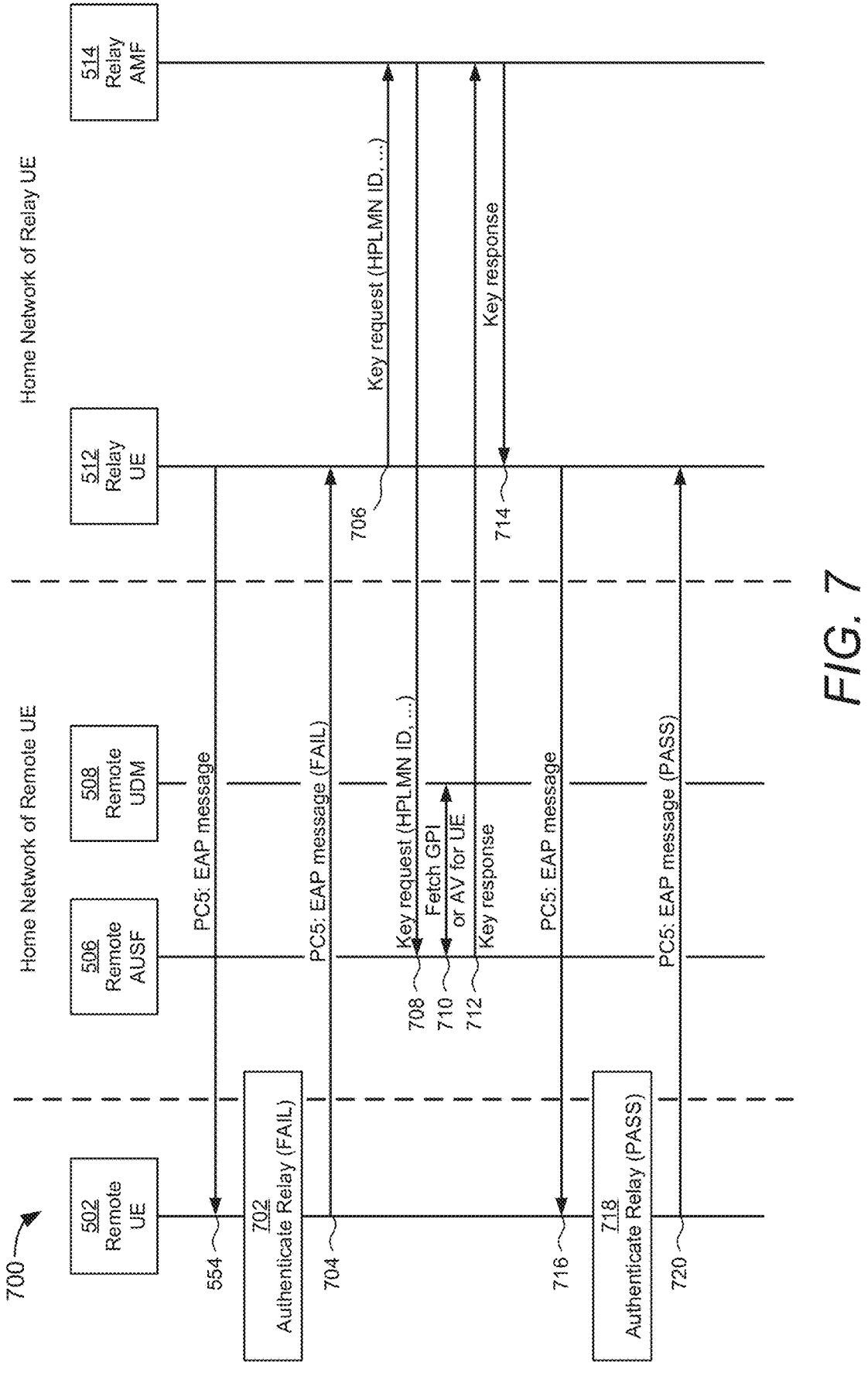
FIG. 7 illustrates a resynchronization process using control-plane based security procedures.

FIG. 6 and FIG. 7 are signaling and event diagrams illustrating a process called resynchronization, which is performed when the authentication between a remote UE and the home network fails, e.g., at 444 in FIG. 4 or after 554 in FIG. 5A. FIG. 6 illustrates a resynchronization process 600 using user plane-based security procedures and FIG. 7 illustrates a resynchronization process 700 using control-plane based security procedures.

In the example shown in FIG. 6, the remote UE 402 receives a direct security mode command from the relay UE 410 with a security key KNRP and an optional GPI (at 442 of FIG. 4), but at 602 the authorization fails, so at 604 the remote UE 402 notifies the relay UE 410 of the failure by sending a direct security mode fail message, which includes a random key (RAND) and an authentication token (AUTS).

At 606, the relay UE 410 issues a key request to the relay PKMF 414, the key request including RAND, AUTS, and also the network routing information for the home network of the remote UE 402, such as its HPLMN ID. At 608, the relay PKMF 414 forwards this request to the remote PKMF 406. At 610, the relay PKMF 414 queries the remote HSS 408 to get an AV and/or GPI for the remote UE 402. At 612, the remote HSS 408 provides a key response to the relay PKMF 414. At 614, the relay PKMF 414 forwards the key response to the relay UE 410.

At 616, the relay UE 410 issues another direct security command to the remote UE 402, and this time, at 618, the authorization is successful. At 620, the remote UE 402 sends a direct security mode complete message to the relay UE 410.

In the example shown in FIG. 7, the remote UE 502 receives the EAP message at 442, but at 702 the authorization fails, so at 704 the remote UE 502 notifies the relay UE 512 of the failure.

At 706, the relay UE 512 issues a key request to the relay AMF 514, the key request including the network routing information for the home network of the remote UE 502, such as its HPLMN ID. At 708, the relay AMF 514 forwards this request to the remote AUSF 506. At 710, the remote AUSF 506 queries the remote UDM 508 security information for the remote UE 502. At 712, the remote AUSF 506 provides a key response to the relay AMF 514. At 714, the relay AMF 514 forwards the key response to the relay UE 512.

At 716, the relay UE 512 issues another EAP message to the remote UE 502, and this time, at 718, the authorization is successful. At 720, the remote UE 502 notifies the relay UE 512 that the authentication passed.

It is noted that, at 606 in FIG. 6, the relay UE 410 is expected to provide network address information for the home network of the remote UE 402, e.g., the HPLMN ID that is part of the key request message at 606. However, the direct security mode fail message at 604 does not include the PRUK, PRUK ID, SUCI, or any other information from which the home network address of the remote UE 402 may be derived.

Likewise, at 706 in FIG. 7, the relay UE 512 is expected to provide network address information for the home network of the remote UE 502, e.g., the HPLMN ID that is part of the key request message at 706, but the EAP message at 704 does not include the PRUK, PRUK ID, SUCI, or any other information from which the home network address of the remote UE 502 may be derived. It is unspecified how the relay UE 410 or the relay UE 512 is supposed to know this information.

Accordingly, methods and systems for providing home network routing information (HNRI) of remote UE following authentication failure during establishment of U2N relay communication are herein provided. HNRI may comprise a home network address or any other information that identifies the home network of the remote UE.

Figure 8A:
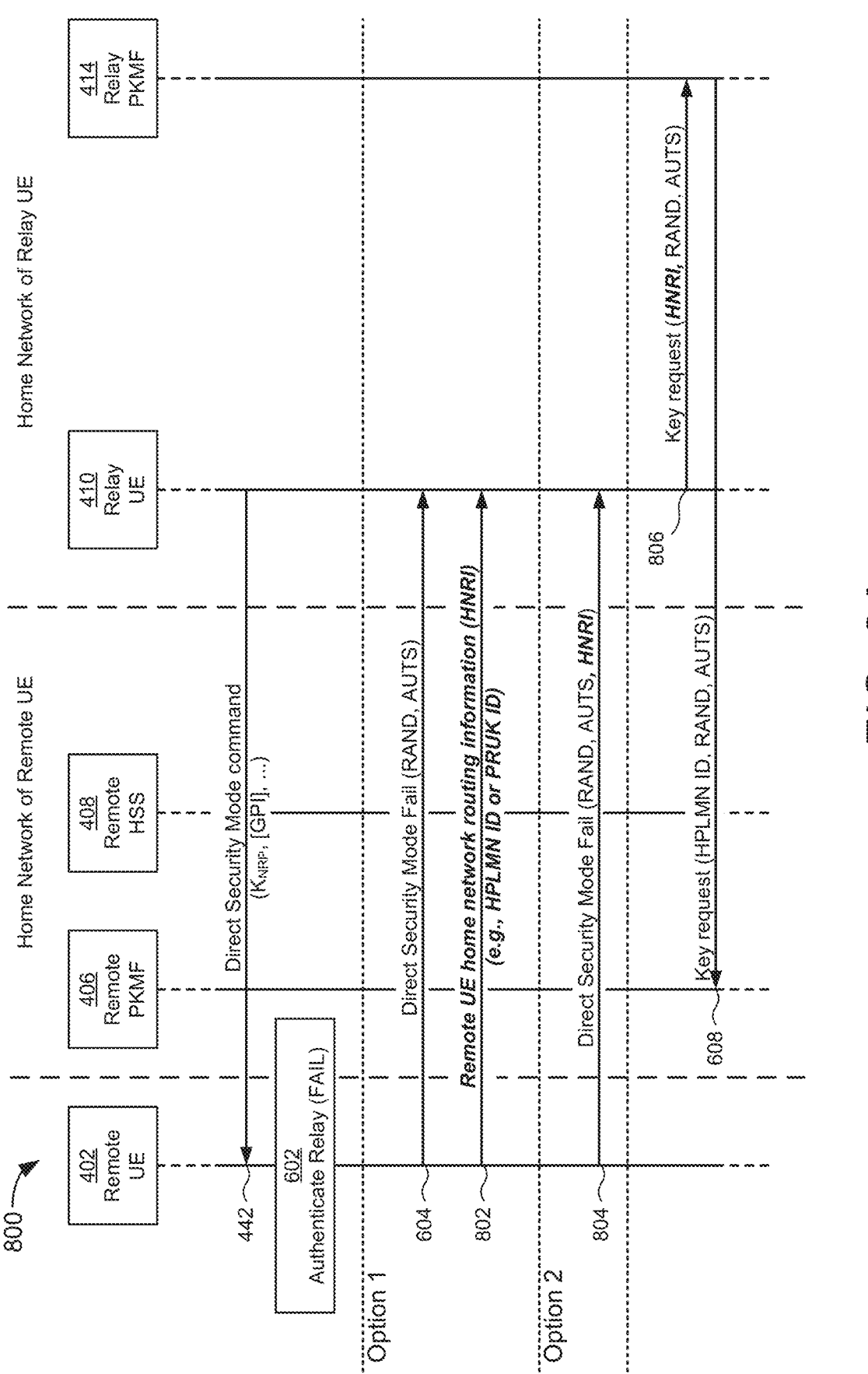
FIG. 8A, FIG. 8B, and FIG. 8C are signaling and event diagrams that illustrate different approaches for providing home network routing information of the remote UE using UP-based security procedures, according to aspects of the disclosure.
Figure 8B:
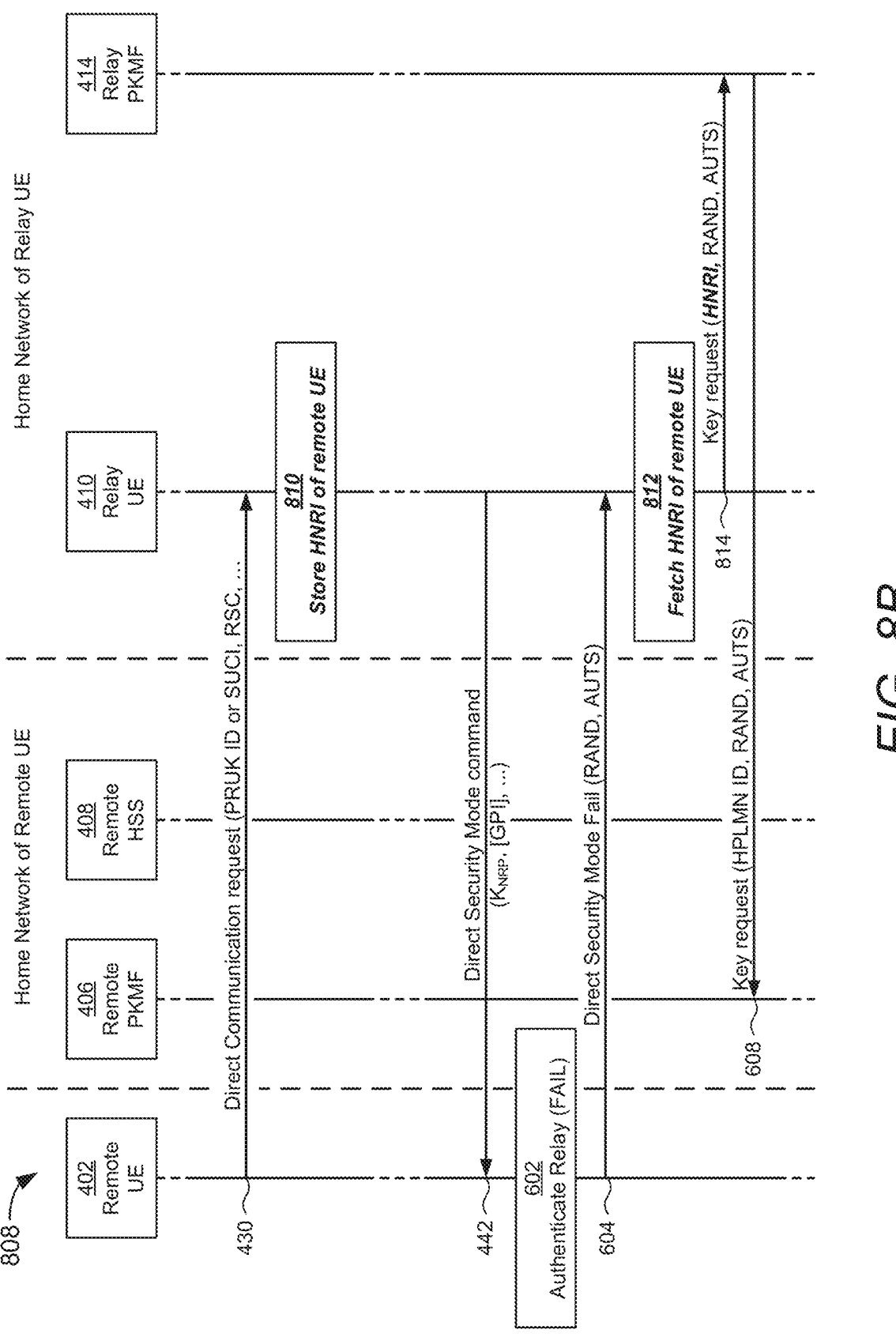
Figure 8C:
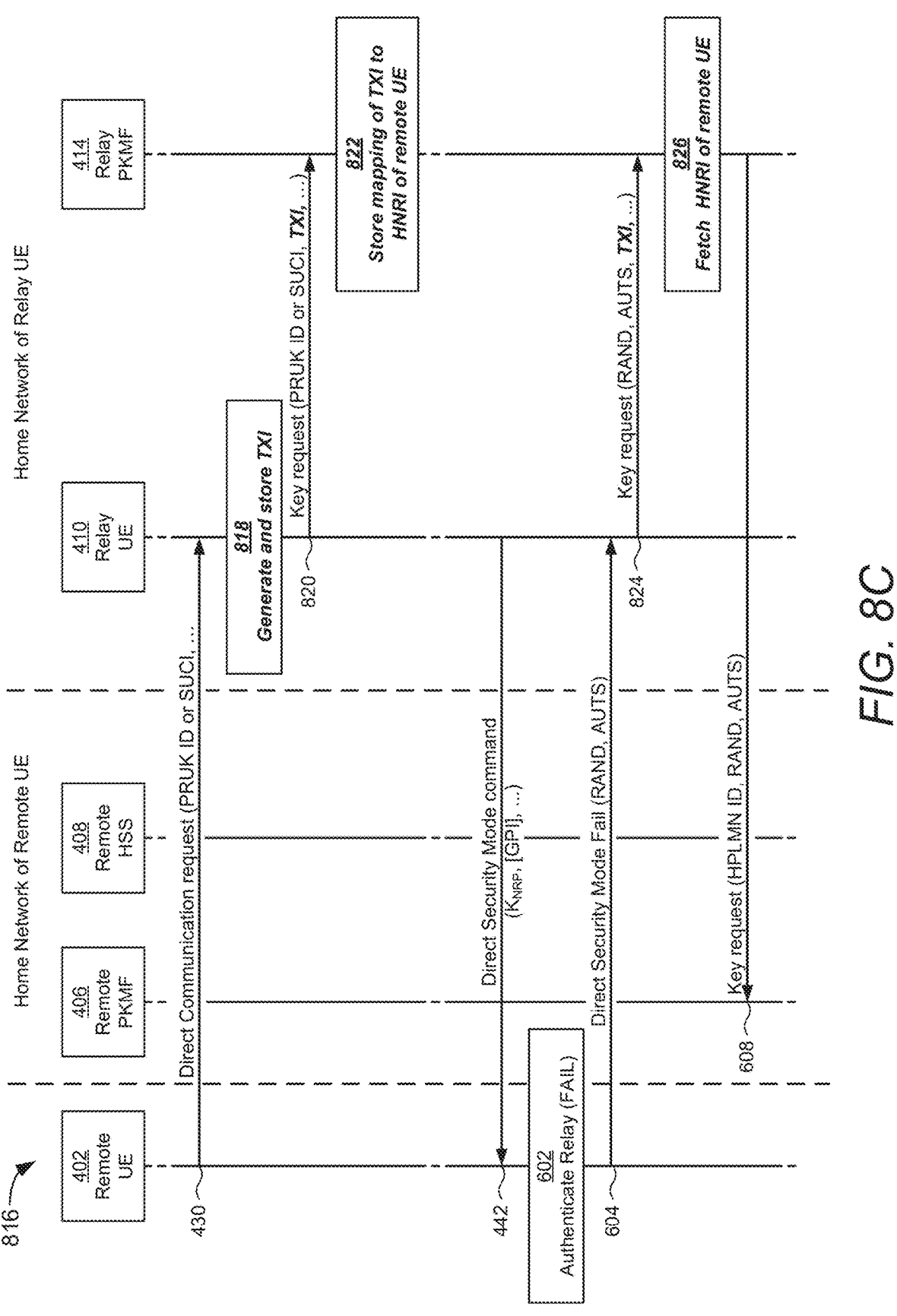

FIG. 8A, FIG. 8B, and FIG. 8C are signaling and event diagrams that illustrate different approaches for providing home network routing information of the remote UE, according to aspects of the disclosure. Each of FIGS. 8A through 8C illustrates portions of the user plane-based security procedure illustrated in FIG. 4 and the resynchronization procedure illustrated in FIG. 6. The elements in FIGS. 8A through 8C are substantially identical to the like-numbered elements in FIGS. 4 and 6, and thus their respective descriptions will not be repeated here.

FIG. 8A illustrates an approach 800 in which the remote UE 402 provides the HNRI to the relay UE 410, which forwards the HNRI to the relay PKMF 414. In the example shown in FIG. 8A, the remote UE 402 receives the direct security mode command, as at 442 of FIG. 4, and the authentication fails, as at 602 of FIG. 6. In a first option, the remote UE 402 sends the direct security mode fail message to the relay UE 410, as at 604 of FIG. 6, and at 802, the HNRI is provided to the relay UE 410 in a separate message. In a second option, at 804, the HNRI may be included in a modified direct security mode fail message. However, the direct security mode fail message is not security protected, so any device along the route will have access to the unencrypted payload. Regardless of the option taken, in this approach the relay UE 410 does not need to store the PRUK ID. Instead, at 806, the relay UE 410 forwards the HNRI as part of the key request message to the relay PKMF 414. The relay PKMF 414 uses the HNRI to know where to send the key request at 608.

In some aspects, if the remote UE 402 has no valid PRUK ID or if the PRUK ID is in a 64-bit string (in which case the PRUK only identifies the remote UE 402, not the home network), the HNRI may comprise the HPLMN ID for the remote UE 402.

In some aspects, if the remote UE 402 has PRUK ID that is in the network access identifier (NAI) format, the HNRI may comprise the PRUK ID, or it may comprise the PRUK ID but with the username part set to a random value or otherwise obscured so that the identity of the remote UE 402 cannot be determined from the HNRI, e.g., if the HNRI is intercepted in transmission.

In some aspects, the HNRI (and optionally, the entire message in which the HNRI is transmitted) is confidentiality and integrity protected using the discovery security materials received by the remote PKMF 406 at 418 of FIG. 4.

FIG. 8B illustrates an approach 808 in which the relay UE 410 provides the HNRI to the relay PKMF 414. In the example illustrated in FIG. 8B, when the relay UE 410 receives the direct communication request at 430 of FIG. 4, at 810, the relay UE 410 stores the HNRI associated with the remote UE 402, which the relay UE 410 can do because both the PRUK and the SUCI include a network identity and a user identity. Then, if the relay authorization fails at 602, the relay UE 410 receives the notification at 604, at 812, fetches the HNRI of the remote UE 402, and at 814, sends the HNRI to the relay PKMF 414 in the key request. The relay PKMF 414 uses the HNRI to know where to send the key request at 608.

FIG. 8C illustrates an approach 816 in which the relay PKMF 414 stores the HNRI. In the example illustrated in FIG. 8C, when the relay UE 410 receives the direct communication request at 430 of FIG. 4, at 818, the relay UE 410 generates and stores a transaction identifier (TXI) or reuses a transaction identifier that was generated by a control plane process, if there is one. At 820, the relay UE 410 includes the TXI in the key request to the relay PKMF 414, and at 822, the relay PKMF 414 stores the mapping of TXI to the HNRI of the remote UE 402. Then, if the relay authorization fails at 602, the relay UE 410 receives the notification at 604, and at 824, includes the TXI in the second key request to the relay PKMF 414. At 826, the relay PKMF 414 uses the TXI to fetch the HNRI of the remote UE 402. The relay PKMF 414 uses the HNRI to know where to send the key request at 608.

Figure 9A:
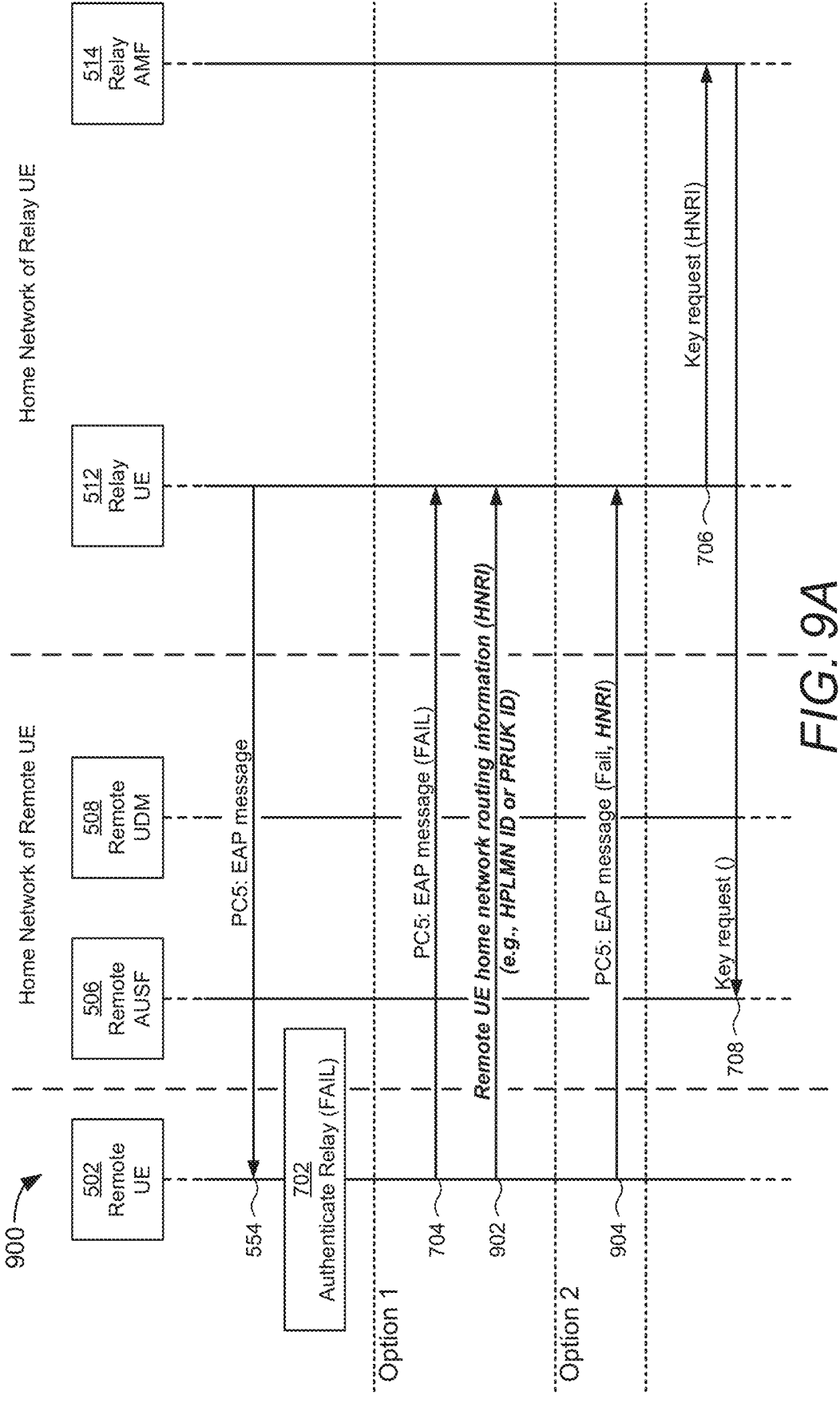
FIG. 9A, FIG. 9B, and FIG. 9C are signaling and event diagrams that illustrate different approaches for providing home network routing information of the remote UE using CP-based security procedures, according to aspects of the disclosure.
Figure 9B:
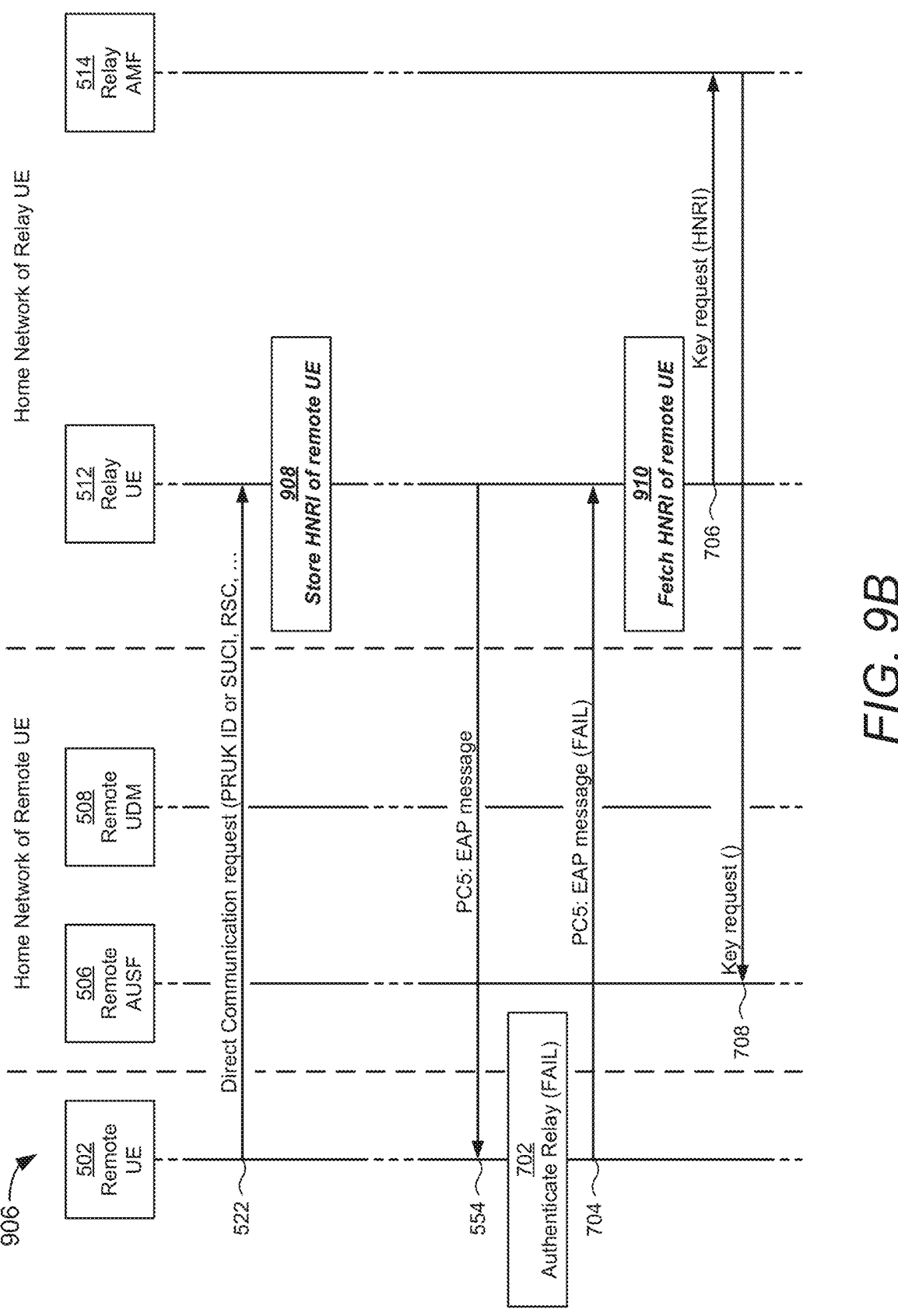
Figure 9C:
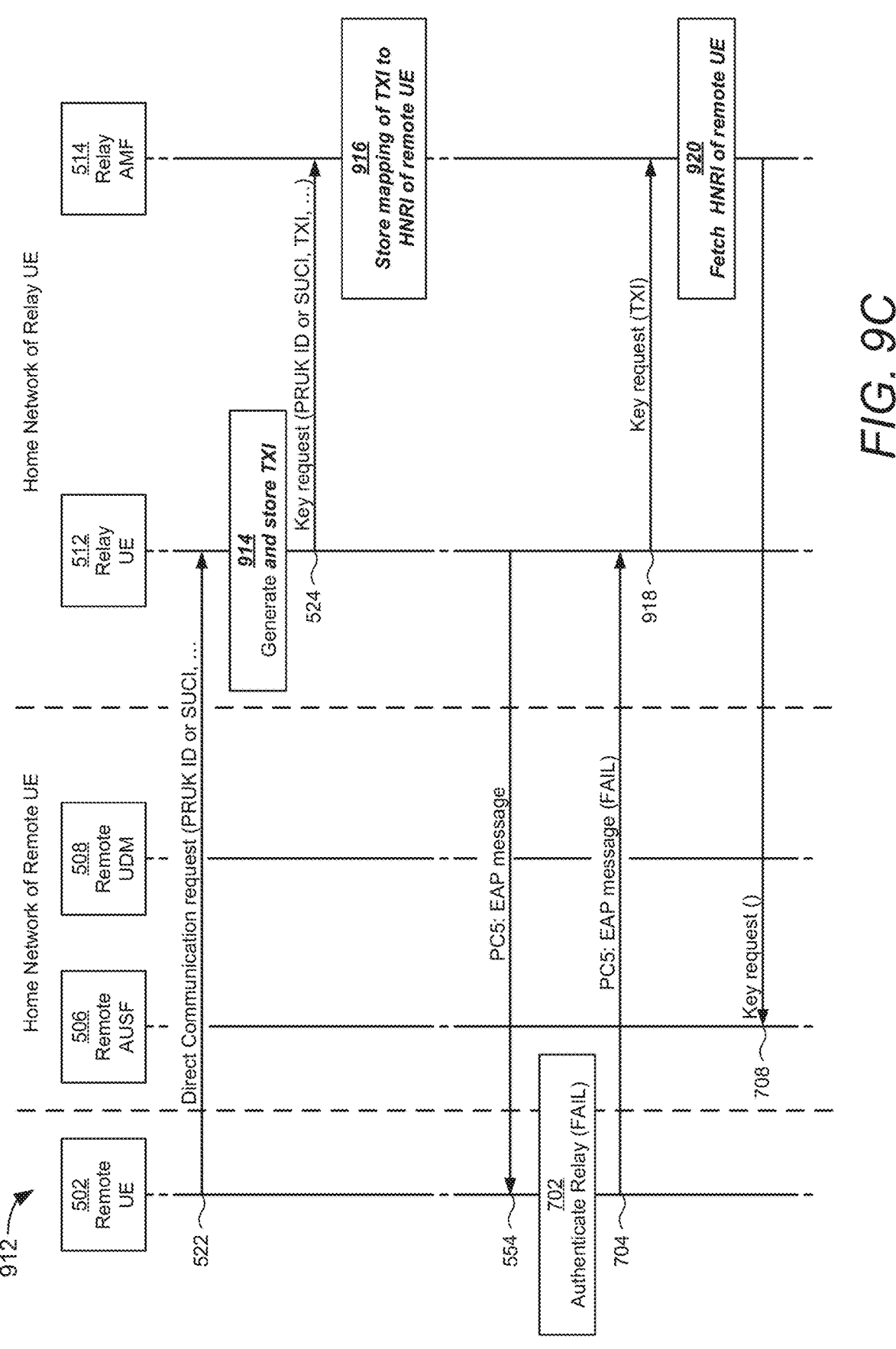

FIG. 9A, FIG. 9B, and FIG. 9C are signaling and event diagrams that illustrate different approaches for providing home network routing information of the remote UE, according to aspects of the disclosure. Each of FIGS. 9A through 9C illustrate portions of the user plane-based security procedure illustrated in FIGS. 5A and 5B and the resynchronization procedure illustrated in FIG. 7. The elements in FIGS. 9A through 9C are substantially identical to the like-numbered elements in FIGS. 5A, 5B, and 7, and thus their respective descriptions will not be repeated here.

FIG. 9A illustrates an approach 900 in which the remote UE 502 provides the HNRI to the relay UE 512, which forwards the HNRI to the relay AMF 514. In the example shown in FIG. 9A, the remote UE 502 receives the EAP message, as at 554 of FIG. 5B, and the authorization fails, as at 702 of FIG. 7. In a first option, the remote UE 502 sends an EAP fail message to the relay UE 512, as at 704 of FIG. 7, and at 902, the HNRI is provided to the relay UE 512 in a separate message. In a second option, at 904, the HNRI may be included in a modified EAP fail message. In this approach the relay UE 512 does not need to store the PRUK ID. Instead, the relay UE 512 forwards the HNRI as part of the key request message to the relay AMF 514 at 706. The relay AMF 514 uses the HNRI to know where to send the key request at 708.

In some aspects, if the remote UE 502 has no valid PRUK ID or if the PRUK ID is in a 64-bit string (in which case the PRUK only identifies the remote UE 502, not the home network), the HNRI may comprise the HPLMN ID for the remote UE 502.

In some aspects, if the remote UE 502 has PRUK ID that is in the network access identifier (NAI) format, the HNRI may comprise the PRUK ID, or it may comprise the PRUK ID but with the username part set to a random value or otherwise obscured so that the identity of the remote UE 502 cannot be determined from the HNRI, e.g., if the HNRI is intercepted in transmission.

In some aspects, the HNRI (and optionally, the entire message in which the HNRI is transmitted) is privacy and integrity protected using the discovery security materials received by the remote UE's DDNMF or PCF.

FIG. 9B illustrates an approach 906 in which the relay UE 512 provides the HNRI to the relay AMF 514. In the example illustrated in FIG. 9B, when the relay UE 512 receives the direct communication request at 522 of FIG. 5, at 908, the relay UE 512 stores the HNRI associated with the remote UE 502, which the relay UE 512 can do because both the PRUK and the SUCI include a network identity and a user identity. Then, if the relay authorization fails at 702, the relay UE 512 receives the notification at 704, and, at 910, fetches the HNRI of the remote UE 502, and sends the HNRI to the relay AMF 514 in the key request at 706. The relay AMF 514 uses the HNRI to know where to send the key request at 708.

FIG. 9C illustrates an approach 912 in which the relay AMF 514 stores the HNRI. In the example illustrated in FIG. 9C, when the relay UE 512 receives the direct communication request at 522 of FIG. 5, at 914, the relay UE 512 generates and stores a transaction identifier (TXI). At 524, the relay UE 512 includes the TXI in the key request to the relay AMF 514, and at 915, the relay AMF 514 stores the mapping of TXI to the HNRI of the remote UE 502. If the relay authorization fails at 702, the relay UE 512 receives the notification at 704, and at 918, includes the TXI in the second key request to the relay AMF 514. At 920, the relay AMF 514 uses the TXI to fetch the HNRI of the remote UE 502. The relay AMF 514 uses the HNRI to know where to send the key request at 708.

FIG. 10 is a flowchart of an example process 1000, performed by a remote UE, associated with methods and systems for providing HNRI of remote UE following authentication failure during establishment of U2N relay communication, according to aspects of the disclosure. In some implementations, one or more process blocks of FIG. 10 may be performed by a first user equipment (UE) (e.g., UE 104). In some implementations, one or more process blocks of FIG. 10 may be performed by another device or a group of devices separate from or including the UE. Additionally, or alternatively, one or more process blocks of FIG. 10 may be performed by one or more components of UE 302, such as processor(s) 332, memory 340, WWAN transceiver(s) 310, short-range wireless transceiver(s) 320, satellite signal receiver 330, sensor(s) 344, user interface 346, and ProSe module(s) 342, any or all of which may be means for performing the operations of process 1000.

As shown in FIG. 10, process 1000 may include, at block 1010, detecting an authentication failure during establishment of a secure connection with a second UE. In some aspects, the second UE is operating as a UE-to-network (U2N) relay. Means for performing the operation of block 1010 may include the processor(s) 332, memory 340, or WWAN transceiver(s) 310 of the UE 302. For example, the UE 302 may detect the authentication failure using the processor(s) 332.

As further shown in FIG. 10, process 1000 may include, at block 1020, sending a notification of the authentication failure to the second UE and providing the second UE with home network routing information (HNRI) for an authentication node within the home network of the first UE. Means for performing the operation of block 1020 may include the processor(s) 332, memory 340, or WWAN transceiver(s) 310 of the UE 302. For example, the UE 302 may send a notification of the authentication failure to the second UE and provide the second UE with the HNRI using transmitter(s) 314.

In some aspects, detecting an authentication failure during establishment of a secure connection with a second UE comprises detecting an authentication failure during establishment of a secure connection with a second UE operating as a U2N relay.

In some aspects, detecting the authentication failure during establishment of the secure connection with the second UE comprises detecting the authentication failure during establishment of a PC5 connection with the second UE.

In some aspects, detecting the authentication failure comprises detecting a synchronization failure.

In some aspects, sending a notification of the authentication failure to the second UE and providing the second UE with the HNRI for the authentication node within the home network of the first UE comprises sending the notification of authentication failure and the HNRI in a same message.

In some aspects, sending a notification of the authentication failure to the second UE and providing the second UE with the HNRI for the authentication node within the home network of the first UE comprises sending the notification of authentication failure in a first message and sending the HNRI in a second message.

In some aspects, detecting the authentication failure comprises detecting the authentication failure during a user plane security procedure.

In some aspects, detecting the authentication failure during the user plane security procedure comprises receiving, from the second UE, a direct security mode command comprising an authentication challenge, processing the authentication challenge, and detecting a failure of the authentication challenge.

In some aspects, receiving the direct security mode command comprises receiving at least one of a security material for the secure connection with the second UE and a GPI, and wherein processing the authentication challenge comprises processing an authentication challenge included in the GPI.

In some aspects, sending a notification of the authentication failure to the second UE comprises sending a direct security mode fail to the second UE.

In some aspects, the direct security mode fail comprises the HNRI.

In some aspects, detecting the authentication failure comprises detecting the authentication failure during a control plane security procedure.

In some aspects, detecting the authentication failure during the control plane security procedure comprises receiving, from the second UE, a first EAP message comprising first security information, processing an authentication challenge included in the first security information, and detecting a failure of the authentication challenge.

In some aspects, sending a notification of the authentication failure to the second UE comprises sending a second EAP message to the second UE.

In some aspects, the second EAP message comprises the HNRI.

In some aspects, providing the second UE with the HNRI comprises providing the second UE with a PRUK ID, or an HNRI extracted from a SUCI or PRUK ID.

In some aspects, providing the second UE with the HNRI comprises providing the second UE with an HNRI having a user identification portion that has been modified to obscure an identity of the user.

In some aspects, providing the second UE with the HNRI comprises providing the second UE with HNRI that is confidentiality and integrity protected based on provisioned discovery security materials.

In some aspects, providing the second UE with the HNRI comprises providing the second UE with a HPLMN ID of the home network of the first UE.

In some aspects, the authentication node within the home network of the first UE comprises a PKMF or an AUSF.

Process 1000 may include additional implementations, such as any single implementation or any combination of implementations described below and/or in connection with one or more other processes described elsewhere herein. Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a flowchart of an example process 1100, performed by a U2N relay UE, associated with methods and systems for providing HNRI of remote UE following authentication failure during establishment of U2N relay communication, according to aspects of the disclosure. In some implementations, one or more process blocks of FIG. 11 may be performed by a UE (e.g., UE 104). In some implementations, one or more process blocks of FIG. 11 may be performed by another device or a group of devices separate from or including the UE. Additionally, or alternatively, one or more process blocks of FIG. 11 may be performed by one or more components of UE 302, such as processor(s) 332, memory 340, WWAN transceiver(s) 310, short-range wireless transceiver(s) 320, satellite signal receiver 330, sensor(s) 344, user interface 346, and ProSe module(s) 342, any or all of which may be means for performing the operations of process 1100.

As shown in FIG. 11, process 1100 may include, at block 1110, receiving, from a second UE, a notification of an authentication failure during establishment of a secure connection between the second UE and the first UE. Means for performing the operation of block 1110 may include the processor(s) 332, memory 340, or WWAN transceiver(s) 310 of the UE 302. For example, the UE 302 may receive the notification of an authentication failure, using the receiver(s) 312.

As further shown in FIG. 11, process 1100 may include, at block 1120, determining HNRI for an authentication node within the home network of the second UE (block 1120). Means for performing the operation of block 1120 may include the processor(s) 332, memory 340, or WWAN transceiver(s) 310 of the UE 302. Means for performing the operation of block 1120 may include the processor(s) 332, memory 340, or WWAN transceiver(s) 310 of the UE 302. For example, the UE 302 may receive information via the receiver(s) 312, store information in and retrieve information from the memory 340, and perform other functions using the processor(s) 332.

For example, in some aspects, the UE 302 may determine the HNRI for an authentication node within the home network of the second UE by receiving the HNRI from the second UE before receiving the notification of the authentication failure, storing the HNRI, and retrieving the HNRI in response to receiving the notification of the authentication failure. In some aspects, the UE 302 may determine the HNRI for an authentication node within the home network of the second UE by receiving the HNRI from the second UE as part of the notification of the authentication failure. In some aspects, the UE 302 may determine the HNRI for an authentication node within the home network of the second UE by receiving the HNRI from the second UE after receiving the notification of the authentication failure.

As further shown in FIG. 11, process 1100 may include, at block 1130, sending, to an authentication node within the home network of the first UE, the HNRI for the authentication node within the home network of the second UE (block 1130). Means for performing the operation of block 1130 may include the processor(s) 332, memory 340, or WWAN transceiver(s) 310 of the UE 302. For example, the UE 302 may send the HNRI to the authentication node within the home network of the first UE using the transmitter(s) 314.

In some aspects, receiving the notification of the authentication failure comprises receiving notification of a synchronization failure.

In some aspects, determining the HNRI comprises receiving the HNRI from the second UE before receiving the notification of the authentication failure, storing the HNRI, and retrieving the HNRI in response to receiving the notification of the authentication failure, receiving the HNRI from the second UE as part of the notification of the authentication failure, or receiving the HNRI from the second UE after receiving the notification of the authentication failure.

In some aspects, receiving the HNRI from the second UE comprises receiving a SUCI.

In some aspects, receiving the HNRI from the second UE comprises receiving a PRUK ID.

In some aspects, the PRUK ID comprises a 64-bit string or in the NAI format.

In some aspects, receiving the notification of the authentication failure during establishment of the secure connection between the second UE and the first UE comprises receiving notification of the authentication failure during establishment of a PC5 connection.

In some aspects, receiving the notification of the authentication failure comprises receiving the notification of the authentication failure during a user plane security procedure or a control plane security procedure.

In some aspects, determining the HNRI for the authentication node within the home network of the first UE comprises determining the HNRI for a PKMF or AUSF.

In some aspects, determining the HNRI comprises determining the HNRI based on a SUCI.

In some aspects, determining the HNRI comprises determining the HNRI based on a PRUK ID.

In some aspects, the PRUK ID comprises a 64-bit string or in the NAI format.

In some aspects, determining the HNRI comprises determining the HPLMN ID of the home network of the second UE.

Process 1100 may include additional implementations, such as any single implementation or any combination of implementations described below and/or in connection with one or more other processes described elsewhere herein. Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a flowchart of an example process 1200, performed by a network entity, associated with methods and systems for providing HNRI of remote UE following authentication failure during establishment of U2N relay communication, according to aspects of the disclosure. In some implementations, one or more process blocks of FIG. 12 may be performed by a network entity (e.g., relay PKMF 414, relay AMF 514, remote AUSF 506, etc.). In some implementations, one or more process blocks of FIG. 12 may be performed by another device or a group of devices separate from or including the network entity. Additionally, or alternatively, one or more process blocks of FIG. 12 may be performed by one or more components of network entity 306, such as processor(s) 394, memory 396, network transceiver(s) 390, and ProSe module(s) 398, any or all of which may be means for performing the operations of process 1200.

As shown in FIG. 12, process 1200 may include, at block 1210, receiving, from the first UE, a request for security materials for a secure connection between the first UE and a second UE not in the home network of the first UE, the request comprising a TXI. Means for performing the operation of block 1210 may include the processor(s) 394, memory 396, or network transceiver(s) 390 of the network entity 306. For example, the network entity 306 may receive the request for a security key using the network transceiver(s) 390.

As further shown in FIG. 12, process 1200 may include, at block 1220, determining, based on the TXI, the HNRI for the home network of the second UE. Means for performing the operation of block 1220 may include the processor(s) 394, memory 396, or network transceiver(s) 390 of the network entity 306. For example, processor(s) 394 of the network entity 306 may use the TXI to query a database for mapping TXIs to HNRIs stored in the memory 396, to return the HNRI for the home network of the second UE.

As further shown in FIG. 12, process 1200 may include, at block 1230, determining, based on the HNRI, an authentication node within the home network of the second UE. Means for performing the operation of block 1230 may include the processor(s) 394, memory 396, or network transceiver(s) 390 of the network entity 306. For example, the network entity 306 may determine an authentication node within the home network of the second UE, using the processor(s) 394.

As further shown in FIG. 12, process 1200 may include, at block 1240, forwarding the request to the authentication node within the home network of the second UE. Means for performing the operation of block 1240 may include the processor(s) 394, memory 396, or network transceiver(s) 390 of the network entity 306. For example, the network entity 306 may forward the request using the network transceiver(s) 390.

In some aspects, process 1200 includes receiving, from the first UE, information mapping the TXI to the HNRI, and storing the mapping between the TXI and the HNRI.

In some aspects, receiving the information mapping the TXI to the HNRI comprises receiving the TXI and a SUCI.

In some aspects, receiving the information mapping the TXI to the HNRI comprises receiving the TXI and a PRUK ID.

In some aspects, the PRUK ID comprises a 64-bit string or a NAI.

In some aspects, the HNRI comprises a HPLMN ID of the home network of the second UE.

In some aspects, the authentication node within the home network of the second UE comprises a PKMF or an AUSF.

Process 1200 may include additional implementations, such as any single implementation or any combination of implementations described below and/or in connection with one or more other processes described elsewhere herein. Although FIG. 12 shows example blocks of process 1200, in some implementations, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 illustrates an example electronic device 1300 represented as a series of interrelated functional modules. In an aspect, the electronic device 1300 may be a remote UE.

The electronic device 1300 may include a module 1310 for detecting an authentication failure during establishment of a secure connection with a second UE, which may be operating as a U2N relay. In an aspect, the module 1310 may correspond to the processor(s) 332, memory 340, and/or ProSe Module 342 of the UE 302.

The electronic device 1300 may include a module 1320 for sending a notification of the authentication failure to the second UE and providing the second UE with HNRI for an authentication node within the home network of the first UE, in response to detection of the authentication failure. In an aspect, the module 1320 may correspond to the processor(s) 332, memory 340, and/or ProSe Module 342 of the UE 302.

FIG. 14 illustrates an example electronic device 1400 represented as a series of interrelated functional modules. In an aspect, the electronic device 1400 may be a U2N relay UE.

The electronic device 1400 may include a module 1410 for receiving, from a second UE, a notification of an authentication failure during establishment of a secure connection between the second UE and the first UE. In an aspect, the module 1410 may correspond to the processor(s) 332, memory 340, and/or ProSe Module 342 of the UE 302.

The electronic device 1400 may include a module 1420 for determining HNRI for an authentication node within the home network of the second UE. In an aspect, the module 1420 may correspond to the processor(s) 332, memory 340, and/or ProSe Module 342 of the UE 302.

The electronic device 1400 may include a module 1430 for sending, to an authentication node within the home network of the first UE, the HNRI for the authentication node within the home network of the second UE. In an aspect, the module 1430 may correspond to the processor(s) 332, memory 340, and/or ProSe Module 342 of the UE 302.

FIG. 15 illustrates an example electronic device 1500 represented as a series of interrelated functional modules. In an aspect, the electronic device 1500 may be a network node, such as an PKMF, AMF, or AUSF.

The electronic device 1500 may include a module 1510 for receiving, from a first UE, a request for security materials for a secure connection between the first UE and a second UE not in the home network of the first UE, the request comprising a TXI. In an aspect, the module 1510 may correspond to the processor(s) 394, memory 396, network transceiver(s) 390, and ProSe module(s) 398 of the network entity 306.

The electronic device 1500 may include a module 1520 for determining, based on the TXI, the HNRI for the home network of the second UE. In an aspect, the module 1520 may correspond to the processor(s) 394, memory 396, network transceiver(s) 390, and ProSe module(s) 398 of the network entity 306.

The electronic device 1500 may include a module 1530 for determining, based on the HNRI, an authentication node within the home network of the second UE. In an aspect, the module 1530 may correspond to the processor(s) 394, memory 396, network transceiver(s) 390, and ProSe module(s) 398 of the network entity 306.

The electronic device 1500 may include a module 1540 for forwarding the request to the authentication node within the home network of the second UE. In an aspect, the module 1540 may correspond to the processor(s) 394, memory 396, network transceiver(s) 390, and ProSe module(s) 398 of the network entity 306.

Figure 16:
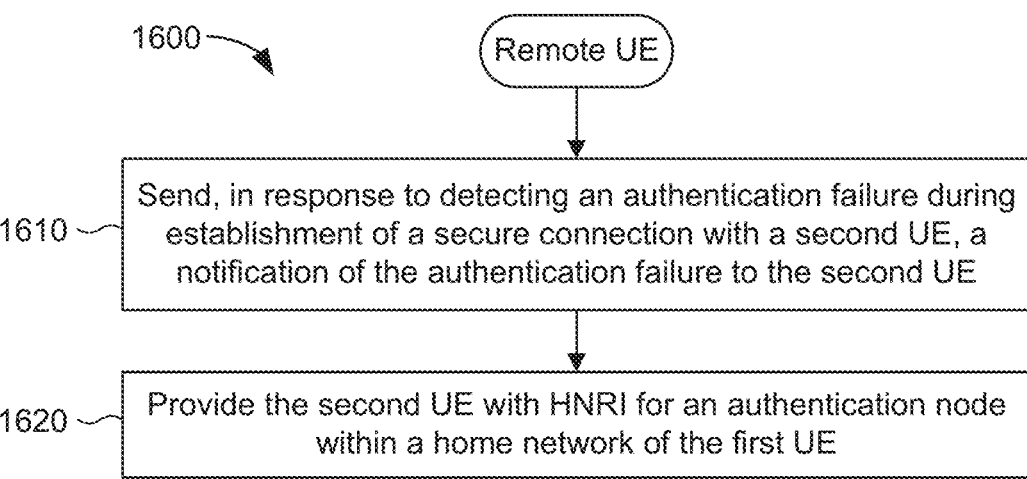
FIG. 16 is a flowchart of another example process, performed by a remote UE, associated with methods and systems for providing HNRI of the remote UE following authentication failure during establishment of U2N relay communication with a relay UE, according to aspects of the disclosure.

FIG. 16 is a flowchart of an example process 1600, performed by a remote UE, associated with methods and systems for providing HNRI of the remote UE following authentication failure during establishment of U2N relay communication with a U2N relay UE, according to aspects of the disclosure. In some implementations, one or more process blocks of FIG. 16 may be performed by a UE (e.g., UE 104). In some implementations, one or more process blocks of FIG. 16 may be performed by another device or a group of devices separate from or including the UE. Additionally, or alternatively, one or more process blocks of FIG. 16 may be performed by one or more components of UE 302, such as processor(s) 332, memory 340, WWAN transceiver(s) 310, short-range wireless transceiver(s) 320, satellite signal receiver 330, sensor(s) 344, user interface 346, and ProSe Module(s) 342, any or all of which may be means for performing the operations of process 1600.

As shown in FIG. 16, process 1600 may include, at block 1610, sending, in response to an authentication failure during establishment of a secure connection with a second UE, a notification of the authentication failure to the second UE. Means for performing the operation of block 1610 may include the processor(s) 332, memory 340, or WWAN transceiver(s) 310 of the UE 302. For example, the UE 302 may send a notification of the authentication failure to the second UE using the transmitter(s) 314.

As further shown in FIG. 16, process 1600 may include, at block 1620, providing the second UE with HNRI for an authentication node within a home network of the first UE. Means for performing the operation of block 1620 may include the processor(s) 332, memory 340, or WWAN transceiver(s) 310 of the UE 302. For example, the UE 302 may provide the second UE with the HNRI using the transmitter(s) 314.

In some aspects, detecting the authentication failure during establishment of the secure connection with the second UE comprises at least one of detecting the authentication failure during establishment of the secure connection with the second UE operating as a U2N relay, detecting the authentication failure during establishment of a PC5 connection with the second UE, or detecting a synchronization failure.

In some aspects, sending the notification of the authentication failure to the second UE and providing the second UE with the HNRI for the authentication node within the home network of the first UE comprises sending the notification of the authentication failure and the HNRI in a same message, or sending the notification of the authentication failure in a first message and sending the HNRI in a second message.

In some aspects, detecting the authentication failure comprises detecting the authentication failure during a user plane security procedure.

In some aspects, sending the notification of the authentication failure to the second UE comprises sending a direct security mode failure message to the second UE, the direct security mode failure message comprising the HNRI.

In some aspects, detecting the authentication failure comprises detecting the authentication failure during a control plane security procedure.

In some aspects, providing the second UE with the HNRI comprises providing the second UE with at least one of a PRUK ID, or an HNRI extracted from a SUCI or PRUK ID.

In some aspects, providing the second UE with the HNRI comprises at least one of: modifying a user identification portion of the HNRI to obscure an identity of the user and providing the second UE with the HNRI having the modified user identification portion; at least one of confidentiality protecting or integrity protecting the HNRI based on provisioned discovery security materials and providing the second UE with the HNRI that has been confidentiality and/or integrity protected; or providing the second UE with a HPLMN identifier of the home network of the first UE. In some aspects, the HNRI is confidentially protected based on provisioned security materials. In some aspects, the HNRI is integrity protected based on provisioned security materials. In some aspects, the HNRI is both confidentiality protected and integrity protected based on provisioned security materials.

In some aspects, providing the second UE with the HNRI comprises providing the second UE with a HPLMN identifier of the home network of the first UE.

In some aspects, the authentication node within the home network of the first UE comprises a PKMF or an AUSF.

Process 1600 may include additional implementations, such as any single implementation or any combination of implementations described below and/or in connection with one or more other processes described elsewhere herein. Although FIG. 16 shows example blocks of process 1600, in some implementations, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
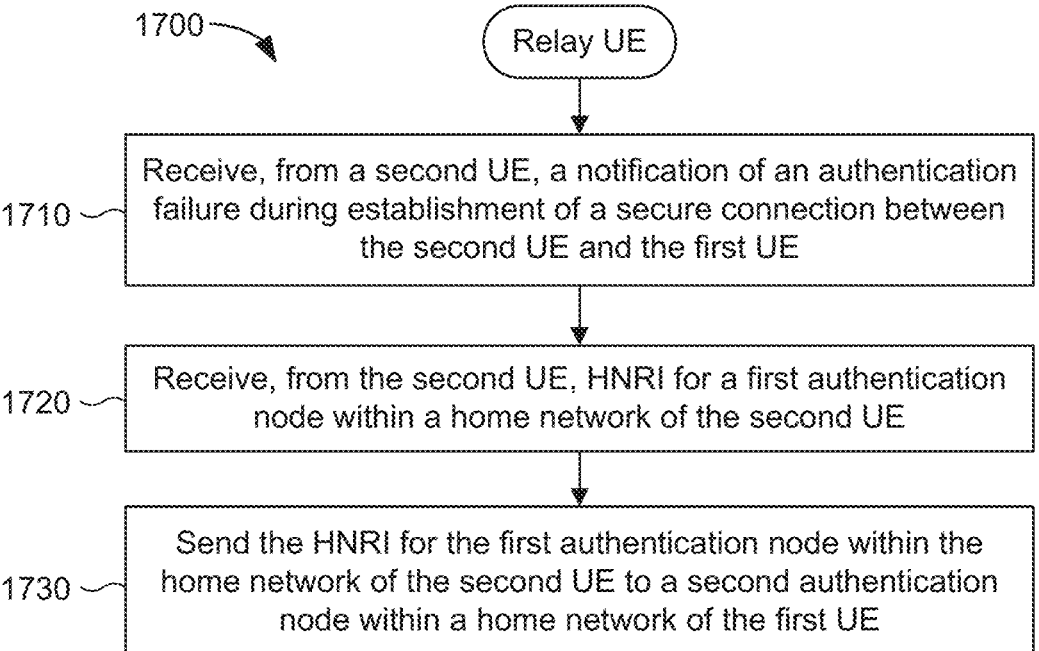
FIG. 17 is a flowchart of another example process, performed by a U2N relay UE, associated with methods and systems for providing HNRI of a remote UE following authentication failure during establishment of U2N relay communication with the remote UE, according to aspects of the disclosure.

FIG. 17 is a flowchart of an example process 1700, performed by a U2N relay UE, associated with methods and systems for providing HNRI of a remote UE following authentication failure during establishment of U2N relay communication with the remote UE, according to aspects of the disclosure. In some implementations, one or more process blocks of FIG. 17 may be performed by a UE (e.g., UE 104). In some implementations, one or more process blocks of FIG. 17 may be performed by another device or a group of devices separate from or including the UE. Additionally, or alternatively, one or more process blocks of FIG. 17 may be performed by one or more components of UE 302, such as processor(s) 332, memory 340, WWAN transceiver(s) 310, short-range wireless transceiver(s) 320, satellite signal receiver 330, sensor(s) 344, user interface 346, and ProSe Module(s) 342, any or all of which may be means for performing the operations of process 1700.

As shown in FIG. 17, process 1700 may include, at block 1710, receiving, from a second UE, a notification of an authentication failure during establishment of a secure connection between the second UE and the first UE. Means for performing the operation of block 1710 may include the processor(s) 332, memory 340, or WWAN transceiver(s) 310 of the UE 302. For example, the UE 302 may receive the notification of an authentication failure using the receiver(s) 312.

As further shown in FIG. 17, process 1700 may include, at block 1720, receiving, from the second UE, HNRI for a first authentication node within a home network of the second UE. Means for performing the operation of block 1720 may include the processor(s) 332, memory 340, or WWAN transceiver(s) 310 of the UE 302. For example, the UE 302 may receive the HNRI using the receiver(s) 312.

As further shown in FIG. 17, process 1700 may include, at block 1730, sending the HNRI for the first authentication node within the home network of the second UE to a second authentication node within a home network of the first UE. Means for performing the operation of block 1730 may include the processor(s) 332, memory 340, or WWAN transceiver(s) 310 of the UE 302. For example, the UE 302 may send the HNRI for the first authentication node within the home network of the second UE to a second authentication node within a home network of the first UE, using the transmitter(s) 314.

In some aspects, receiving the notification of the authentication failure comprises receiving notification of a synchronization failure.

In some aspects, receiving the HNRI from the second UE comprises receiving the HNRI from the second UE before receiving the notification of the authentication failure, storing the HNRI, and retrieving the HNRI in response to receiving the notification of the authentication failure.

In some aspects, the notification of the authentication failure comprises the HNRI and wherein receiving the HNRI from the second UE comprises receiving the HNRI from the second UE as part of the notification of the authentication failure.

In some aspects, receiving the HNRI from the second UE comprises receiving the HNRI from the second UE after receiving the notification of the authentication failure.

In some aspects, receiving the HNRI from the second UE comprises receiving a SUCI.

In some aspects, receiving the HNRI from the second UE comprises receiving a PRUK ID.

In some aspects, the PRUK ID comprises at least one of a 64-bit string or a NAI.

In some aspects, receiving the notification of the authentication failure during establishment of the secure connection between the second UE and the first UE comprises receiving notification of the authentication failure during establishment of a PC5 connection.

In some aspects, receiving the notification of the authentication failure comprises receiving the notification of the authentication failure during at least one of a user plane security procedure or a control plane security procedure.

In some aspects, determining the HNRI for the first authentication node within the home network of the second UE comprises determining the HNRI for at least one of a ProSe key management function (PKMF) or an authentication server function (AUSF) within the home network of the second UE.

Process 1700 may include additional implementations, such as any single implementation or any combination of implementations described below and/or in connection with one or more other processes described elsewhere herein. Although FIG. 17 shows example blocks of process 1700, in some implementations, process 1700 may include additional blocks, fewer blocks, different blocks, or differently arranged blocks than those depicted in FIG. 17. Additionally, or alternatively, two or more of the blocks of process 1700 may be performed in parallel.

FIG. 18 is a flowchart of an example process 1800, performed by a network entity, associated with methods and systems for providing HNRI of a remote UE following authentication failure during establishment of U2N relay communication between the remote UE and a U2N relay UE, according to aspects of the disclosure. In some implementations, one or more process blocks of FIG. 18 may be performed by a network entity (e.g., a PKMF or AMF). In some implementations, one or more process blocks of FIG. 18 may be performed by another device or a group of devices separate from or including the network entity. Additionally, or alternatively, one or more process blocks of FIG. 18 may be performed by one or more components of network entity 306, such as processor(s) 394, memory 396, network transceiver(s) 390, and ProSe Module(s) 398, any or all of which may be means for performing the operations of process 1800.

As shown in FIG. 18, process 1800 may include, at block 1810, receiving, from a first UE in a first home network of the network entity, a request for security materials for a secure connection between the first UE and a second UE having a second home network that is different from the first home network, the request comprising a TXI. Means for performing the operation of block 1810 may include the processor(s) 394, memory 396, or network transceiver(s) 390 of the network entity 306. For example, the network entity 306 may receive the request for security materials using the network transceiver(s) 390.

As further shown in FIG. 18, process 1800 may include, at block 1820, determining, based on the TXI, HNRI for the second home network. Means for performing the operation of block 1820 may include the processor(s) 394, memory 396, or network transceiver(s) 390 of the network entity 306. For example, the network entity 306 may determine the HNRI for the second home network, using the processor(s) 394.

As further shown in FIG. 18, process 1800 may include, at block 1830, determining, based on the HNRI for the second home network, an authentication node within the second home network. Means for performing the operation of block 1830 may include the processor(s) 394, memory 396, or network transceiver(s) 390 of the network entity 306. For example, the network entity 306 may determine an authentication node within the second home network, using the processor(s) 394.

As further shown in FIG. 18, process 1800 may include, at block 1840, forwarding the request to the authentication node within the second home network. Means for performing the operation of block 1840 may include the processor(s) 394, memory 396, or network transceiver(s) 390 of the network entity 306. For example, the network entity 306 may forward the request to the authentication node within the second home network, using the network transceiver(s) 390.

In some aspects, process 1800 includes receiving, from the first UE, mapping information that maps the TXI to the HNRI for the second home network, and storing the mapping information.

In some aspects, receiving the mapping information comprises receiving the TXI and at least one of a SUCI or a PRUK ID.

In some aspects, the PRUK ID comprises at least one of a 64-bit string or a NAI.

In some aspects, the HNRI comprises a HPLMN identifier of the second home network.

In some aspects, the authentication node within the second home network comprises at least one of a PKMF or an AUSF.

In some aspects, the network entity comprises at least one of a PKMF or an AMF.

Process 1800 may include additional implementations, such as any single implementation or any combination of implementations described below and/or in connection with one or more other processes described elsewhere herein. Although FIG. 18 shows example blocks of process 1800, in some implementations, process 1800 may include additional blocks, fewer blocks, different blocks, or differently arranged blocks than those depicted in FIG. 18. Additionally, or alternatively, two or more of the blocks of process 1800 may be performed in parallel.

FIG. 19 illustrates an example electronic device 1900 represented as a series of interrelated functional modules. In an aspect, the electronic device 1900 may be a remote UE or a U2N relay UE. In some aspects, the electronic device 1900 may include a processing system 1902 that includes processor circuitry 1904 and memory circuitry 1906 that stores code and is coupled with the processor circuitry 1904 via one or more system buses 1908. In some aspects, the processing system 1902 is coupled to transceiver circuitry 1910 and one or more antenna(s) 1912. In some aspects, the processing system 1902 includes a transmission component 1914 for managing messages and signals transmitted by the electronic device 1900. In some aspects, the processing system 1902 includes a reception component 1916 for managing messages and signals received by the electronic device 1900.

In some aspects, the processing system 1902 is configured to cause the electronic device 1900 to send, in response to an authentication failure during establishment of a secure connection with a second UE, a notification of the authentication failure to the second UE. The processing system 1902 is further configured to cause the electronic device to provide the second UE with HNRI for an authentication node within the home network of the electronic device 1900.

In other aspects, the processing system 1902 is configured to cause the electronic device 1900 to receive, from a second UE, a notification of an authentication failure during establishment of a secure connection between the second UE and the electronic device 1900. The processing system 1902 is further configured to cause the electronic device 1900 to receive, from the second UE, HNRI for a first authentication node within a home network of the second UE. The processing system 1902 is further configured to cause the electronic device 1900 to send the HNRI for the first authentication node within the home network of the second UE to a second authentication node within a home network of the electronic device 1900.

FIG. 20 illustrates an example electronic device 2000 represented as a series of interrelated functional modules. In an aspect, the electronic device 2000 may be a remote network entity, such as a PKMF or AMF. In some aspects, the electronic device 2000 may include a processing system 2002 that includes processor circuitry 2004 and memory circuitry 2006 that stores code and is coupled with the processor circuitry 2004 via one or more system buses 2008. In some aspects, the processing system 2002 is coupled to network interface circuitry 2010. In some aspects, the processing system 2002 includes a transmission component 2012 for managing messages and signals transmitted by the electronic device 2000. In some aspects, the processing system 2002 includes a reception component 2014 for managing messages and signals received by the electronic device 2000.

In some aspects, the processing system 2002 is configured to cause the electronic device 2000 to receive, from a first UE in a first home network of the network entity, a request for security materials for a secure connection between the first UE and a second UE having a second home network that is different from the first home network, the request comprising a TXI. The processor system 2002 is further configured to determine, based on the TXI, HNRI for the second home network. The processor system 2002 is further configured to determine, based on the HNRI for the second home network, an authentication node within the second home network. The processor system 2002 is further configured to forward the request to the authentication node within the second home network.

As will be appreciated, a technical advantage of the techniques disclosed herein is that they specify how HNRI for an authentication node within the home network of a remote UE is to be provided to an authentication node within the home network of a U2N relay UE in the circumstance where notification of authentication failure or re-synchronization is needed during establishment of U2N relay communication—something that the current standards do not specify.

In the detailed description above it can be seen that different features are grouped together in examples. This manner of disclosure should not be understood as an intention that the example examples have more features than are explicitly mentioned in each example. Rather, the various aspects of the disclosure may include fewer than all features of an individual example disclosed. Therefore, the following examples should hereby be deemed to be incorporated in the description, wherein each example by itself can stand as a separate example. Although each dependent example can refer in the examples to a specific combination with one of the other examples, the aspect(s) of that dependent example are not limited to the specific combination. It will be appreciated that other example examples can also include a combination of the dependent example aspect(s) with the subject matter of any other dependent example or independent example or a combination of any feature with other dependent and independent examples. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of an example can be included in any other independent example, even if the example is not directly dependent on the independent example.

Implementation examples are described in the following numbered examples:

Example 1. A method of wireless communication performed at a first user equipment (UE), the method comprising: detecting an authentication failure during establishment of a secure connection with a second UE; and in response to detecting the authentication failure, sending a notification of the authentication failure to the second UE; and providing the second UE with home network routing information (HNRI) for an authentication node within the home network of the first UE.

Example 2. The method of example 1, wherein detecting an authentication failure during establishment of a secure connection with a second UE comprises detecting an authentication failure during establishment of a secure connection with a second UE operating as a UE-to-network (U2N) relay.

Example 3. The method of any of examples 1 to 2, wherein detecting the authentication failure during establishment of the secure connection with the second UE comprises detecting the authentication failure during establishment of a PC5 connection with the second UE.

Example 4. The method of any of examples 1 to 3, wherein detecting the authentication failure comprises detecting a synchronization failure.

Example 5. The method of any of examples 1 to 4, wherein sending the notification of the authentication failure to the second UE and providing the second UE with the HNRI for the authentication node within the home network of the first UE comprises sending the notification of authentication failure and the HNRI in a same message.

Example 6. The method of any of examples 1 to 5, wherein sending the notification of the authentication failure to the second UE and providing the second UE with the HNRI for the authentication node within the home network of the first UE comprises sending the notification of authentication failure in a first message and sending the HNRI in a second message.

Example 7. The method of any of examples 1 to 6, wherein detecting the authentication failure comprises detecting the authentication failure during a user plane security procedure.

Example 8. The method of example 7, wherein detecting the authentication failure during the user plane security procedure comprises: receiving, from the second UE, a direct security mode command comprising an authentication challenge; processing the authentication challenge; and detecting a failure of the authentication challenge.

Example 9. The method of example 8, wherein receiving the direct security mode command comprises receiving at least one of a security material for the secure connection with the second UE and a generic bootstrapping architecture (GBA) push information (GPI), and wherein processing the authentication challenge comprises processing an authentication challenge included in the GPI.

Example 10. The method of any of examples 7 to 9, wherein sending the notification of the authentication failure to the second UE comprises sending a direct security mode fail to the second UE.

Example 11. The method of example 10, wherein the direct security mode fail comprises the HNRI.

Example 12. The method of any of examples 1 to 11, wherein detecting the authentication failure comprises detecting the authentication failure during a control plane security procedure.

Example 13. The method of example 12, wherein detecting the authentication failure during the control plane security procedure comprises: receiving, from the second UE, a first extensible authentication protocol (EAP) message comprising first security information; processing an authentication challenge included in the first security information; and detecting a failure of the authentication challenge.

Example 14. The method of any of examples 12 to 13, wherein sending the notification of the authentication failure to the second UE comprises sending a second EAP message to the second UE.

Example 15. The method of example 14, wherein the second EAP message comprises the HNRI.

Example 16. The method of any of examples 1 to 15, wherein providing the second UE with the HNRI comprises providing the second UE with a ProSe relay user key (PRUK) identifier (PRUK ID), or an HNRI extracted from a SUCI or PRUK ID.

Example 17. The method of any of examples 1 to 16, wherein providing the second UE with the HNRI comprises providing the second UE with an HNRI having a user identification portion that has been modified to obscure an identity of the user.

Example 18. The method of any of examples 1 to 17, wherein providing the second UE with the HNRI comprises providing the second UE with HNRI that is confidentiality and integrity protected based on provisioned discovery security materials.

Example 19. The method of any of examples 1 to 18, wherein providing the second UE with the HNRI comprises providing the second UE with a home public land mobile network (HPLMN) identifier of the home network of the first UE.

Example 20. The method of any of examples 1 to 19, wherein the authentication node within the home network of the first UE comprises a ProSe key management function (PKMF), or an authentication server function (AUSF).

Example 21. A method of wireless communication performed at a first user equipment (UE), the method comprising: receiving, from a second UE, a notification of an authentication failure during establishment of a secure connection between the second UE and the first UE; determining home network routing information (HNRI) for an authentication node within the home network of the second UE; and sending, to an authentication node within the home network of the first UE, the HNRI for the authentication node within the home network of the second UE.

Example 22. The method of example 21, receiving the notification of the authentication failure comprises receiving notification of a synchronization failure.

Example 23. The method of any of examples 21 to 22, wherein determining the HNRI comprises: receiving the HNRI from the second UE before receiving the notification of the authentication failure, storing the HNRI, and retrieving the HNRI in response to receiving the notification of the authentication failure; receiving the HNRI from the second UE as part of the notification of the authentication failure; or receiving the HNRI from the second UE after receiving the notification of the authentication failure.

Example 24. The method of example 23, wherein receiving the HNRI from the second UE comprises receiving a subscription concealed identifier (SUCI).

Example 25. The method of any of examples 23 to 24, wherein receiving the HNRI from the second UE comprises receiving a ProSe relay user key (PRUK) identifier (PRUK ID).

Example 26. The method of example 25, wherein the PRUK ID comprises a 64-bit string or a network access identifier (NAI).

Example 27. The method of any of examples 21 to 26, wherein receiving the notification of the authentication failure during establishment of the secure connection between the second UE and the first UE comprises receiving notification of the authentication failure during establishment of a PC5 connection.

Example 28. The method of any of examples 21 to 27, wherein receiving the notification of the authentication failure comprises receiving the notification of the authentication failure during a user plane security procedure or a control plane security procedure.

Example 29. The method of any of examples 21 to 28, wherein determining the HNRI for the authentication node within the home network of the first UE comprises determining the HNRI for a ProSe key management function (PKMF), or an authentication server function (AUSF).

Example 30. The method of any of examples 21 to 29, wherein determining the HNRI comprises determining the HNRI based on a subscription concealed identifier (SUCI).

Example 31. The method of any of examples 21 to 30, wherein determining the HNRI comprises determining the HNRI based on a ProSe relay user key (PRUK) identifier (PRUK ID).

Example 32. The method of example 31, wherein the PRUK ID comprises a 64-bit string or a network access identifier (NAI).

Example 33. The method of any of examples 21 to 32, wherein determining the HNRI comprises determining the home public land mobile network (HPLMN) identifier of the home network of the second UE.

Example 34. A method of wireless communication, the method comprising: at a network entity: receiving, from a first UE in a home network of the network entity, a request for security materials for a secure connection between the first UE and a second UE not in the home network of the first UE, the request comprising a transaction identifier (TXI); determining, based on the TXI, the HNRI for the home network of the second UE; determining, based on the HNRI, an authentication node within the home network of the second UE; and forwarding the request to the authentication node within the home network of the second UE.

Example 35. The method of example 34, further comprising, prior to receiving the request for security materials: receiving, from the first UE, information mapping the TXI to the HNRI; and storing the mapping between the TXI and the HNRI.

Example 36. The method of example 35, wherein receiving the information mapping the TXI to the HNRI comprises receiving the TXI and a subscriber concealed identifier (SUCI).

Example 37. The method of any of examples 35 to 36, wherein receiving the information mapping the TXI to the HNRI comprises receiving the TXI and a ProSe relay user key (PRUK) identifier (PRUK ID).

Example 38. The method of example 37, wherein the PRUK ID comprises a 64-bit string or a network access identifier (NAI).

Example 39. The method of any of examples 35 to 38, wherein the HNRI comprises a home public land mobile network (HPLMN) identifier of the home network of the second UE.

Example 40. The method of any of examples 34 to 39, wherein the authentication node within the home network of the second UE comprises a ProSe key management function (PKMF), or an authentication server function (AUSF).

Example 41. A first user equipment (UE), comprising: a memory; and at least one processor coupled to the memory, the memory and the at least one processor configured to: detect an authentication failure during establishment of a secure connection with a second UE; and in response to detecting the authentication failure, send a notification of the authentication failure to the second UE; and provide the second UE with home network routing information (HNRI) for an authentication node within the home network of the first UE.

Example 42. The first UE of example 41, wherein, to detect an authentication failure during establishment of a secure connection with a second UE, the memory and the at least one processor are configured to detect an authentication failure during establishment of a secure connection with a second UE operating as a UE-to-network (U2N) relay.

Example 43. The first UE of any of examples 41 to 42, wherein, to detect the authentication failure during establishment of the secure connection with the second UE, the memory and the at least one processor are configured to detect the authentication failure during establishment of a PC5 connection with the second UE.

Example 44. The first UE of any of examples 41 to 43, wherein, to detect the authentication failure, the memory and the at least one processor are configured to detect a synchronization failure.

Example 45. The first UE of any of examples 41 to 44, wherein, to send the notification of the authentication failure to the second UE and provide the second UE with the HNRI for the authentication node within the home network of the first UE, the memory and the at least one processor are configured to send the notification of authentication failure and the HNRI in a same message.

Example 46. The first UE of any of examples 41 to 45, wherein, to send the notification of the authentication failure to the second UE and provide the second UE with the HNRI for the authentication node within the home network of the first UE, the memory and the at least one processor are configured to send the notification of authentication failure in a first message and to send the HNRI in a second message.

Example 47. The first UE of any of examples 41 to 46, wherein, to detect the authentication failure, the memory and the at least one processor are configured to detect the authentication failure during a user plane security procedure.

Example 48. The first UE of example 47, wherein, to detect the authentication failure during the user plane security procedure, the memory and the at least one processor are configured to: receive, from the second UE, a direct security mode command comprising an authentication challenge; process the authentication challenge; and detect a failure of the authentication challenge.

Example 49. The first UE of example 48, wherein receiving the direct security mode command comprises receiving at least one of a security material for the secure connection with the second UE and a generic bootstrapping architecture (GBA) push information (GPI), and wherein processing the authentication challenge comprises processing an authentication challenge included in the GPI.

Example 50. The first UE of any of examples 47 to 49, wherein, to send the notification of the authentication failure to the second UE, the memory and the at least one processor are configured to send a direct security mode fail to the second UE.

Example 51. The first UE of example 50, wherein the direct security mode fail comprises the HNRI.

Example 52. The first UE of any of examples 41 to 51, wherein, to detect the authentication failure, the memory and the at least one processor are configured to detect the authentication failure during a control plane security procedure.

Example 53. The first UE of example 52, wherein, to detect the authentication failure during the control plane security procedure, the memory and the at least one processor are configured to: receive, from the second UE, a first extensible authentication protocol (EAP) message comprising first security information; process an authentication challenge included in the first security information; and detect a failure of the authentication challenge.

Example 54. The first UE of any of examples 52 to 53, wherein, to send the notification of the authentication failure to the second UE, the memory and the at least one processor are configured to send a second EAP message to the second UE.

Example 55. The first UE of example 54, wherein the second EAP message comprises the HNRI.

Example 56. The first UE of any of examples 41 to 55, wherein, to provide the second UE with the HNRI, the memory and the at least one processor are configured to provide the second UE with a ProSe relay user key (PRUK) identifier (PRUK ID), or an HNRI extracted from a SUCI or PRUK ID.

Example 57. The first UE of any of examples 41 to 56, wherein, to provide the second UE with the HNRI, the memory and the at least one processor are configured to provide the second UE with an HNRI having a user identification portion that has been modified to obscure an identity of the user.

Example 58. The first UE of any of examples 41 to 57, wherein, to provide the second UE with the HNRI, the memory and the at least one processor are configured to provide the second UE with HNRI that is confidentiality and integrity protected based on provisioned discovery security materials.

Example 59. The first UE of any of examples 41 to 58, wherein, to provide the second UE with the HNRI, the memory and the at least one processor are configured to provide the second UE with a home public land mobile network (HPLMN) identifier of the home network of the first UE.

Example 60. The first UE of any of examples 41 to 59, wherein the authentication node within the home network of the first UE comprises a ProSe key management function (PKMF), or an authentication server function (AUSF).

Example 61. A first user equipment (UE), comprising: a memory; and at least one processor coupled to the memory, the memory and the at least one processor configured to: receive, from a second UE, a notification of an authentication failure during establishment of a secure connection between the second UE and the first UE; determine home network routing information (HNRI) for an authentication node within the home network of the second UE; and send, to an authentication node within the home network of the first UE, the HNRI for the authentication node within the home network of the second UE.

Example 62. The first UE of example 61, wherein, to receive the notification of the authentication failure, the memory and the at least one processor are configured to receive notification of a synchronization failure.

Example 63. The first UE of any of examples 61 to 62, wherein, to determine the HNRI, the memory and the at least one processor are configured to: receive, the HNRI from the second UE before receiving the notification of the authentication failure, store the HNRI, and retrieve the HNRI in response to receiving the notification of the authentication failure; receive, the HNRI from the second UE as part of the notification of the authentication failure; or receive, the HNRI from the second UE after receiving the notification of the authentication failure.

Example 64. The first UE of example 63, wherein, to receive the HNRI from the second UE, the memory and the at least one processor are configured to receive a subscription concealed identifier (SUCI).

Example 65. The first UE of any of examples 63 to 64, wherein, to receive the HNRI from the second UE, the memory and the at least one processor are configured to receive a ProSe relay user key (PRUK) identifier (PRUK ID).

Example 66. The first UE of example 65, wherein the PRUK ID comprises a 64-bit string or a network access identifier (NAI).

Example 67. The first UE of any of examples 61 to 66, wherein, to receive the notification of the authentication failure during establishment of the secure connection between the second UE and the first UE, the memory and the at least one processor are configured to receive notification of the authentication failure during establishment of a PCS connection.

Example 68. The first UE of any of examples 61 to 67, wherein, to receive the notification of the authentication failure, the memory and the at least one processor are configured to receive the notification of the authentication failure during a user plane security procedure or a control plane security procedure.

Example 69. The first UE of any of examples 61 to 68, wherein, to determine the HNRI for the authentication node within the home network of the first UE, the memory and the at least one processor are configured to determine the HNRI for a ProSe key management function (PKMF), or an authentication server function (AUSF).

Example 70. The first UE of any of examples 61 to 69, wherein, to determine the HNRI, the memory and the at least one processor are configured to determine the HNRI based on a subscription concealed identifier (SUCI).

Example 71. The first UE of any of examples 61 to 70, wherein, to determine the HNRI, the memory and the at least one processor are configured to determine the HNRI based on a ProSe relay user key (PRUK) identifier (PRUK ID).

Example 72. The first UE of example 71, wherein the PRUK ID comprises a 64-bit string or a network access identifier (NAI).

Example 73. The first UE of any of examples 61 to 72, wherein, to determine the HNRI, the memory and the at least one processor are configured to determine the home public land mobile network (HPLMN) identifier of the home network of the second UE.

Example 74. A network entity, comprising: a memory; and at least one processor coupled to the memory, the memory and the at least one processor configured to: receive, from a first UE in a home network of the network entity, a request for security materials for a secure connection between the first UE and a second UE not in the home network of the first UE, the request comprising a transaction identifier (TXI); determine, based on the TXI, the HNRI for the home network of the second UE; determine, based on the HNRI, an authentication node within the home network of the second UE; and forward the request to the authentication node within the home network of the second UE.

Example 75. The network entity of example 74, wherein the at least one processor is further configured to, prior to receiving the request for security materials: receive, from the first UE, information mapping the TXI to the HNRI; and store the mapping between the TXI and the HNRI.

Example 76. The network entity of example 75, wherein, to receive the information mapping the TXI to the HNRI, the memory and the at least one processor are configured to receive the TXI and a subscriber concealed identifier (SUCI).

Example 77. The network entity of any of examples 75 to 76, wherein, to receive the information mapping the TXI to the HNRI, the memory and the at least one processor are configured to receive the TXI and a ProSe relay user key (PRUK) identifier (PRUK ID).

Example 78. The network entity of example 77, wherein the PRUK ID comprises a 64-bit string or a network access identifier (NAI).

Example 79. The network entity of any of examples 75 to 78, wherein the HNRI comprises a home public land mobile network (HPLMN) identifier of the home network of the second UE.

Example 80. The network entity of any of examples 74 to 79, wherein the authentication node within the home network of the second UE comprises a ProSe key management function (PKMF), or an authentication server function (AUSF).

Example 81. The network entity of any of examples 74 to 80, comprising a ProSe key management function (PKMF) or an access and mobility management function (AMF).

Example 82. A first UE, comprising: means for detecting an authentication failure during establishment of a secure connection with a second UE; and means for, in response to detecting the authentication failure, sending a notification of the authentication failure to the second UE and providing the second UE with home network routing information (HNRI) for an authentication node within the home network of the first UE.

Example 83. A first UE, comprising: means for receiving, from a second UE, a notification of an authentication failure during establishment of a secure connection between the second UE and the first UE; means for determining home network routing information (HNRI) for an authentication node within the home network of the second UE; and means for sending, to an authentication node within the home network of the first UE, the HNRI for the authentication node within the home network of the second UE.

Example 84. A network entity, comprising: means for receiving, from a first UE in a home network of the network entity, a request for security materials for a secure connection between the first UE and a second UE not in the home network of the first UE, the request comprising a transaction identifier (TXI); means for determining, based on the TXI, the HNRI for the home network of the second UE; means for determining, based on the HNRI, an authentication node within the home network of the second UE; and means for forwarding the request to the authentication node within the home network of the second UE.

Example 85. A non-transitory computer-readable medium storing at least one computer-executable instruction that, when executed by a first UE, causes the first UE to: detect an authentication failure during establishment of a secure connection with a second UE; and in response to detecting the authentication failure, send a notification of the authentication failure to the second UE; and provide the second UE with home network routing information (HNRI) for an authentication node within the home network of the first UE.

Example 86. A non-transitory computer-readable medium storing at least one computer-executable instruction that, when executed by a first UE, causes the first UE to: receive, from a second UE, a notification of an authentication failure during establishment of a secure connection between the second UE and the first UE; determine home network routing information (HNRI) for an authentication node within the home network of the second UE; and send, to an authentication node within the home network of the first UE, the HNRI for the authentication node within the home network of the second UE.

Example 87. A non-transitory computer-readable medium storing at least one computer-executable instruction that, when executed by a network entity, causes the network entity to: receive, from a first UE in a home network of the network entity, a request for security materials for a secure connection between the first UE and a second UE not in the home network of the first UE, the request comprising a transaction identifier (TXI); determine, based on the TXI, the HNRI for the home network of the second UE; determine, based on the HNRI, an authentication node within the home network of the second UE; and forward the request to the authentication node within the home network of the second UE.

Example 88. A method for wireless communication at a first UE, comprising: sending, in response to an authentication failure during establishment of a secure connection with a second UE, a notification of the authentication failure to the second UE; and providing the second UE with HNRI for an authentication node within a home network of the first UE.

Example 89. The method of example 88, wherein detecting the authentication failure during establishment of the secure connection with the second UE comprises at least one of: detecting the authentication failure during establishment of the secure connection with the second UE operating as a UE-to-network (U2N) relay; detecting the authentication failure during establishment of a PC5 connection with the second UE; or detecting a synchronization failure.

Example 90. The method of any of examples 88 to 89, wherein sending the notification of the authentication failure to the second UE and providing the second UE with the HNRI for the authentication node within the home network of the first UE comprises: sending the notification of the authentication failure and the HNRI in a same message; or sending the notification of the authentication failure in a first message and sending the HNRI in a second message.

Example 91. The method of any of examples 88 to 90, wherein detecting the authentication failure comprises detecting the authentication failure during a user plane security procedure.

Example 92. The method of example 91, wherein sending the notification of the authentication failure to the second UE comprises sending a direct security mode failure message to the second UE, the direct security mode failure message comprising the HNRI.

Example 93. The method of any of examples 88 to 92, wherein detecting the authentication failure comprises detecting the authentication failure during a control plane security procedure.

Example 94. The method of any of examples 88 to 93, wherein providing the second UE with the HNRI comprises providing the second UE with at least one of: a PRUK ID; or an HNRI extracted from a SUCI or PRUK ID.

Example 95. The method of any of examples 88 to 94, wherein providing the second UE with the HNRI comprises at least one of: modifying a user identification portion of the HNRI to obscure an identity of the user and providing the second UE with the HNRI having the modified user identification portion; at least one of confidentiality protecting or integrity protecting the HNRI based on provisioned discovery security materials and providing the second UE with the HNRI that has been confidentiality and/or integrity protected; or providing the second UE with a HPLMN identifier of the home network of the first UE.

Example 96. The method of any of examples 88 to 95, wherein providing the second UE with the HNRI comprises providing the second UE with a HPLMN identifier of the home network of the first UE.

Example 97. The method of any of examples 88 to 96, wherein the authentication node within the home network of the first UE comprises a PKMF or an AUSF.

Example 98. A method for wireless communication at a first UE, comprising: receiving, from a second UE, a notification of an authentication failure during establishment of a secure connection between the second UE and the first UE; receiving, from the second UE, HNRI for a first authentication node within a home network of the second UE; and sending the HNRI for the first authentication node within the home network of the second UE to a second authentication node within a home network of the first UE.

Example 99. The method of example 98, wherein receiving the notification of the authentication failure comprises receiving notification of a synchronization failure.

Example 100. The method of any of examples 98 to 99, wherein receiving the HNRI from the second UE comprises: receiving the HNRI from the second UE before receiving the notification of the authentication failure; storing the HNRI; and retrieving the HNRI in response to receiving the notification of the authentication failure.

Example 101. The method of any of examples 98 to 100, wherein the notification of the authentication failure comprises the HNRI and wherein receiving the HNRI from the second UE comprises receiving the HNRI from the second UE as part of the notification of the authentication failure.

Example 102. The method of any of examples 98 to 101, wherein receiving the HNRI from the second UE comprises receiving the HNRI from the second UE after receiving the notification of the authentication failure.

Example 103. The method of any of examples 100 to 102, wherein receiving the HNRI from the second UE comprises receiving a subscription concealed identifier (SUCI).

Example 104. The method of any of examples 100 to 103, wherein receiving the HNRI from the second UE comprises receiving a PRUK ID.

Example 105. The method of example 104, wherein the PRUK ID comprises at least one of a 64-bit string or a NAI.

Example 106. The method of any of examples 98 to 105, wherein receiving the notification of the authentication failure during establishment of the secure connection between the second UE and the first UE comprises receiving notification of the authentication failure during establishment of a PC5 connection.

Example 107. The method of any of examples 98 to 106, wherein receiving the notification of the authentication failure comprises receiving the notification of the authentication failure during at least one of a user plane security procedure or a control plane security procedure.

Example 108. The method of any of examples 98 to 107, wherein determining the HNRI for the first authentication node within the home network of the second UE comprises determining the HNRI for at least one of a PKMF or an AUSF within the home network of the second UE.

Example 109. A method for wireless communication at a network entity, comprising: receiving, from a first UE in a first home network of the network entity, a request for security materials for a secure connection between the first UE and a second UE having a second home network that is different from the first home network, the request comprising a TXI; determining, based on the TXI, HNRI for the second home network; determining, based on the HNRI for the second home network, an authentication node within the second home network; and forwarding the request to the authentication node within the second home network.

Example 110. The method of example 109, further comprising, prior to receiving the request for security materials: receiving, from the first UE, mapping information that maps the TXI to the HNRI for the second home network; and storing the mapping information.

Example 111. The method of example 110, wherein receiving the mapping information comprises receiving the TXI and at least one of a SUCI or a PRUK ID.

Example 112. The method of example 111, wherein the PRUK ID comprises at least one of a 64-bit string or a NAI.

Example 113. The method of any of examples 110 to 112, wherein the HNRI comprises a HPLMN identifier of the second home network.

Example 114. The method of any of examples 109 to 113, wherein the authentication node within the second home network comprises at least one of a PKMF or an AUSF.

Example 115. The method of any of examples 109 to 114, wherein the network entity comprises at least one of a PKMF or an AMF.

Example 116. An apparatus for wireless communication at a first UE, comprising: one or more memories; and one or more processors coupled to the one or more memories, the one or more processors configured to cause the first UE to: send, in response to an authentication failure during establishment of a secure connection with a second UE, a notification of the authentication failure to the second UE;

and provide the second UE with HNRI for an authentication node within a home network of the first UE.

Example 117. The apparatus of example 116, wherein the one or more processors configured to cause the first UE to detect the authentication failure during establishment of the secure connection with the second UE are configured to cause the first UE to at least one of: detect the authentication failure during establishment of the secure connection with the second UE operating as a UE-to-network (U2N) relay; detect the authentication failure during establishment of a PC5 connection with the second UE; or detect a synchronization failure.

Example 118. The apparatus of any of examples 116 to 117, wherein the one or more processors configured to cause the first UE to send the notification of the authentication failure to the second UE and provide the second UE with the HNRI for the authentication node within the home network of the first UE are configured to cause the first UE to: send the notification of the authentication failure and the HNRI in a same message; or send the notification of the authentication failure in a first message and send the HNRI in a second message.

Example 119. The apparatus of any of examples 116 to 118, wherein the one or more processors configured to cause the first UE to detect the authentication failure are configured to cause the first UE to detect the authentication failure during a user plane security procedure.

Example 120. The apparatus of example 119, wherein the one or more processors configured to cause the first UE to send the notification of the authentication failure to the second UE are configured to cause the first UE to send a direct security mode failure message to the second UE, the direct security mode failure message comprising the HNRI.

Example 121. The apparatus of any of examples 116 to 120, wherein the one or more processors configured to cause the first UE to detect the authentication failure are configured to cause the first UE to detect the authentication failure during a control plane security procedure.

Example 122. The apparatus of any of examples 116 to 121, wherein the one or more processors configured to cause the first UE to provide the second UE with the HNRI are configured to provide the second UE with at least one of: a PRUK ID; or an HNRI extracted from a SUCI or PRUK ID.

Example 123. The apparatus of any of examples 116 to 122, wherein the one or more processors configured to cause the first UE to provide the second UE with the HNRI are configured to cause the first UE to at least one of: modify a user identification portion of the HNRI to obscure an identity of the user and to provide the second UE with the HNRI having the modified user identification portion; at least one of confidentiality protect or integrity protect the HNRI based on provisioned discovery security materials and to provide the second UE with the HNRI that has been confidentiality and integrity protected based on provisioned discovery security materials; or provide the second UE with a HPLMN identifier of the home network of the first UE.

Example 124. The apparatus of any of examples 116 to 123, wherein the one or more processors configured to cause the first UE to provide the second UE with the HNRI are configured to cause the first UE to provide the second UE with a HPLMN identifier of the home network of the first UE.

Example 125. The apparatus of any of examples 116 to 124, wherein the authentication node within the home network of the first UE comprises a PKMF or an AUSF.

Example 126. The apparatus of any of examples 116 to 125, further comprising one or more transceivers coupled to the one or more processors.

Example 127. The apparatus of example 116, wherein the one or more processors are configured, individually or in collectively, to cause the first UE to: send, in response to an authentication failure during establishment of a secure connection with a second UE, a notification of the authentication failure to the second UE; and provide the second UE with HNRI for an authentication node within a home network of the first UE.

Example 128. An apparatus for wireless communication at a first UE, comprising: one or more memories; and one or more processors coupled to the one or more memories, the one or more processors configured to cause the first UE to: receive, from a second UE, a notification of an authentication failure during establishment of a secure connection between the second UE and the first UE; receive, from second UE, HNRI for a first authentication node within a home network of the second UE; and send the HNRI for the first authentication node within the home network of the second UE to a second authentication node within a home network of the first UE.

Example 129. The apparatus of example 128, wherein the one or more processors configured to cause the first UE to receive the notification of the authentication failure are configured to cause the first UE to receive notification of a synchronization failure.

Example 130. The apparatus of any of examples 128 to 129, wherein the one or more processors configured to cause the first UE to receive the HNRI from the second UE are configured to cause the first UE to: receive the HNRI from the second UE before receiving the notification of the authentication failure; store the HNRI; and retrieve the HNRI in response to receiving the notification of the authentication failure.

Example 131. The apparatus of any of examples 128 to 130, wherein the notification of the authentication failure comprises the HNRI and wherein the one or more processors configured to cause the first UE to receive the HNRI from the second UE are configured to cause the first UE to receive the HNRI from the second UE as part of the notification of the authentication failure.

Example 132. The apparatus of any of examples 128 to 131, wherein the one or more processors configured to cause the first UE to receive the HNRI from the second UE are configured to cause the first UE to receive the HNRI from the second UE after receiving the notification of the authentication failure.

Example 133. The apparatus of any of examples 130 to 132, wherein the one or more processors configured to cause the first UE to receive the HNRI from the second UE are configured to cause the first UE to receive a subscription concealed identifier (SUCI).

Example 134. The apparatus of any of examples 130 to 133, wherein the one or more processors configured to cause the first UE to receive the HNRI from the second UE are configured to cause the first UE to receive a PRUK ID.

Example 135. The apparatus of example 134, wherein PRUK ID comprises at least one of a 64-bit string or a NAI.

Example 136. The apparatus of any of examples 128 to 135, wherein the one or more processors configured to cause the first UE to receive the notification of the authentication failure during establishment of the secure connection between the second UE and the first UE are configured to cause the first UE to receive notification of the authentication failure during establishment of a PC5 connection.

Example 137. The apparatus of any of examples 128 to 136, wherein the one or more processors configured to cause the first UE to receive the notification of the authentication failure are configured to cause the first UE to receive the notification of the authentication failure during at least one of a user plane security procedure or a control plane security procedure.

Example 138. The apparatus of any of examples 128 to 137, wherein the one or more processors configured to cause the first UE to determine the HNRI for the first authentication node within the home network of the second UE are configured to cause the first UE to determine the HNRI for at least one of a PKMF or an AUSF within the home network of the second UE.

Example 139. The apparatus of any of examples 128 to 138, further comprising one or more transceivers coupled to the one or more processors.

Example 140. The apparatus of example 128, wherein the one or more processors are configured, individually or collectively, to cause the first UE to: receive, from a second UE, a notification of an authentication failure during establishment of a secure connection between the second UE and the first UE; receive, from the second UE, HNRI for a first authentication node within a home network of the second UE; and send the HNRI for the first authentication node within the home network of the second UE to a second authentication node within a home network of the first UE.

Example 141. An apparatus for wireless communication at a network entity, comprising: one or more memories; and one or more processors coupled to the one or more memories, the one or more processors configured to cause the network entity to: receive, from a first UE in a first home network of the network entity, a request for security materials for a secure connection between the first UE and a second UE having a second home network that is different from the first home network, the request comprising a TXI; determine, based on the TXI, HNRI for the second home network; determine, based on the HNRI for the second home network, an authentication node within the second home network; and forward the request to the authentication node within the second home network.

Example 142. The apparatus of example 141, wherein the one or more processors are further configured to, prior to receiving the request for security materials, cause the network entity to: receive, from the first UE, mapping information that maps the TXI to the HNRI for the second home network; and store the mapping information.

Example 143. The apparatus of example 142, wherein the one or more processors configured to cause the network entity to receive the mapping information are configured to cause the network entity to receive the TXI and at least one of a SUCI or a PRUK ID.

Example 144. The apparatus of example 143, wherein PRUK ID comprises at least one of a 64-bit string or a NAI.

Example 145. The apparatus of any of examples 142 to 144, wherein the HNRI comprises a HPLMN identifier of the second home network.

Example 146. The apparatus of any of examples 141 to 145, wherein the authentication node within the second home network comprises at least one of a PKMF or an AUSF.

Example 147. The apparatus of any of examples 141 to 146, comprising at least one of a PKMF or an AMF.

Example 148. The apparatus of any of examples 141 to 147, further comprising one or more transceivers coupled to the one or more processors.

Example 149. The apparatus of example 141, wherein the one or more processors are configured, individually or collectively, to cause the network entity to: receive, from a first UE in a first home network of the network entity, a request for security materials for a secure connection between the first UE and a second UE having a second home network that is different from the first home network, the request comprising a TXI; determine, based on the TXI, HNRI for the second home network; determine, based on the HNRI for the second home network, an authentication node within the second home network; and forward the request to the authentication node within the second home network.

Example 150. A UE for wireless communication, comprising a processing system that includes processor circuitry and memory circuitry that stores code and is coupled with the processor circuitry, the processing system configured to cause the UE to perform the method of one or more of examples 1 to 33 and 88 to 108.

Example 151. A network entity for wireless communication, comprising a processing system that includes processor circuitry and memory circuitry that stores code and is coupled with the processor circuitry, the processing system configured to cause the network entity to perform the method of one or more of examples 34 to 40 and 109 to 115.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIGS. 3A, 3B, and 3C or the processor circuitry described in connection with FIGS. 19 and 20. Reference to "one or more memories" should be understood to refer to any one or more memories of a corresponding device, such as the memory described in connection with FIGS. 3A, 3B, and 3C or the memory circuitry described in connection with FIGS. 19 and 20. For example, functions described as being performed by one or more memories can be performed by the same subset of the one or more memories or different subsets of the one or more memories.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers.

Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. An apparatus for wireless communication at a first user equipment (UE), comprising:
one or more memories; and
one or more processors coupled to the one or more memories, the one or more processors configured to cause the first UE to:
send, in response to detecting an authentication failure during establishment of a secure connection with a second UE, a notification of the authentication failure to the second UE; and
provide the second UE with home network routing information (HNRI) for an authentication node within a home network of the first UE.

2. The apparatus of claim 1, wherein the one or more processors configured to cause the first UE to detect the authentication failure during establishment of the secure connection with the second UE are configured to cause the first UE to at least one of:
detect the authentication failure during establishment of the secure connection with the second UE operating as a UE-to-network (U2N) relay;
detect the authentication failure during establishment of a PCS connection with the second UE; or
detect a synchronization failure.

3. The apparatus of claim 1, wherein the one or more processors configured to cause the first UE to send the notification of the authentication failure to the second UE and provide the second UE with the HNRI for the authentication node within the home network of the first UE are configured to cause the first UE to send the notification of the authentication failure and provide the HNRI in a same message.

4. The apparatus of claim 1, wherein the one or more processors configured to cause the first UE to detect the authentication failure are configured to cause the first UE to detect the authentication failure during a user plane security procedure or during a control plane security procedure.

5. The apparatus of claim 1, wherein the one or more processors configured to cause the first UE to provide the second UE with the HNRI are configured to cause the first UE to provide the second UE with at least one of:
a ProSe relay user key (PRUK) identifier (PRUK ID); or
an HNRI extracted from a SUCI.

6. The apparatus of claim 1, wherein the one or more processors configured to cause the first UE to provide the second UE with the HNRI are configured to cause the first UE to at least one of:
modify a user identification portion of the HNRI to obscure an identity of a user and provide the second UE with the HNRI having the modified user identification portion;
at least one of confidentiality protect or integrity protect the HNRI based on provisioned discovery security materials and provide the second UE with the HNRI that has been confidentiality and/or integrity protected; or
provide the second UE with a home public land mobile network (HPLMN) identifier of the home network of the first UE.

7. The apparatus of claim 1, wherein the one or more processors configured to provide the second UE with HNRI for the authentication node within the home network of the first UE are configured to provide the second UE with at least one of:
the HNRI for a ProSe key management function (PKMF) within the home network of the first UE; or
the HNRI for an authentication server function (AUSF) within the home network of the first UE.

8. The apparatus of claim 1,
wherein the one or more processors configured to cause the first UE to send the notification of the authentication failure to the second UE are configured to cause the first UE to send the notification of the authentication failure in a first message; and
wherein the one or more processors configured to provide the second UE with the HNRI for the authentication node within the home network of the first UE are configured to cause the first UE to provide the HNRI in a second message.

9. The apparatus of claim 1,
wherein the one or more processors configured to provide the second UE with the HNRI for the authentication node within the home network of the first UE are configured to cause the first UE to provide the HNRI in a first message; and
wherein the one or more processors configured to cause the first UE to send the notification of the authentication failure to the second UE are configured to cause the first UE to send the notification of the authentication failure in a second message after the first message.

10. The apparatus of claim 1, wherein the one or more processors configured to cause the first UE to provide the second UE with the HNRI for the authentication node within the home network of the first UE are configured to cause the first UE to provide the HNRI in the first message prior to detecting the authentication failure.

11. The apparatus of claim 1, wherein the one or more processors configured to cause the first UE to provide the second UE with the HNRI are configured to cause the first UE to provide the second UE with an HNRI extracted from a SUCI.

12. The apparatus of claim 1, wherein the one or more processors configured to cause the first UE to provide the second UE with the HNRI are configured to cause the first UE to provide the second UE with a home public land mobile network (HPLMN) identifier of the home network of the first UE.

13. An apparatus for wireless communication at a first user equipment (UE), comprising:
one or more memories; and
one or more processors coupled to the one or more memories, the one or more processors configured to cause the first UE to:
receive, from a second UE, a notification of an authentication failure during establishment of a secure connection between the second UE and the first UE;
receive, from the second UE, home network routing information (HNRI) for a first authentication node within a home network of the second UE; and send the HNRI for the first authentication node within the home network of the second UE to a second authentication node within a home network of the first UE.

14. The apparatus of claim 13, wherein the one or more processors configured to receive the notification of the authentication failure are configured to receive notification of a synchronization failure.

15. The apparatus of claim 13, wherein the one or more processors configured to receive the HNRI from the second UE are configured to:

receive the HNRI from the second UE before receiving the notification of the authentication failure;

store the HNRI; and retrieve the HNRI in response to receiving the notification of the authentication failure.

16. The apparatus of claim 13, wherein the notification of the authentication failure comprises the HNRI and wherein the one or more processors configured to receive the HNRI from the second UE are configured to receive the HNRI from the second UE as part of the notification of the authentication failure.

17. The apparatus of claim 13, wherein the one or more processors configured to receive the HNRI from the second UE are configured to receive the HNRI from the second UE after receiving the notification of the authentication failure.

18. The apparatus of claim 13, wherein the one or more processors configured to receive the HNRI from the second UE are configured to receive at least one of a subscription concealed identifier (SUCI) or a ProSe relay user key (PRUK) identifier (PRUK ID).

19. The apparatus of claim 13, wherein the one or more processors configured to receive the notification of the authentication failure during establishment of the secure connection between the second UE and the first UE are configured to receive notification of the authentication failure during establishment of a PC5 connection.

20. The apparatus of claim 13, wherein the one or more processors configured to receive the notification of the authentication failure are configured to receive the notification of the authentication failure during at least one of a user plane security procedure or a control plane security procedure.

21. The apparatus of claim 13, wherein the one or more processors configured to determine the HNRI for the first authentication node within the home network of the second UE are configured to determine the HNRI for at least one of a ProSe key management function (PKMF) within the home network of the second UE or an authentication server function (AUSF) within the home network of the second UE.

22. The apparatus of claim 13, wherein the one or more processors configured to receive the HNRI for the first authentication node within the home network of the second UE are configured to receive the HNRI in a first message; and wherein the one or more processors configured to receive the notification of the authentication failure during establishment of the secure connection between the second UE and the first UE are configured to receive the notification of the authentication failure in a second message after the first message.

23. The apparatus of claim 13, wherein the one or more processors configured to receive the HNRI from the second UE are configured to receive the HNRI from the second UE before receiving the notification of the authentication failure.

24. The apparatus of claim 13, wherein the one or more processors configured to receive the HNRI from the second UE are configured to receive a home public land mobile network (HPLMN) identifier of the home network of the second UE.

25. An apparatus for wireless communication at a network entity, comprising:

one or more memories; and one or more processors coupled to the one or more memories, the one or more processors configured to cause the network entity to:

receive a request for security materials for a secure connection between a first user equipment (UE) in a first home network of the network entity and a second UE having a second home network that is different from the first home network, the request comprising a transaction identifier (TXI);

determine, based on the TXI, home network routing information (HNRI) for the second home network;

determine, based on the HNRI for the second home network, an authentication node within the second home network; and forward the request to the authentication node within the second home network.

26. The apparatus of claim 25, wherein the one or more processors are further configured to, prior to receiving the request for security materials:

receive, from the first UE, mapping information that maps the TXI to the HNRI for the second home network; and store the mapping information.

27. The apparatus of claim 26, wherein the one or more processors configured to receive the mapping information are configured to receive the TXI and at least one of a subscriber concealed identifier (SUCI) or a ProSe relay user key (PRUK) identifier (PRUK ID).

28. The apparatus of claim 26, wherein the one or more processors configured to determine the HNRI for the second home network are configured to determine a home public land mobile network (HPLMN) identifier of the second home network.

29. The apparatus of claim 25, wherein the one or more processors configured to forward the request to the authentication node within the second home network are configured to forward the request to a ProSe key management function (PKMF) within the second home network or to an authentication server function (AUSF) within the second home network.

30. The apparatus of claim 25, wherein the network entity comprises at least one of a ProSe key management function (PKMF) or an access and mobility management function (AMF).

31. A method for wireless communication at a first user equipment (UE), the method comprising:

sending, in response to an authentication failure during establishment of a secure connection with a second UE, a notification of the authentication failure to the second UE; and providing the second UE with home network routing information (HNRI) for an authentication node within a home network of the first UE.

32. The method of claim 31, wherein detecting the authentication failure during establishment of the secure connection with the second UE comprises at least one of:

detecting the authentication failure during establishment of the secure connection with the second UE operating as a UE-to-network (U2N) relay;

detecting the authentication failure during establishment of a PC5 connection with the second UE; or detecting a synchronization failure.

33. The method of claim 31, wherein sending the notification of the authentication failure to the second UE and providing the second UE with the HNRI for the authentication node within the home network of the first UE comprises sending the notification of the authentication failure and providing the HNRI in a same message.

34. The method of claim 31, wherein detecting the authentication failure comprises detecting the authentication failure during a user plane security procedure or during a control plane security procedure.

35. The method of claim 31, wherein providing the second UE with the HNRI comprises providing the second UE with at least one of:

a ProSe relay user key (PRUK) identifier (PRUK ID); or an HNRI extracted from a SUCI.

36. The method of claim 31, wherein providing the second UE with the HNRI comprises at least one of:

modifying a user identification portion of the HNRI to obscure an identity of a user and providing the second UE with the HNRI having the modified user identification portion;

at least one of confidentiality protecting or integrity protecting the HNRI based on provisioned discovery security materials and providing the second UE with the HNRI that has been confidentiality and/or integrity protected; or providing the second UE with a home public land mobile network (HPLMN) identifier of the home network of the first UE.

37. The method of claim 31, wherein providing the second UE with HNRI for the authentication node within the home network of the first UE comprises providing the second UE with the HNRI for a ProSe key management function (PKMF) within the home network of the first UE or the HNRI for an authentication server function (AUSF) within the home network of the first UE.

38. The method of claim 31, wherein sending the notification failure to the second UE comprises sending the notification failure in a first message; and wherein providing the second UE with the HNRI comprises providing the HNRI in a second message.

39. The method of claim 31, wherein providing the second UE with the HNRI comprises providing the HNRI in a first message; and wherein sending the notification failure to the second UE comprises sending the notification failure in a second message after the first message.

40. The method of claim 31, wherein providing the second UE with the HNRI in the first message comprises providing the HNRI in the first message prior to detecting the authentication failure.

41. The method of claim 31, wherein providing the second UE with the HNRI comprises providing the second UE with an HNRI extracted from a SUCI.

42. The method of claim 31, wherein providing the second UE with the HNRI comprises providing the second UE with a home public land mobile network (HPLMN) identifier of the home network of the first UE.

43. A method for wireless communication at a first user equipment (UE), the method comprising:

receiving, from a second UE, a notification of an authentication failure during establishment of a secure connection between the second UE and the first UE;

receiving, from the second UE, home network routing information (HNRI) for a first authentication node within a home network of the second UE; and sending the HNRI for the first authentication node within the home network of the second UE to a second authentication node within a home network of the first UE.

44. The method of claim 43, wherein receiving the HNRI from the second UE comprises:

receiving the HNRI from the second UE before receiving the notification of the authentication failure;

storing the HNRI; and retrieving the HNRI in response to receiving the notification of the authentication failure.

45. The method of claim 43, wherein receiving the HNRI for the first authentication node within the home network of the second UE comprises receiving the HNRI in a first message; and wherein receiving the notification of the authentication failure during establishment of the secure connection between the second UE and the first UE comprises receiving the notification of the authentication failure in a second message after the first message.

46. The method of claim 43, wherein receiving the HNRI from the second UE comprises receiving the HNRI from the second UE before receiving the notification of the authentication failure.

47. The method of claim 43, wherein receiving the HNRI from the second UE comprises receiving a home public land mobile network (HPLMN) identifier of the home network of the second UE.

48. An apparatus for wireless communication at a first user equipment (UE), comprising:

means for sending, in response to an authentication failure during establishment of a secure connection with a second UE, a notification of the authentication failure to the second UE; and means for providing the second UE with home network routing information (HNRI) for an authentication node within a home network of the first UE.

49. An apparatus for wireless communication at a first user equipment (UE), comprising:

means for receiving, from a second UE, a notification of an authentication failure during establishment of a secure connection between the second UE and the first UE;

means for receiving, from the second UE, home network routing information (HNRI) for a first authentication node within a home network of the second UE; and means for sending the HNRI for the first authentication node within the home network of the second UE to a second authentication node within a home network of the first UE.

50. A non-transitory computer-readable medium storing computer-executable instructions that, when executed by a device, cause the device to:

send, in response to an authentication failure during establishment of a secure connection with a second UE, a notification of the authentication failure to the second UE; and provide the second UE with home network routing information (HNRI) for an authentication node within a home network of the first UE.

51. A non-transitory computer-readable medium storing computer-executable instructions that, when executed by a device, cause the device to:

receive, from a second UE, a notification of an authentication failure during establishment of a secure connection between the second UE and the first UE;

receive, from the second UE, home network routing information (HNRI) for a first authentication node within a home network of the second UE; and send the HNRI for the first authentication node within the home network of the second UE to a second authentication node within a home network of the first UE.

\* \* \* \* \*